United States Patent [19]

Champlin et al.

[11] Patent Number: 4,627,070

[45] Date of Patent: Dec. 2, 1986

[54] ASYNCHRONOUS DATA BUS SYSTEM

[75] Inventors: Keith S. Champlin, Minneapolis; Ernest C. Preimesberger, Coon Rapids; George W. Miller, Anoka, all of Minn.

[73] Assignee: FMC Corporation, Chicago, Ill.

[21] Appl. No.: 302,939

[22] Filed: Sep. 16, 1981

[51] Int. Cl.⁴ .......................... H04Q 3/00; H04J 3/06
[52] U.S. Cl. ........................................ 375/3; 370/86; 340/825.05
[58] Field of Search ............... 375/3, 36, 122; 370/85, 370/86, 87, 88, 89, 90; 340/825.05, 825.06, 825.14

[56] References Cited

U.S. PATENT DOCUMENTS

| | | | |
|---|---|---|---|
| 3,312,954 | 4/1967 | Bible et al. | 340/347 P |
| 3,483,329 | 12/1969 | Hunkins et al. | 370/86 |
| 3,544,976 | 12/1970 | Collins | 370/86 |
| 3,597,549 | 8/1971 | Farmer | 370/90 |
| 3,632,881 | 1/1972 | Graham | 370/89 |
| 3,633,169 | 1/1972 | Bickford | 370/90 |
| 3,639,694 | 2/1972 | Deutsch et al. | 370/89 |
| 3,639,904 | 2/1972 | Arulpragasam | 370/86 |
| 3,659,271 | 4/1972 | Collins et al. | 370/88 |
| 3,697,959 | 10/1972 | Abramson et al. | 370/92 |
| 3,787,627 | 1/1974 | Abramson et al. | 370/89 |
| 3,879,710 | 4/1975 | Maxemchuk et al. | 370/91 |
| 3,891,804 | 6/1975 | Hachenburg | 370/79 |
| 3,943,283 | 3/1976 | Caragliano et al. | 370/86 |
| 3,961,139 | 6/1976 | Bowman et al. | 370/89 |
| 4,016,369 | 4/1977 | Pedersen | 370/90 |
| 4,019,176 | 4/1977 | Cour et al. | 370/89 |
| 4,032,893 | 6/1977 | Moran | 370/85 |
| 4,038,494 | 7/1977 | Miller et al. | 375/111 |
| 4,042,783 | 8/1977 | Gindi | 370/86 |
| 4,071,706 | 1/1978 | Warren | 370/89 |
| 4,103,336 | 7/1978 | Gindi et al. | 364/900 |
| 4,106,104 | 8/1978 | Nitta et al. | 340/825.5 |
| 4,144,410 | 3/1979 | Flickinger et al. | 370/89 |
| 4,199,662 | 4/1980 | Lowe, Jr. | 370/91 |
| 4,242,749 | 12/1980 | Takezoe | 370/90 |
| 4,293,948 | 10/1981 | Soderblom | 370/90 |
| 4,398,297 | 8/1983 | Hwang et al. | 375/10 |
| 4,434,463 | 2/1984 | Quinqvis et al. | 370/85 |

FOREIGN PATENT DOCUMENTS

| | | |
|---|---|---|
| 1964009 | 7/1970 | Fed. Rep. of Germany . |
| 2048037 | 11/1972 | Fed. Rep. of Germany . |
| 1350800 | 4/1974 | United Kingdom . |
| 1457058 | 1/1976 | United Kingdom . |
| 1481275 | 7/1977 | United Kingdom . |

OTHER PUBLICATIONS

Compcon 80, Digest of Papers, Proceedings "Distributed Computing", Sep. 23–25, 1980, pp. 507–515, Twenty-First IEEE Computer Society International Conference, Washington, D.C., T. C. Wilson et al. entitled Distributed Control of Ring Networks Using a Play Through Protocol.

Datamation periodical, Feb. 1975, pp. 44–46.

Primary Examiner—Robert L. Griffin
Assistant Examiner—Stephen Chin
Attorney, Agent, or Firm—H. M. Stanley; R. B. Megley

[57] ABSTRACT

An active data bus includes a plurality of multiplex terminals serially interconnected to form a closed loop. Each terminal is capable of assuming either a relay configuration wherein data received from a preceding terminal are retransmitted to a succeeding terminal or a transmit access configuration wherein the loop is opened at the terminal and locally-generated data are introduced therein. Each terminal is capable of functioning either in a diagnostic mode whereby system access is obtained by programmed action of the terminal's control microprocessor or in a user access mode whereby access is obtained without microprocessor action by virtue of hardware "capturing" an access window bit introduced by the last-accessing terminal. The last-accessing terminal functions to close the loop after introducing its data and before the access window has completely traversed the system. The access window is thereupon "trapped" on the closed loop and circulates until it is "captured" by the next accessing terminal.

The data bus includes redundant data paths between terminals. The terminal control microprocessors are each capable of selecting either of two receiving paths and two transmitting paths to form the closed loop. The programs of the terminal control microprocessors include cooperative diagnostic controller and diagnostic follower algorithms. The plurality of microprocessors intercommunicate synchronously via the diagnostic mode to construct an optimum data loop from available system resources. Subsequently the member terminals collectively switch to the user access mode to asynchronously transfer data generated by user data sources directed to user data sinks.

50 Claims, 38 Drawing Figures

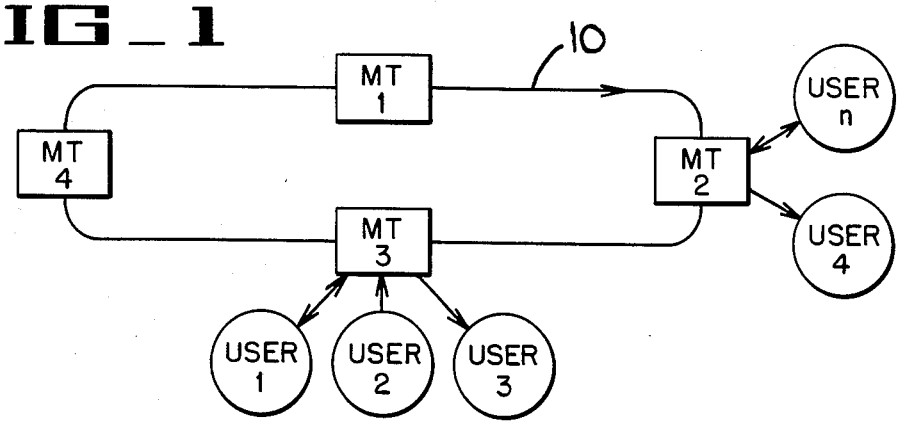
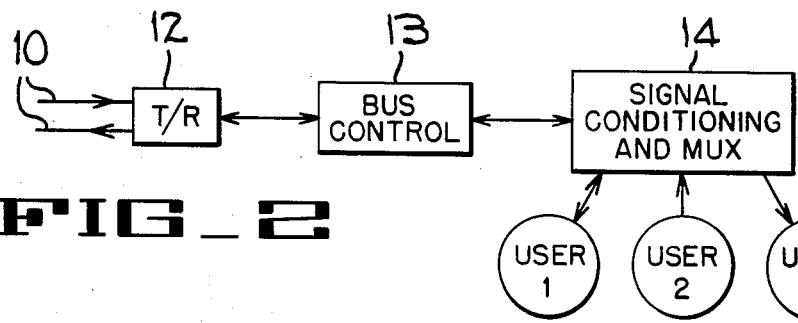
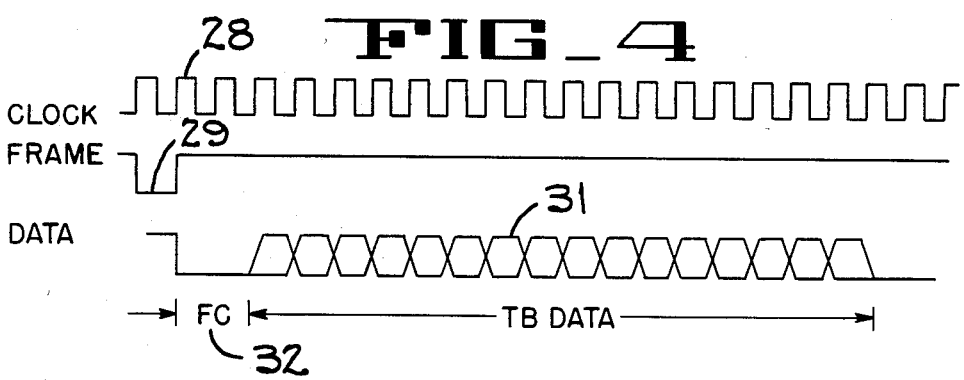
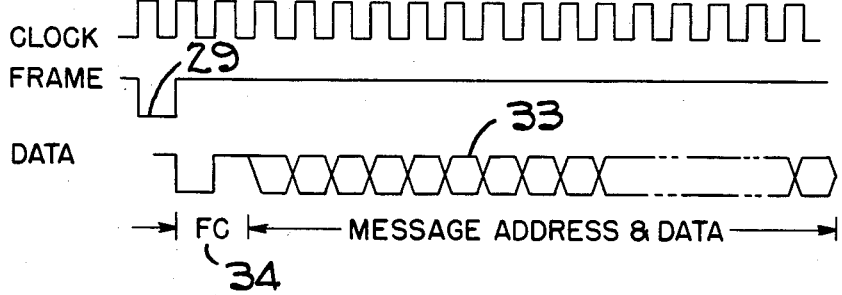

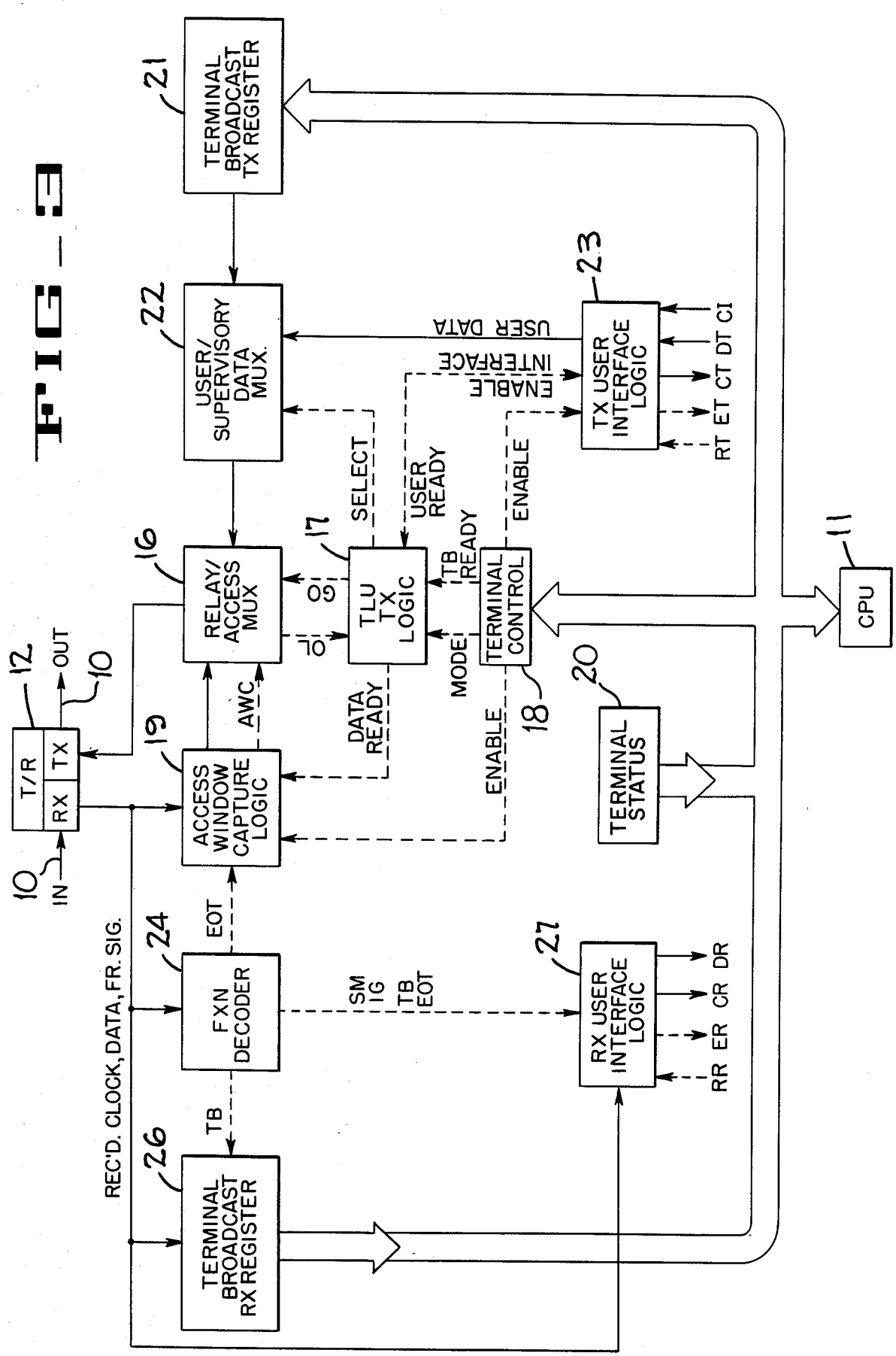

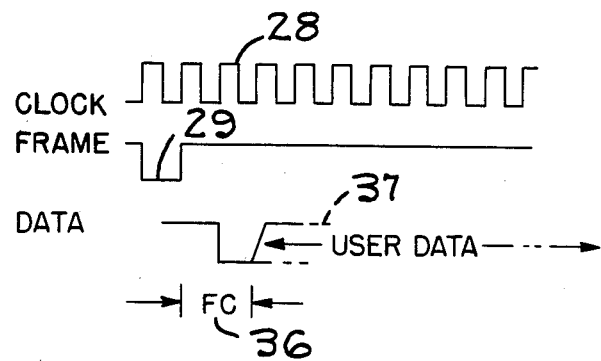
FIG_6
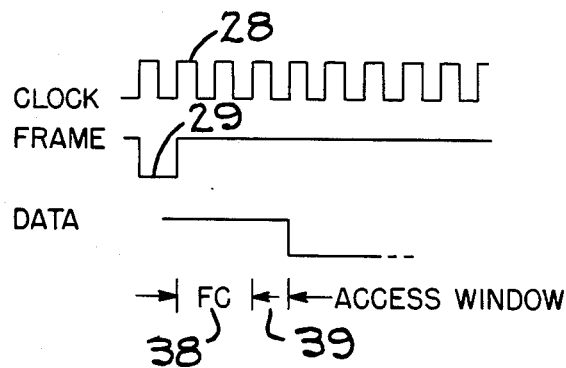
FIG_7
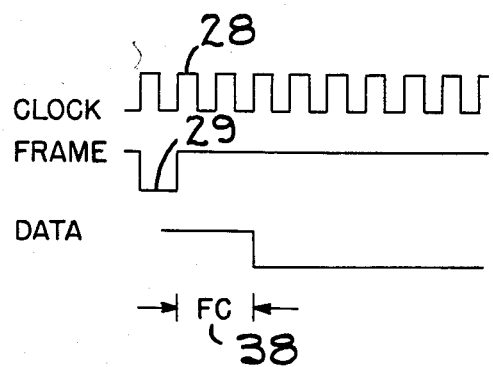
FIG_8

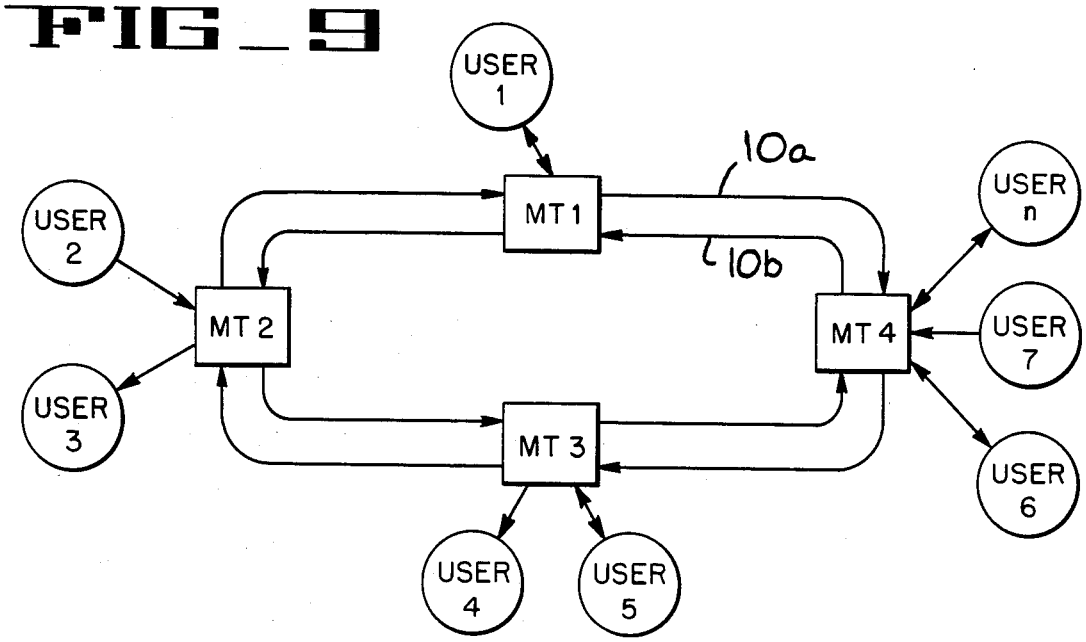
FIG_9
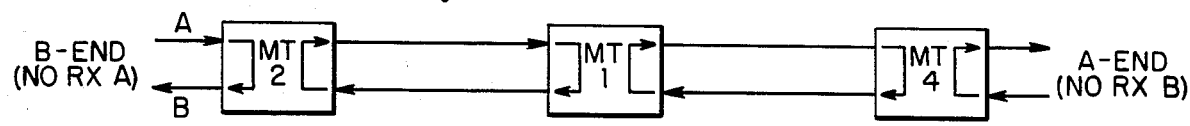
FIG_17
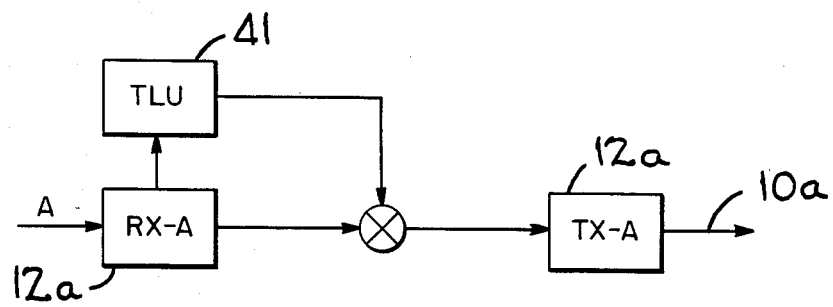
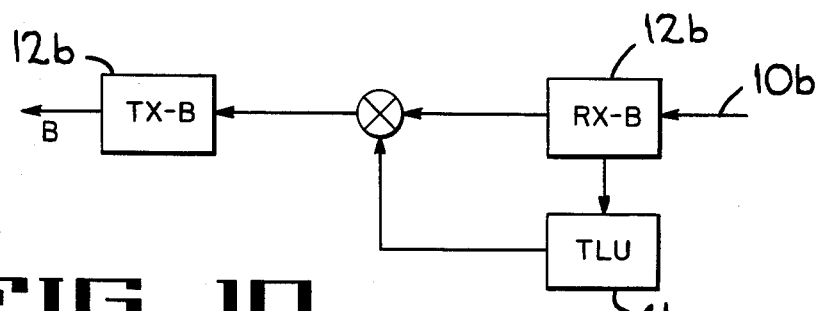
FIG_10

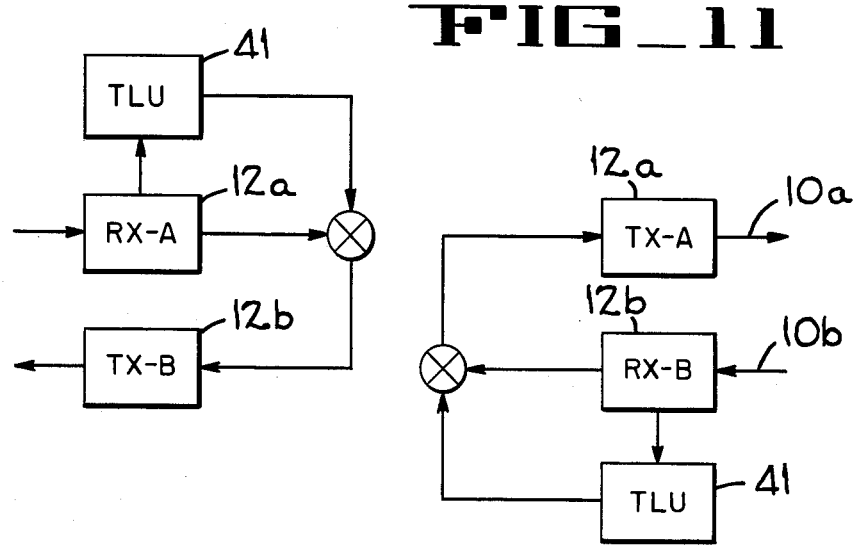
FIG_11
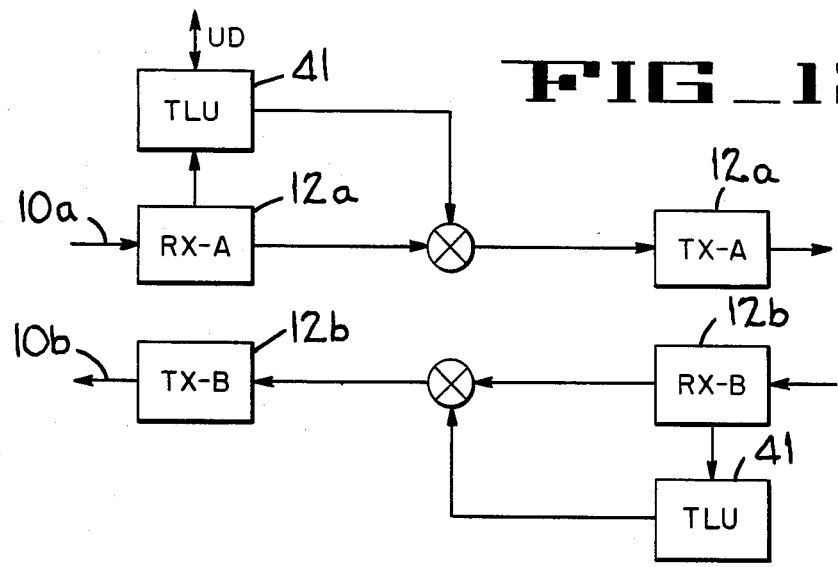
FIG_12
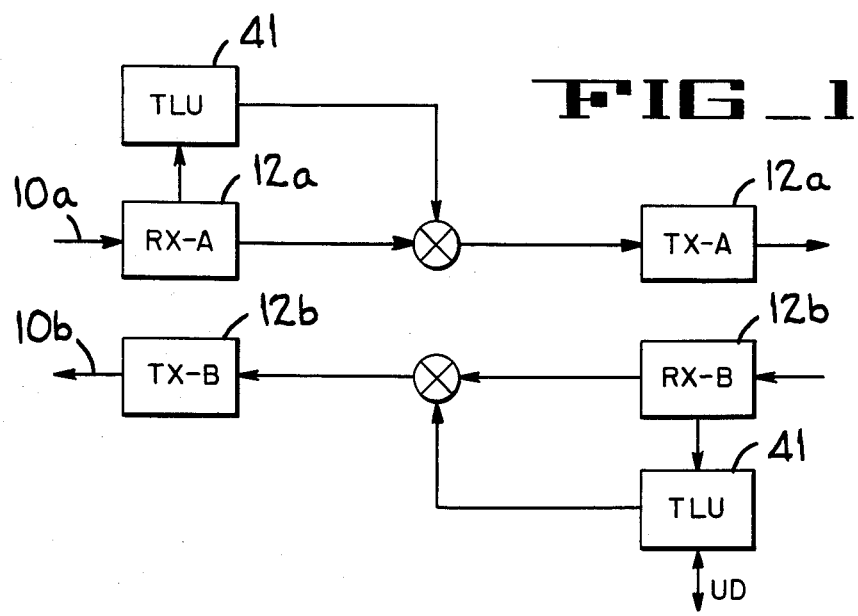
FIG_13

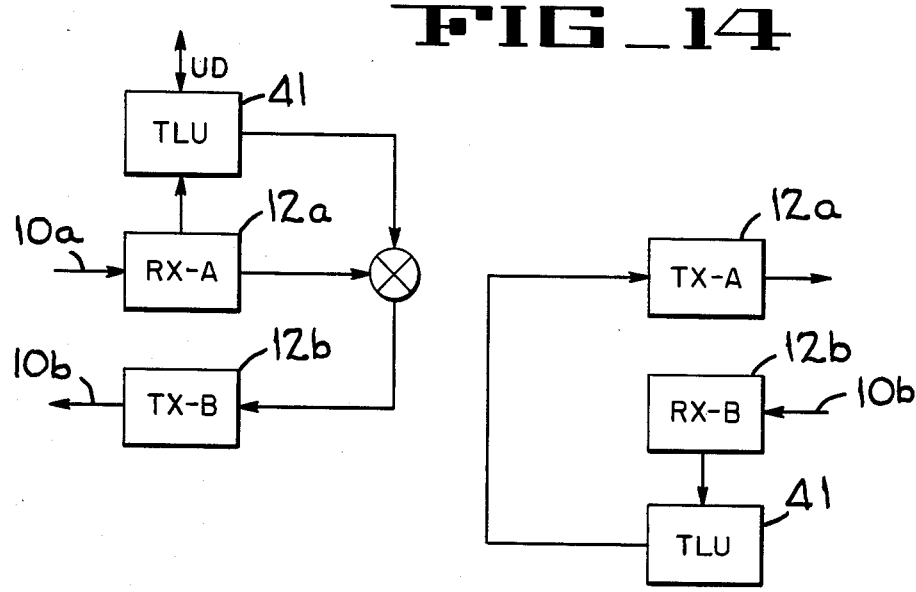
FIG_14
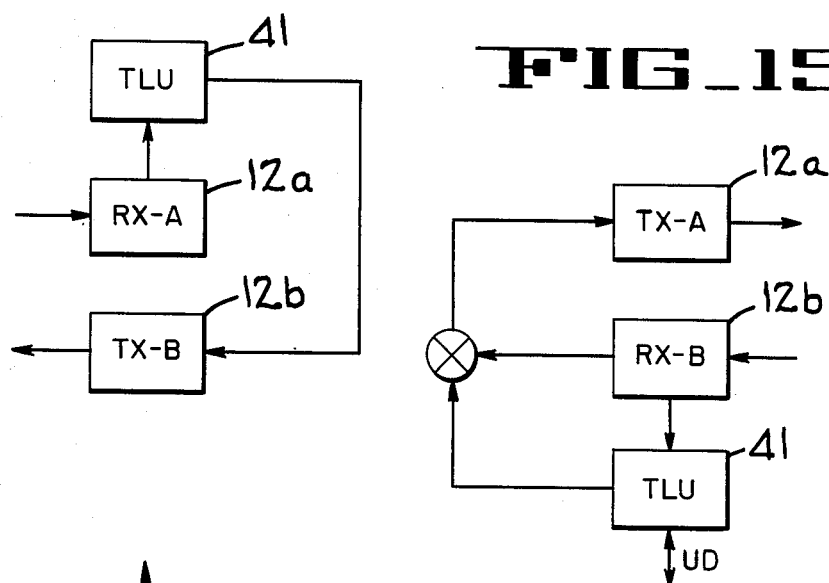
FIG_15
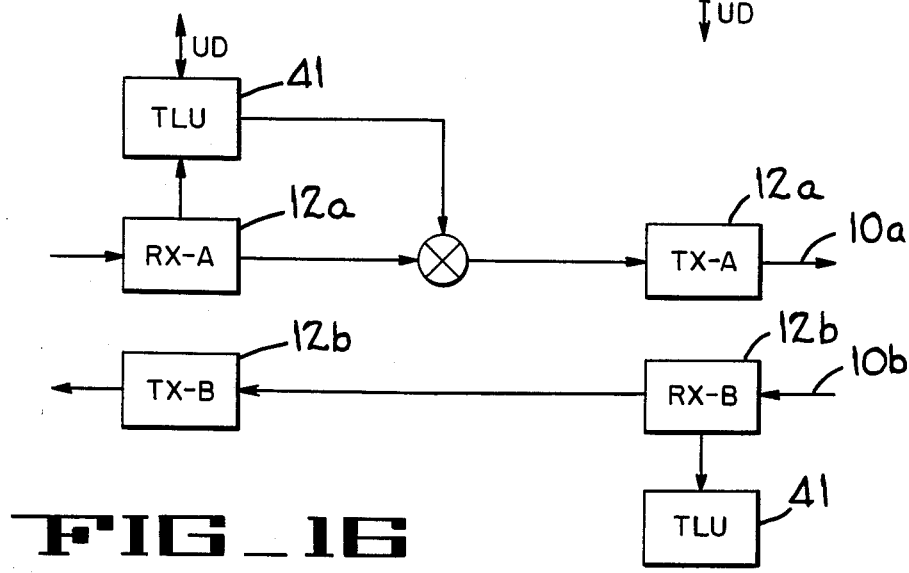
FIG_16

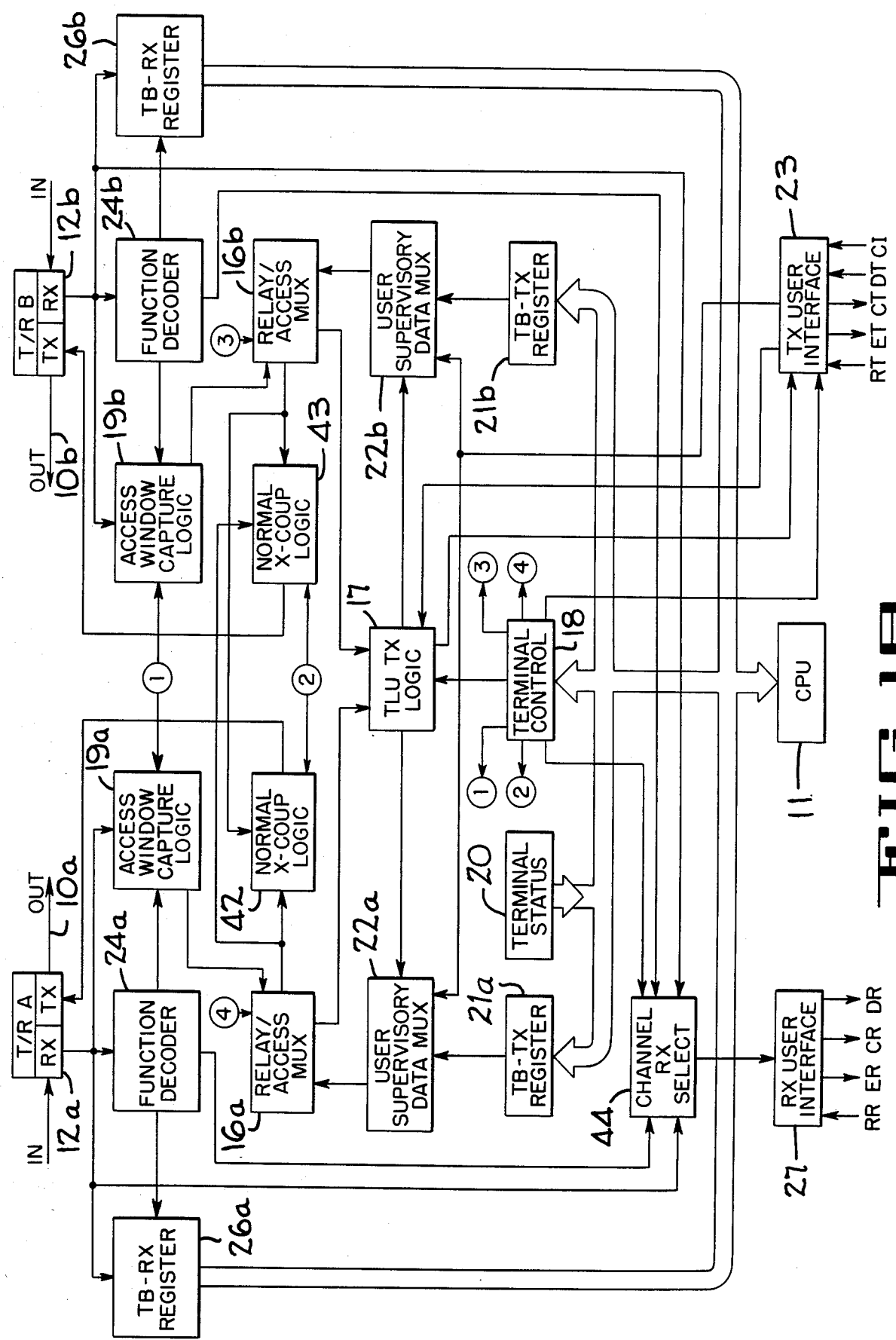

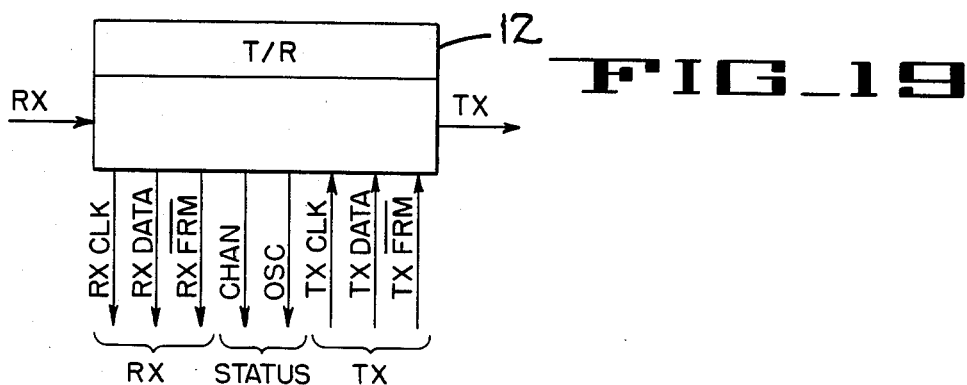
FIG_19
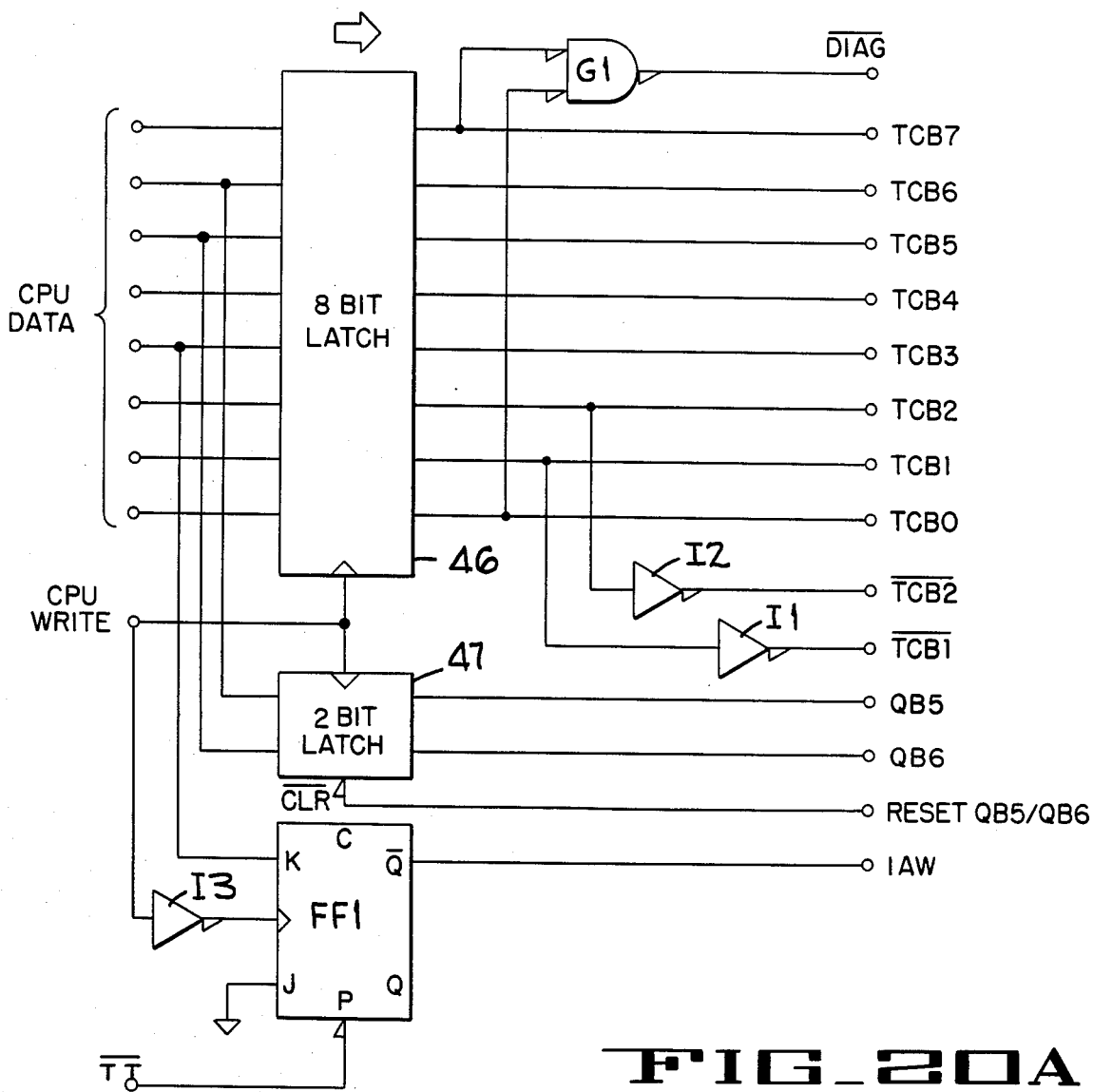
FIG_20A

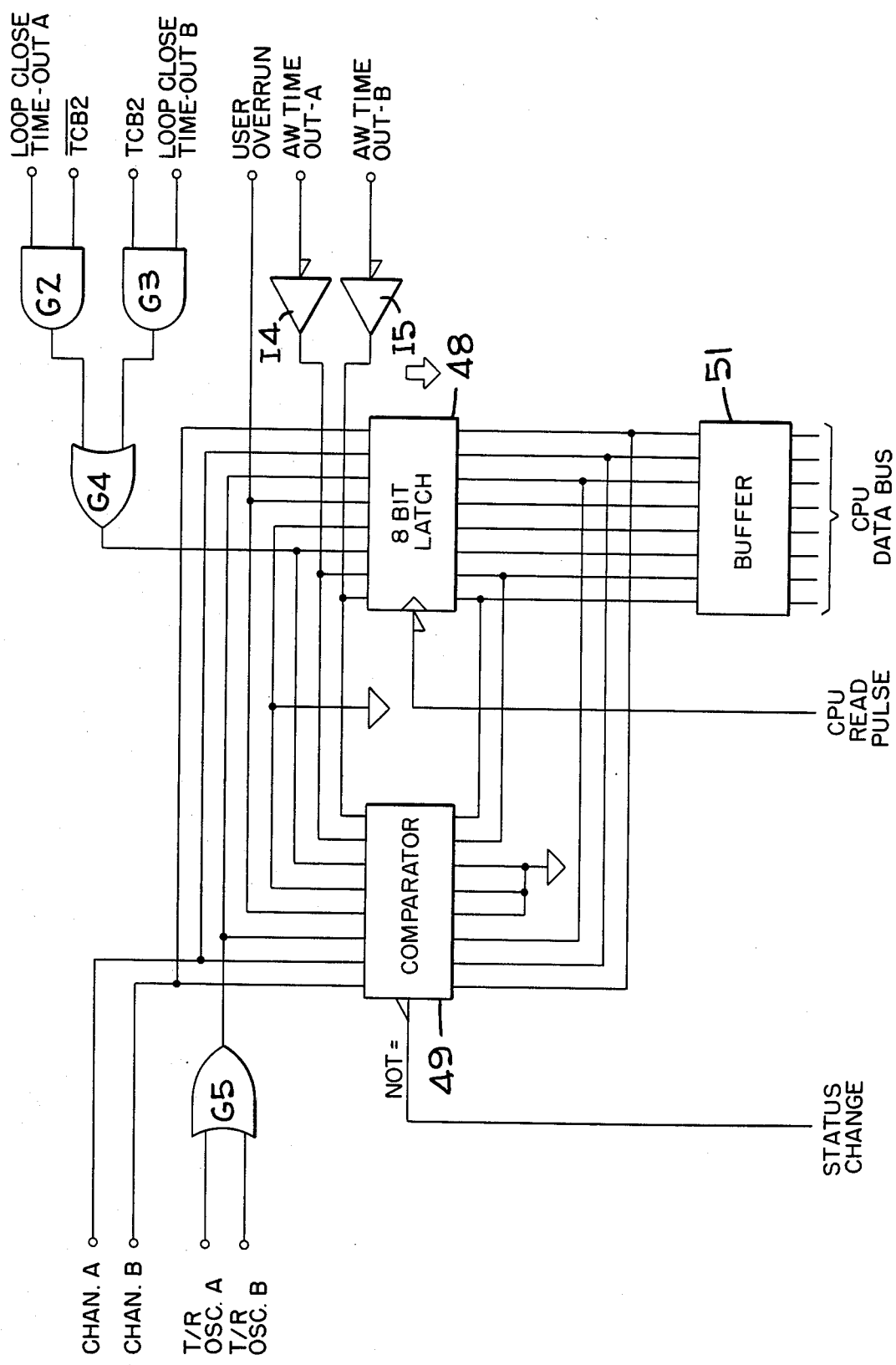
FIG_20B

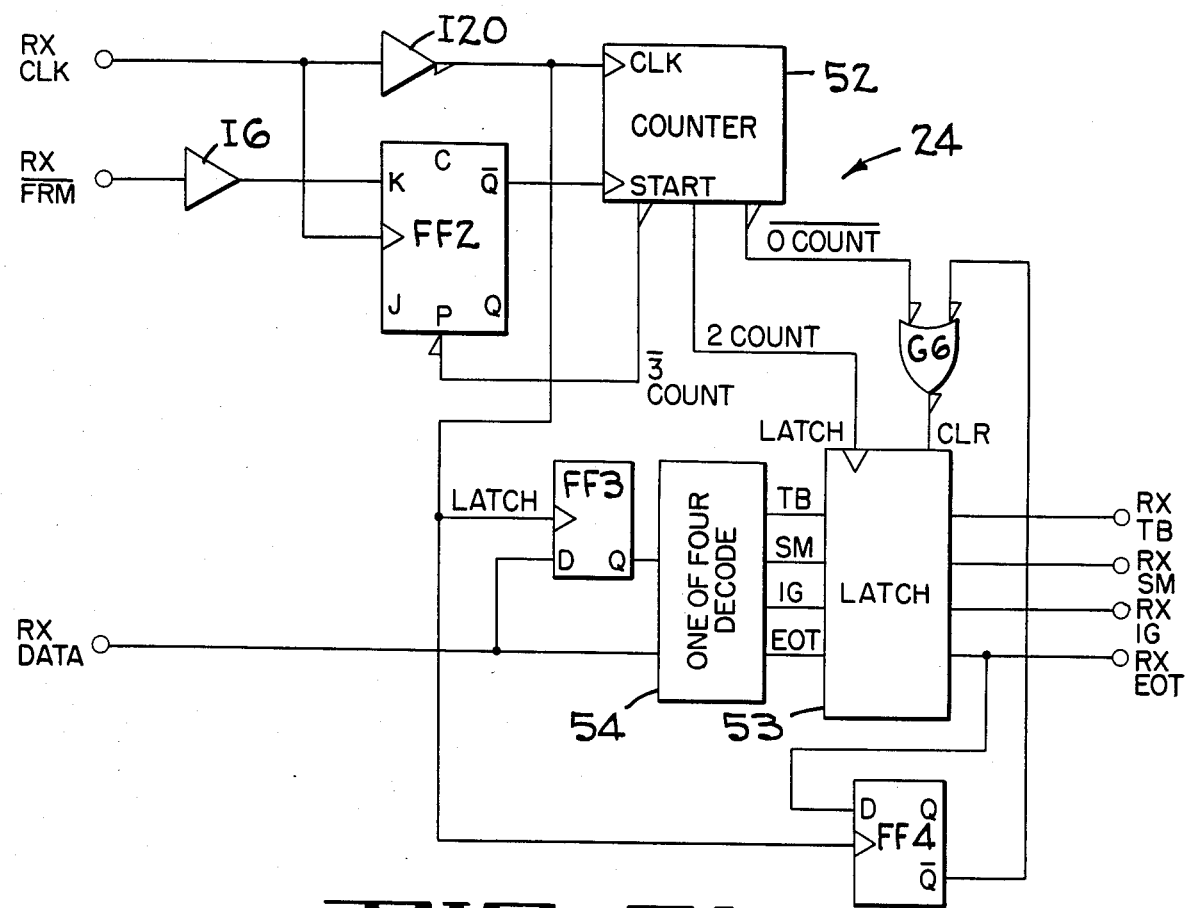
FIG_21
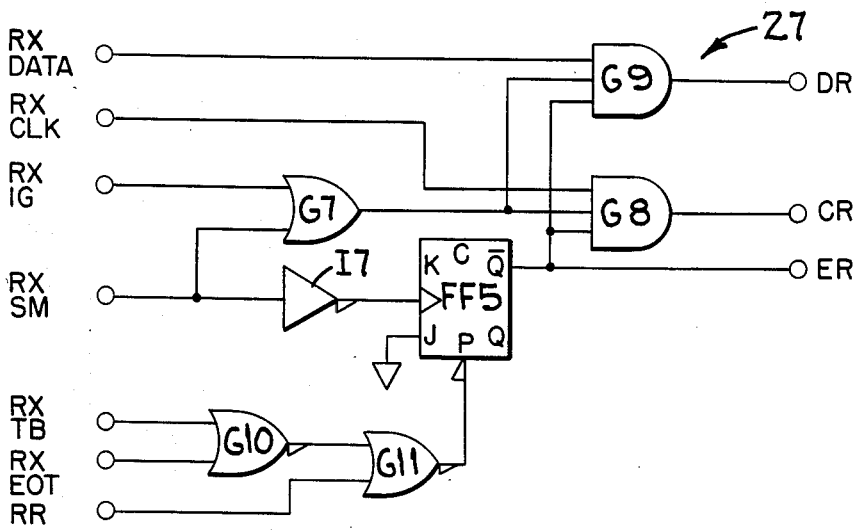
FIG_22

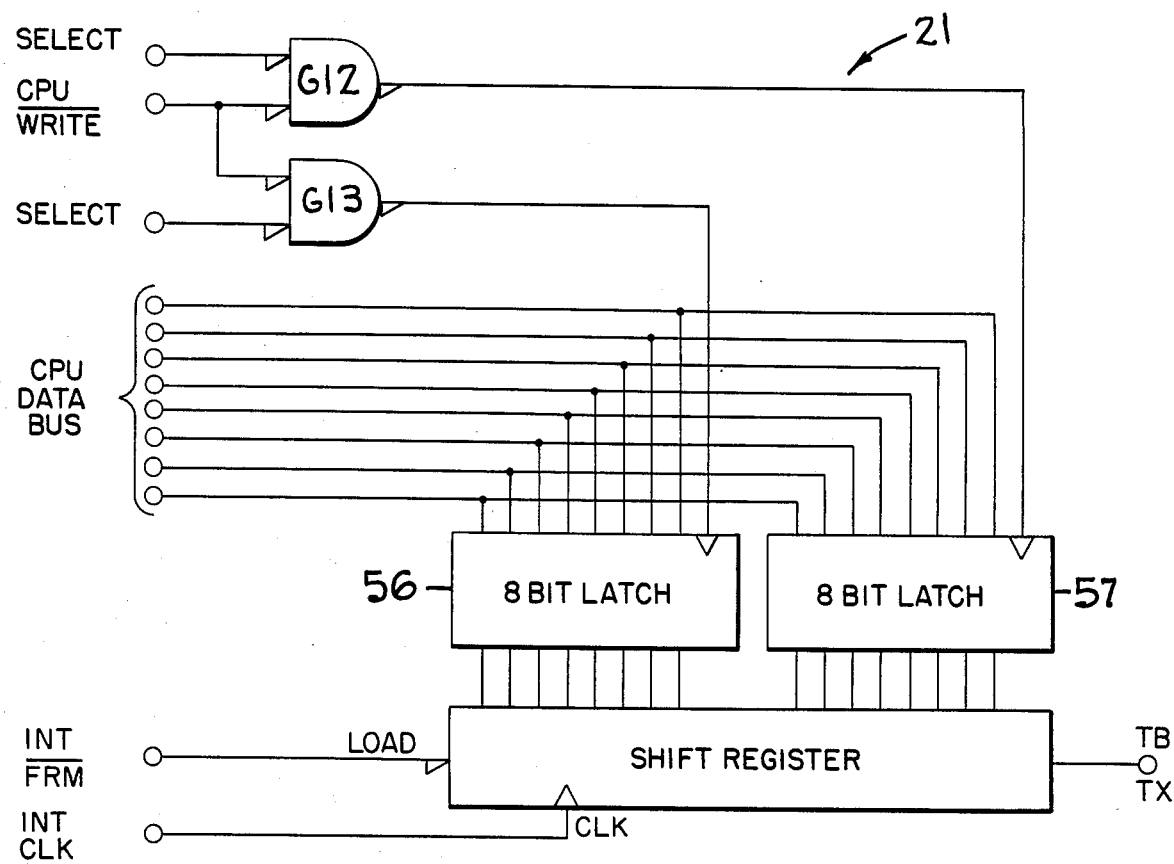
FIG_23
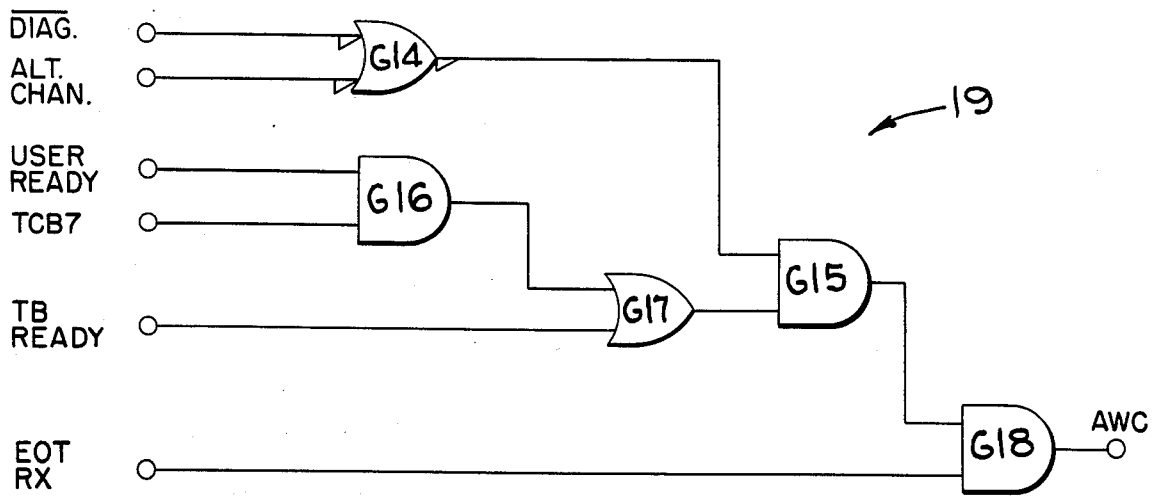
FIG_24

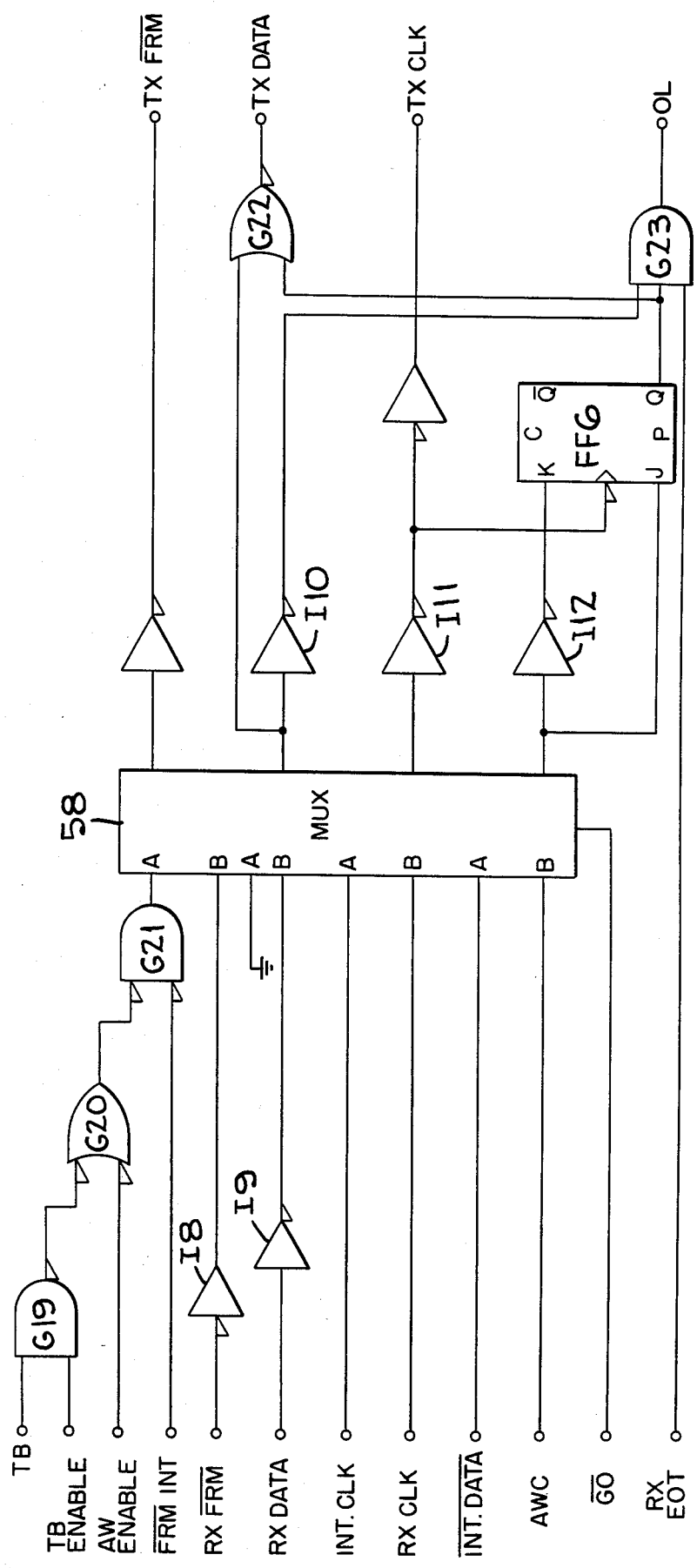
FIG_25A

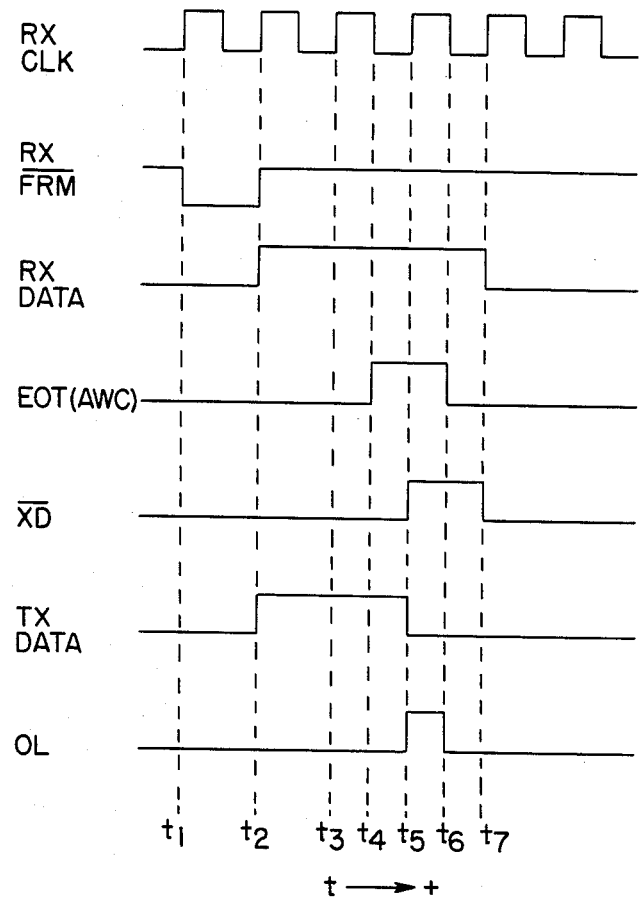
FIG_25B
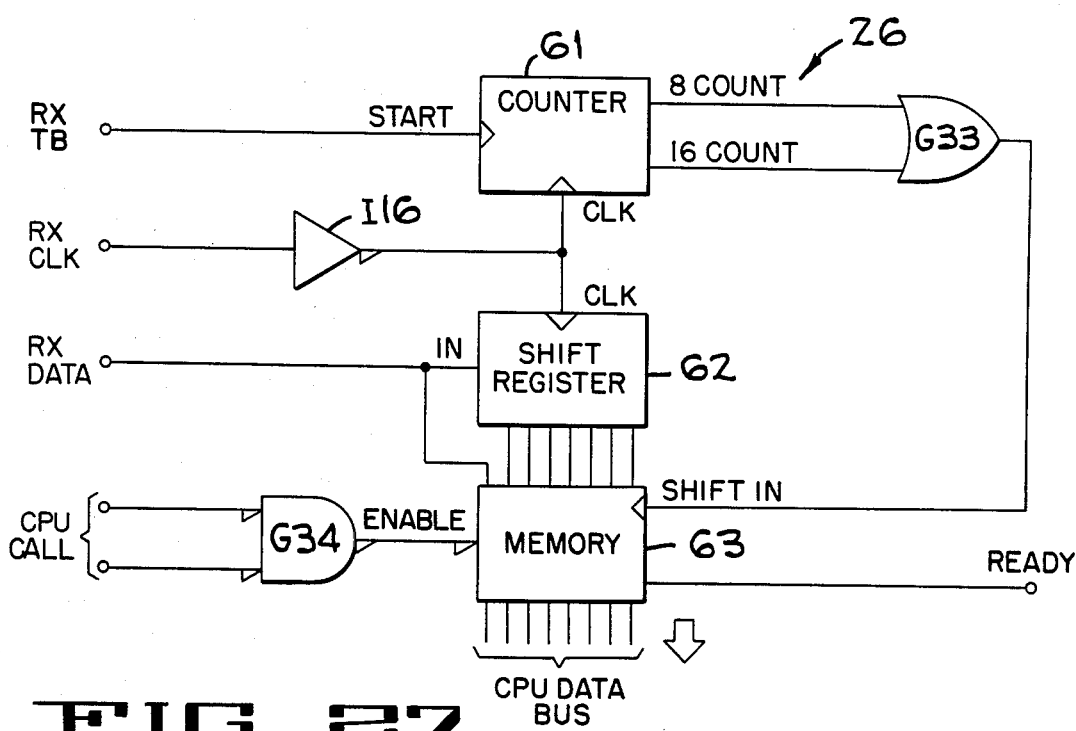
FIG_27

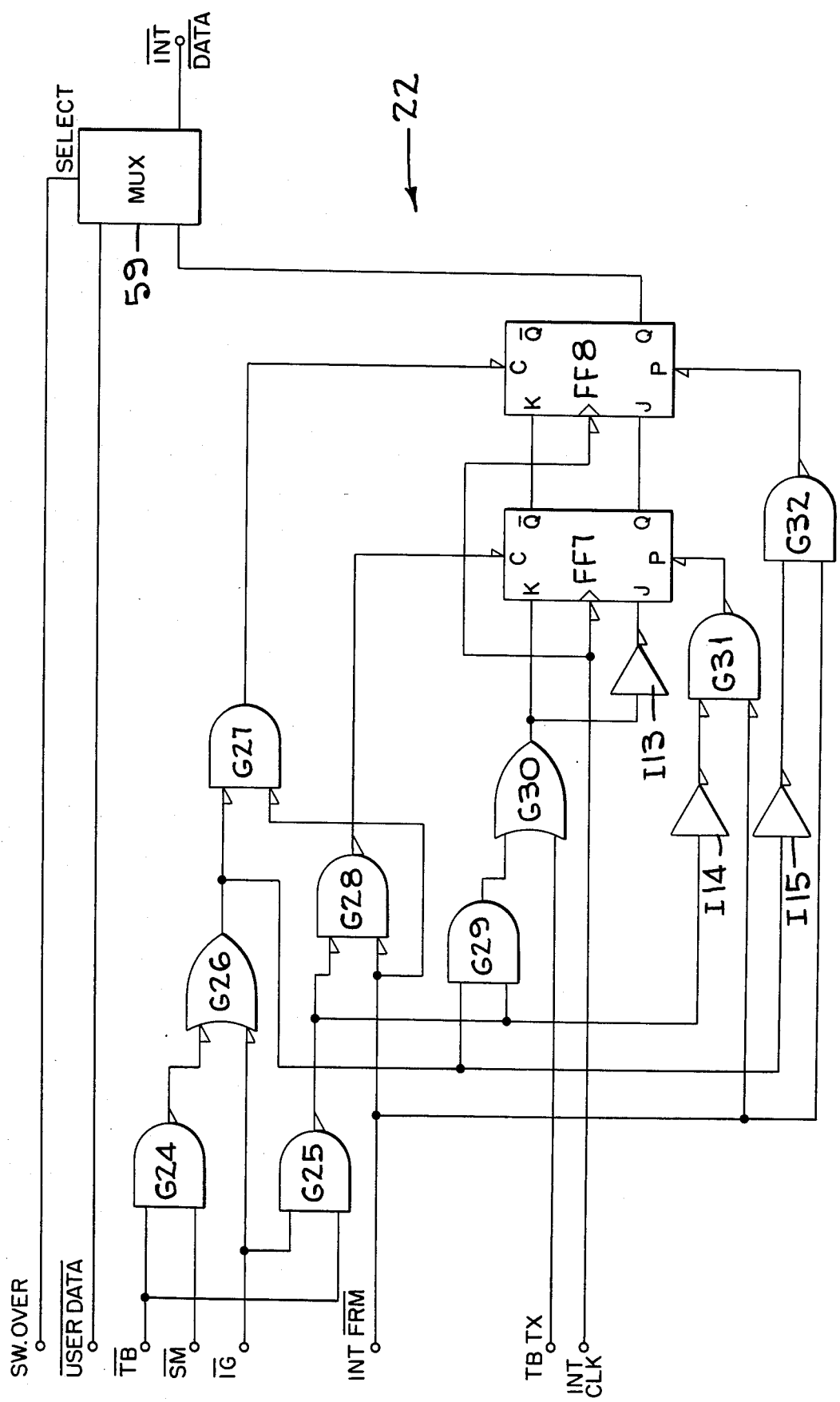
FIG_26

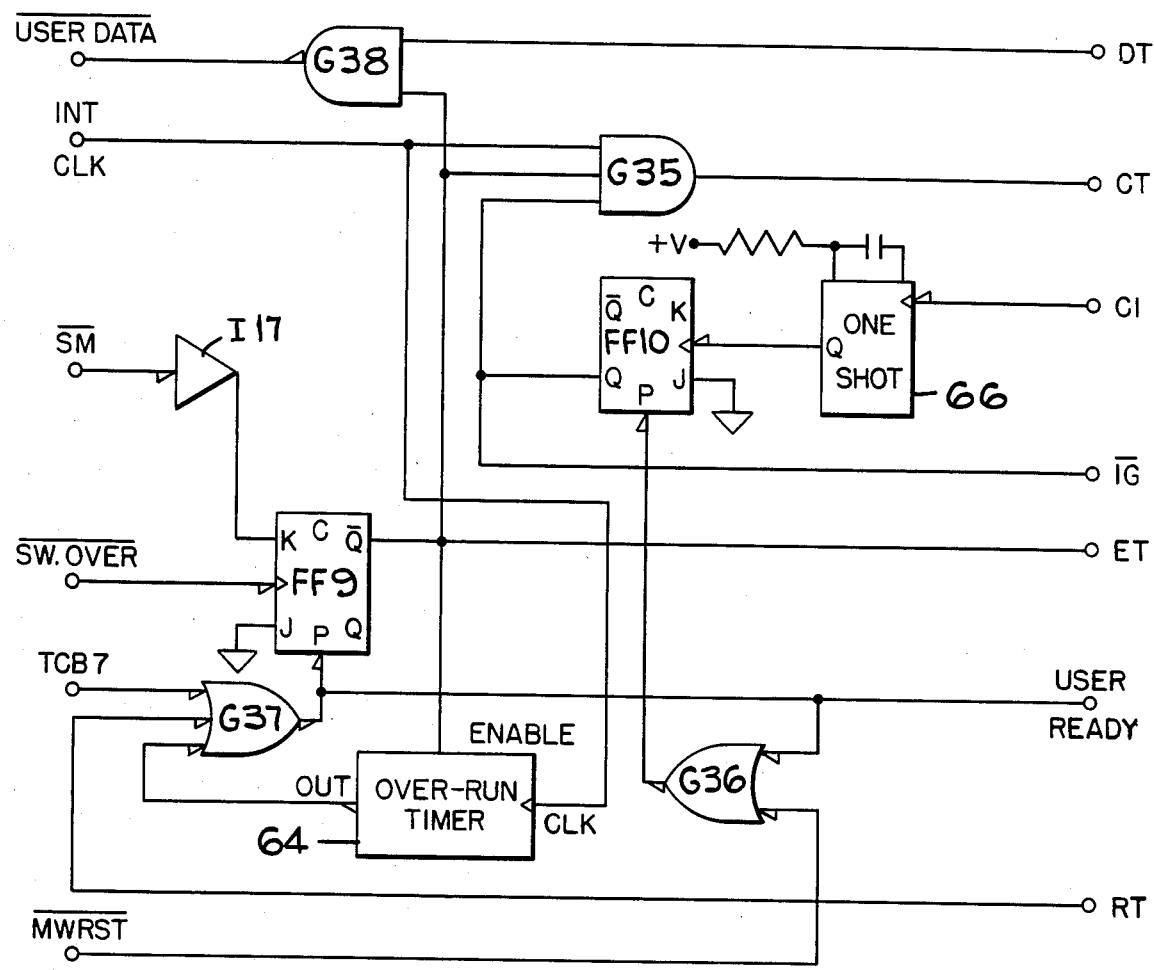
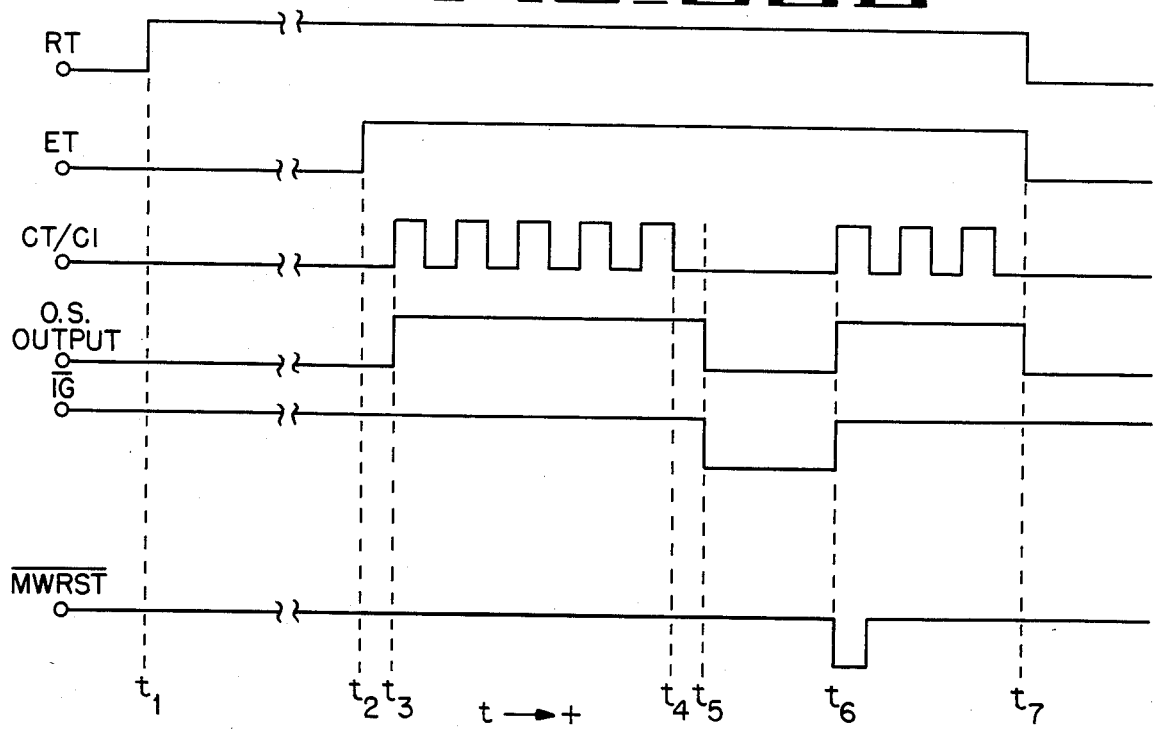
FIG_28A
FIG_28B

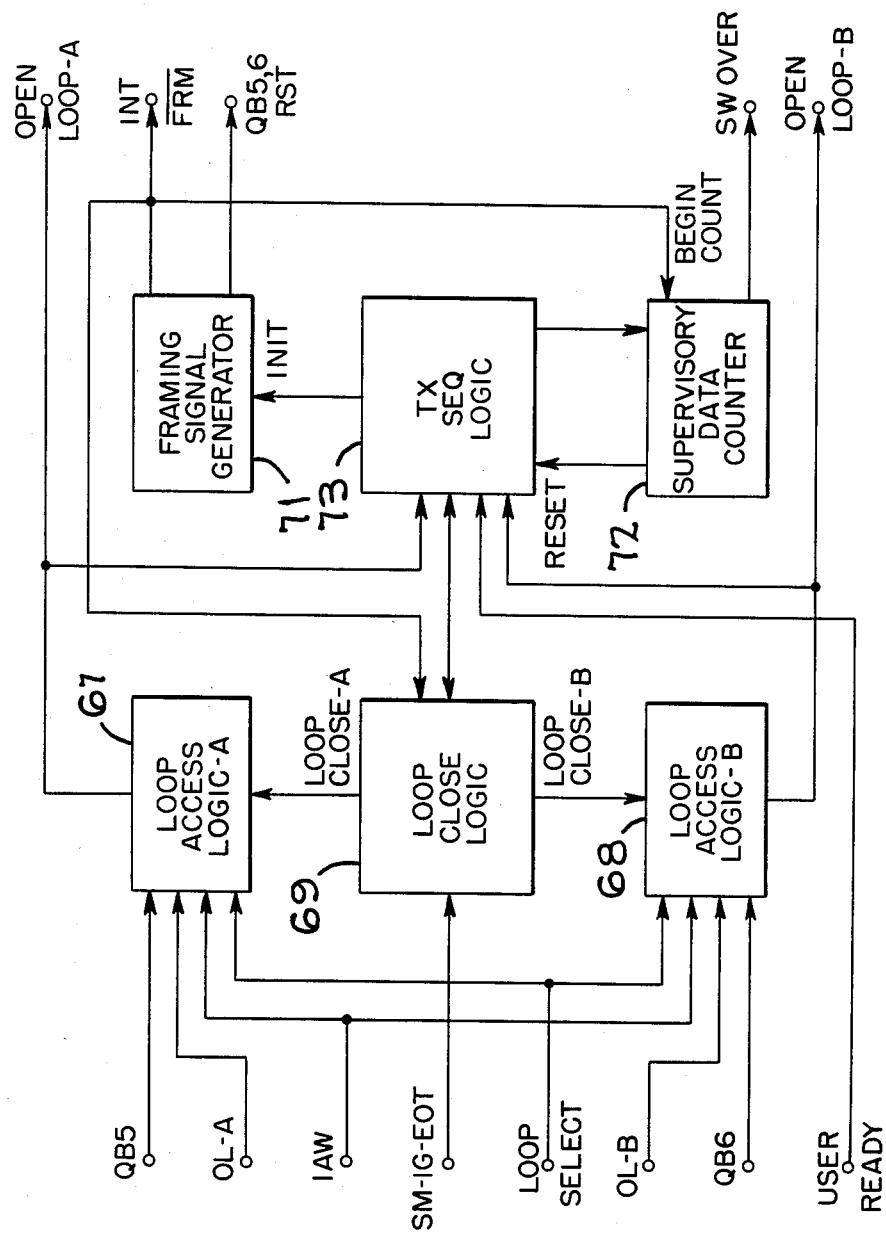
FIG_29

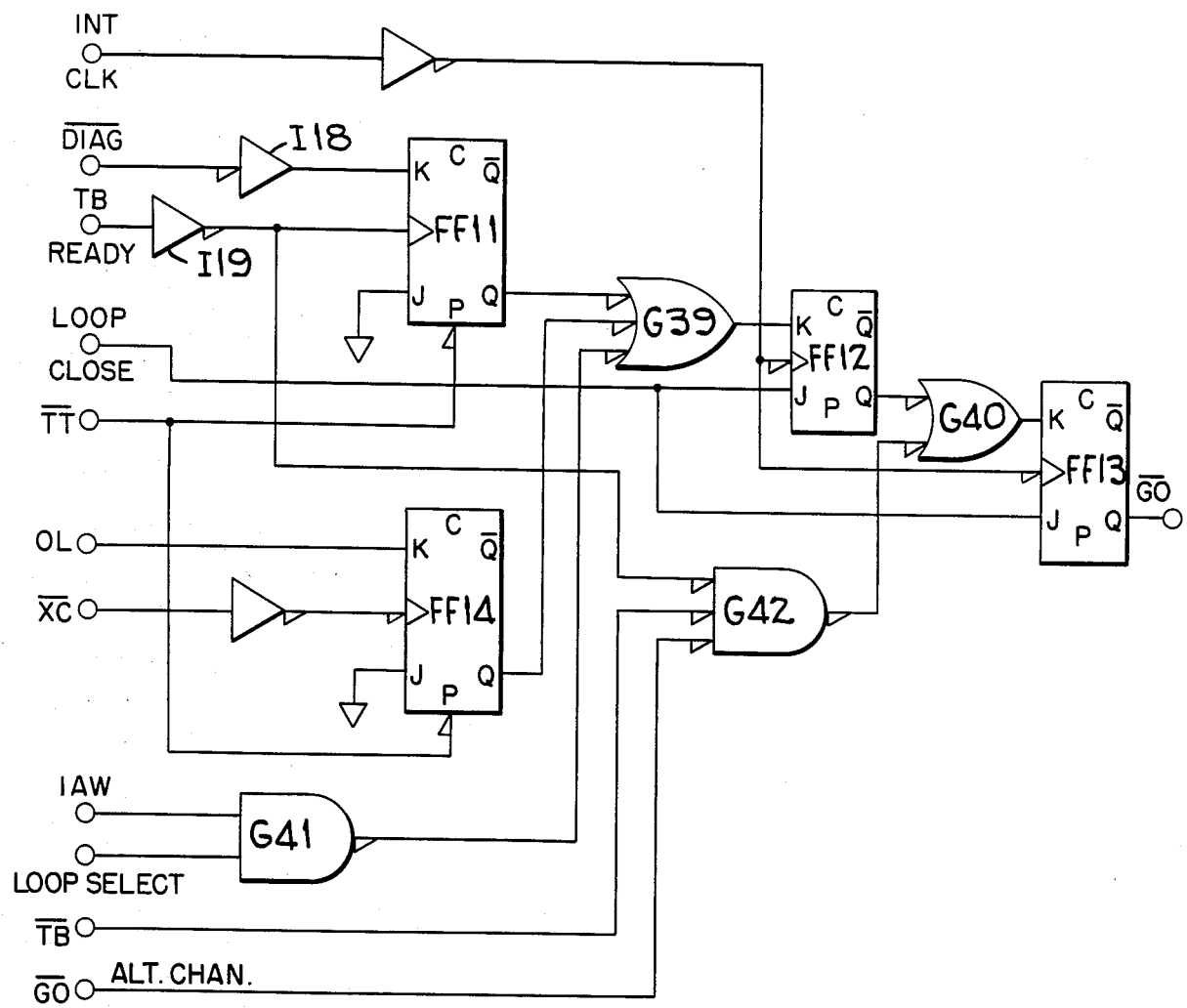
FIG_30

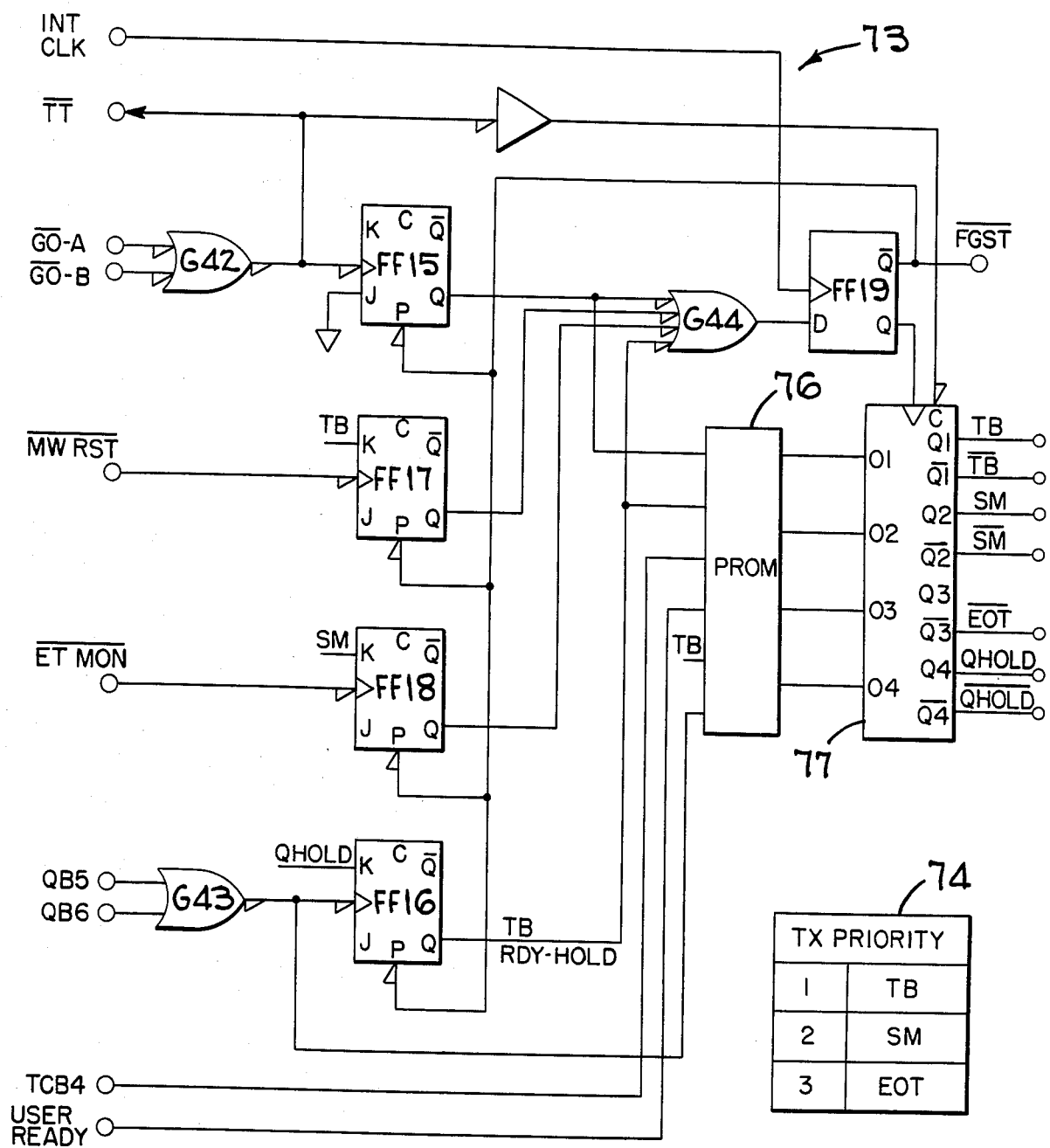
FIG_31

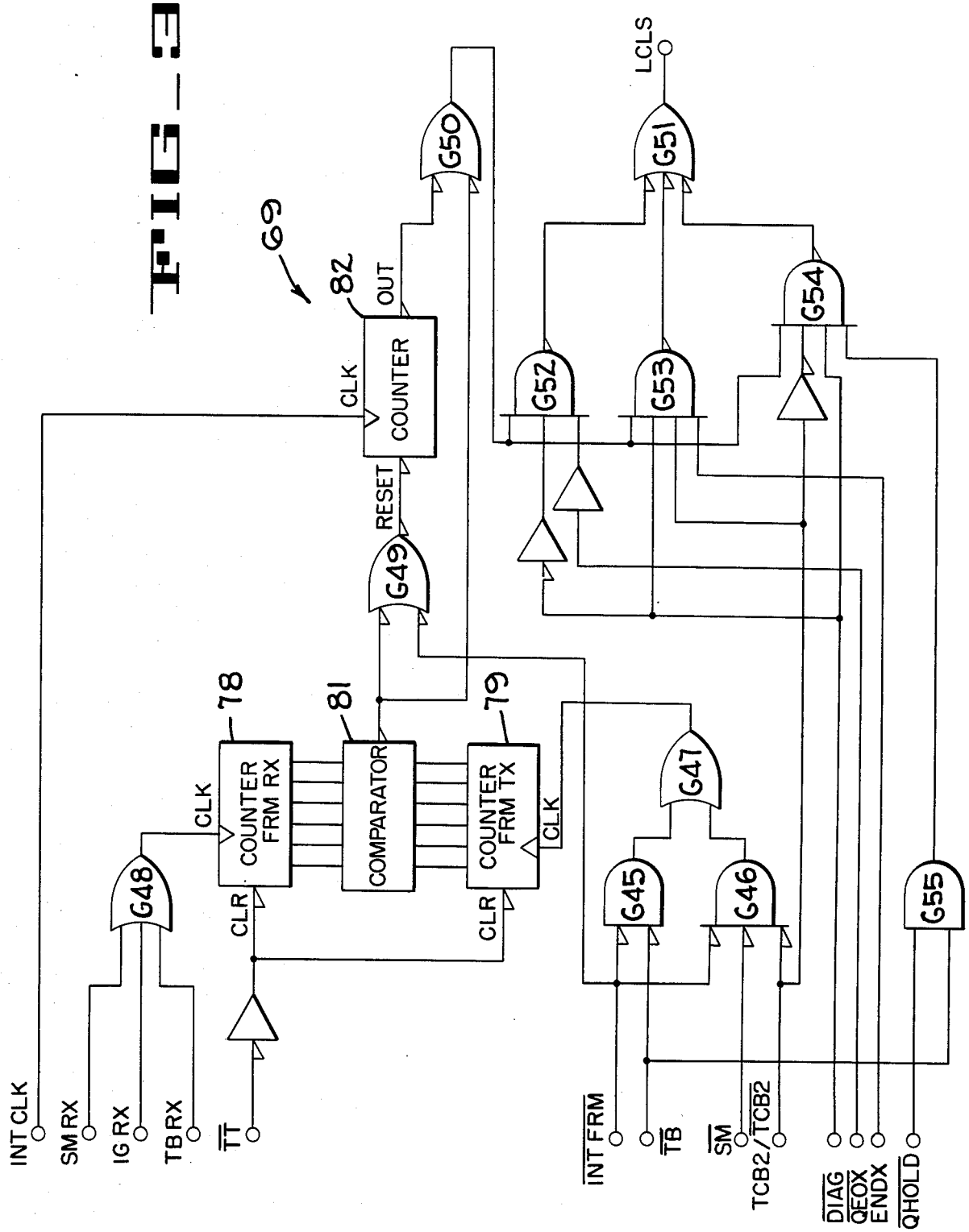
FIG_32

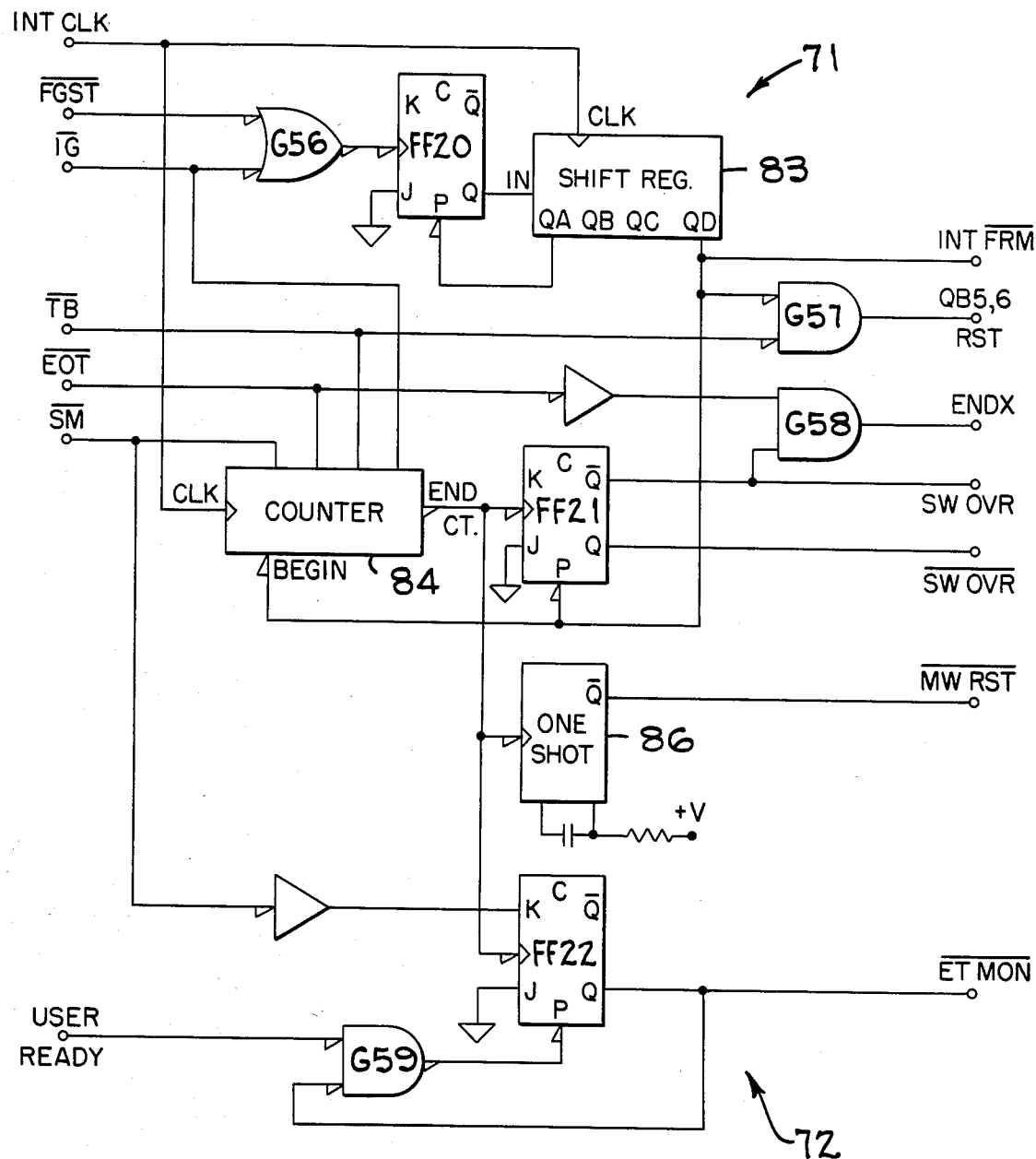
FIG_33

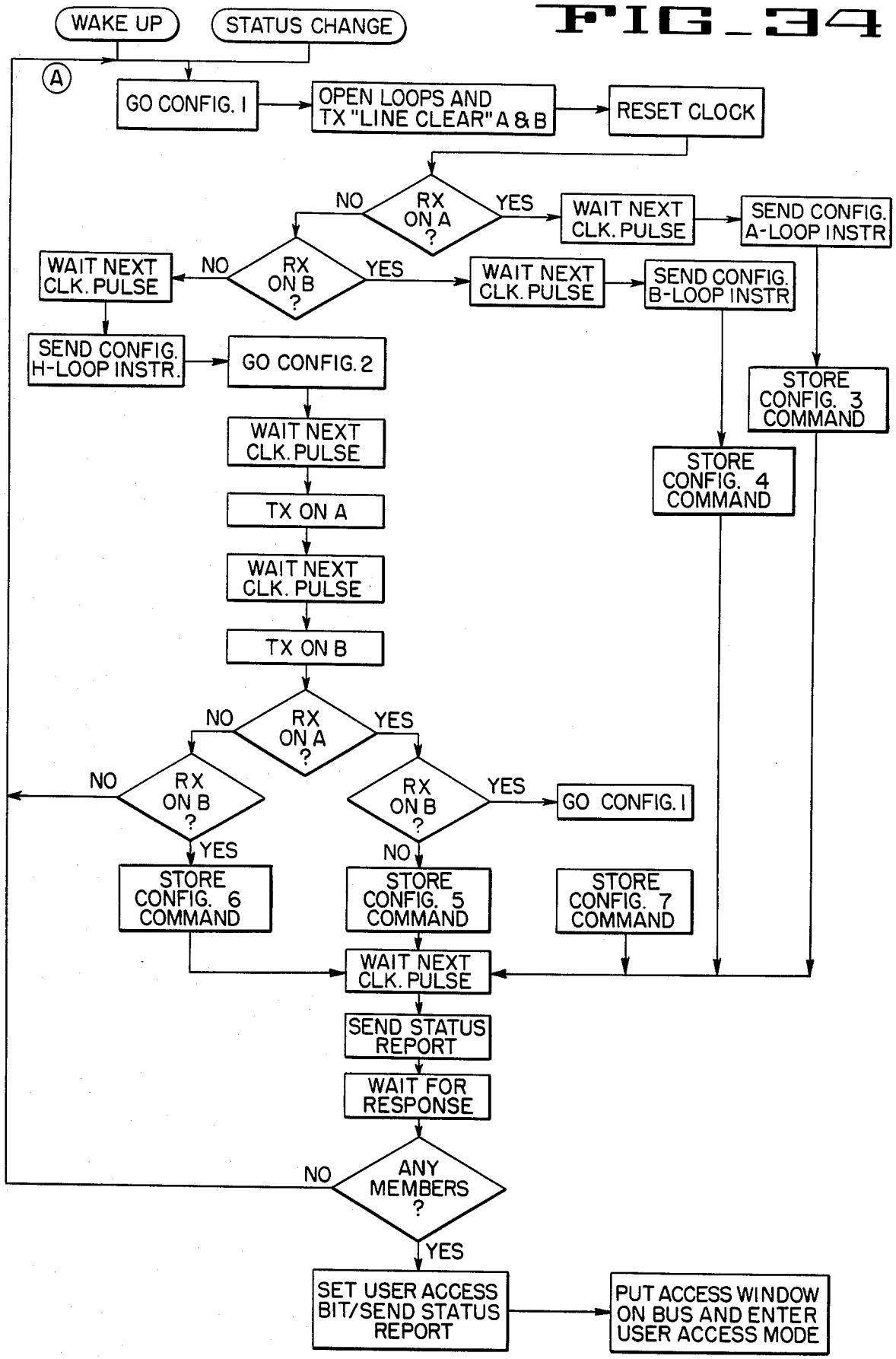
FIG_34

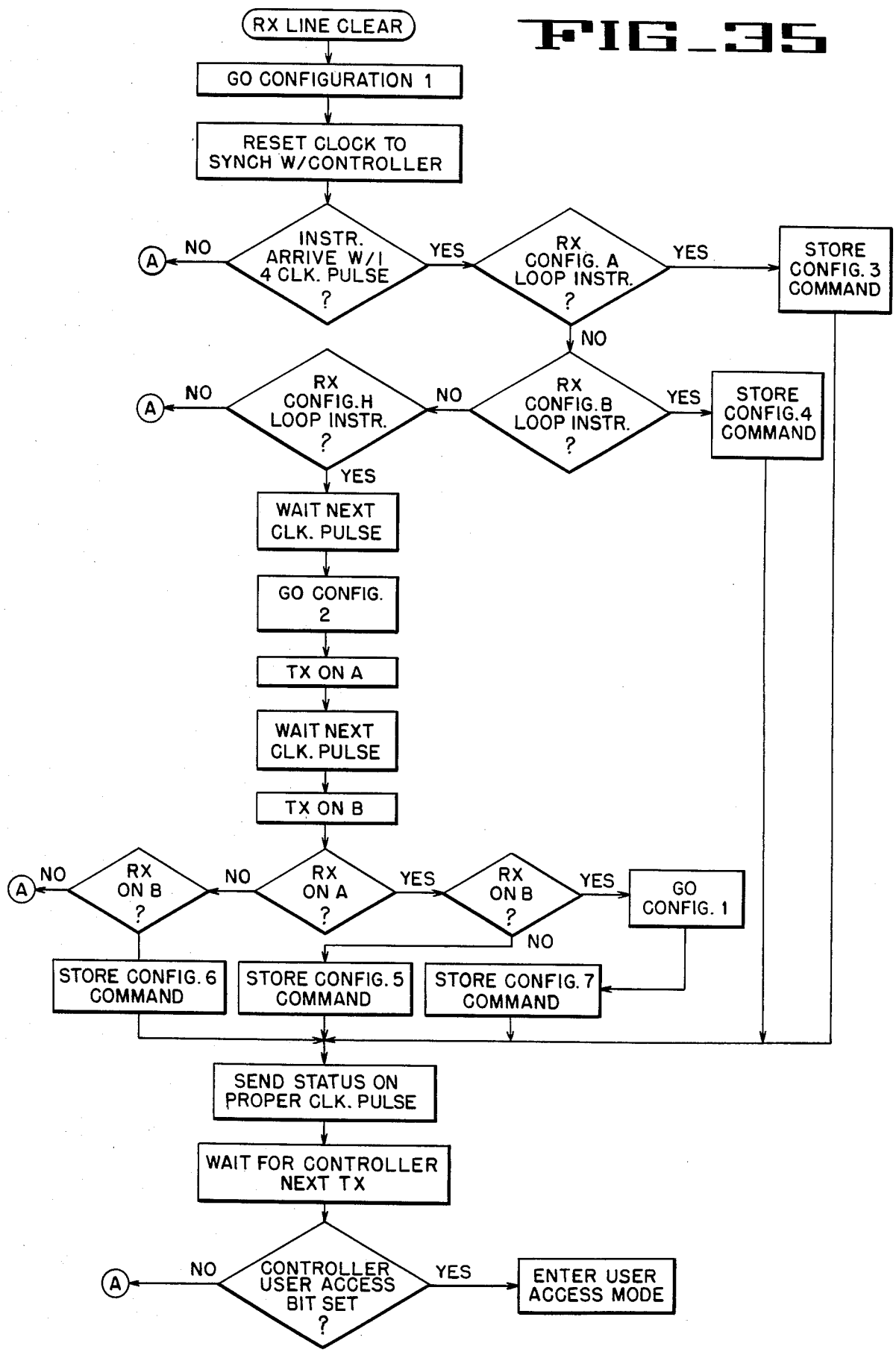
FIG_35

ASYNCHRONOUS DATA BUS SYSTEM

BACKGROUND OF THE INVENTION

1. Field of the Invention

The present invention pertains to data bus systems for transmitting information between a plurality of interconnected and serially arranged terminals, and more particularly it pertains to data buses of the active type wherein each terminal receives data from a data source or from another terminal and transmits or retransmits data to a different terminal in the system.

2. Description of the Prior Art

The data dus concept of placing all data onto a single transmission line, or set of transmission lines and then receiving the data along the line as needed is presently being developed for distributing data throughout complex communication systems and over large distances; for example on board ship. This concept is intended to replace the conventional data distribution systems wherein all receivers and transmitters are directly wired into a central computer or processing unit, or wherein a central switchboard functions to distribute messages from and to the various data sources and data sinks. The conventional data distribution systems require enormous amounts of cabling stretching over long distances wherein such systems become costly to install, difficult to repair, and inflexible to change.

There are two basic types of data buses which are used in large scale data distribution at the present time, namely, passive buses and active buses. The more typical passive bus system employs transmitters, or drivers, and receivers that couple passively to a transmission line. The active data bus, on the other hand, employs active terminals, each of which receives data from one terminal and then retransmits the data or transmits new data to another terminal in the system. Each link between terminals in an active bus system therefore comprises a complete transmission path, whereas in the passive data bus systems the entire length of the transmission line comprises a single transmission path.

Passive bus systems have a number of disadvantages. For example a passive transmission line is terminated in its characteristic inpedance at each end thereof to absorb the data signal and prevent reflections back along the line. The receivers, which tap into the line, must not load the line and will therefore have high impedance inputs. To prevent the transmitters, or drivers, from loading the line, they must be removed from the line when not introducing data, thereby requiring the rapid switching of power sources into and out of the transmission line.

A variation of the foregoing passive system is presently in use wherein all bus drivers and receivers communicate with the main bus line through separate transmission lines called "stubs". Since each stub presents a reactive discontinuity to the main bus line, even when its driver is "off-line", reflections are introduced at each point that a stub joins the main bus line. The stubs are therefore caused to communicate with the bus line through attenuating "lossy couplers" to reduce the reflections to an acceptable level. At low data rates this type of system may perform acceptably, but when the data rate reaches the megabit range or higher, the bit length (defined as the propagating length of a single bit on the data bus line) will oftentimes be less than the bus line length. Consequently, great effort is required to prevent the refections on the line from causing errors in the transmitted data. Furthermore, the large attenuation introduced by the couplers for minimizing the reflections on the line create other problems because of the relatively high driver output level required and the relatively low level of input at the receivers due to the large attenuations. The receiver stubs therefore tend to be susceptible to the pickup of cross-talk and other forms of electromagnetic interference from nearby machinery, electronic equipment, or power cables. The receivers also operate at a very disadvantageous signal to noise ratio at their inputs and therefore require fairly sophisticated hardware in order to extract signals from noise with acceptable accuracy.

Active data bus systems are most commonly arranged in a closed loop or ring structure. A terminal introducing locally-generated data into the system "accesses" the bus by opening the data path at the terminal and transmitting said data to the next terminal in the loop sequence. This terminal, in turn, relays its received data to the next terminal in the sequence, and so on, around the loop. The data is ultimately returned to the terminal of origination where it is removed from the data bus upon encountering the opened data path. Such an active data loop is characterized by the desirable property that all data, regardless of its terminal of origin, is available at every terminal in the system. However, the practical implementation of an active data loop presents several formidable problems.

First, with an active loop structure, means must be provided to coordinate the actions of the various multiplex terminals so that no more than one terminal introduces data into the loop at any given time. If two or more terminals attempt to access the bus simultaneously, the data path will be opened at more than one point and data will be prevented from returning to its terminal of origin. Prior art solutions to this problem have involved either assigning "time slots" to the various terminals or else passing a "token" around the loop to convey permission to access the bus. The first solution requires a "system controller" and results in inefficient utilization of bus time when the data is being generated by users at random times. The second solution, while being more efficient, has heretofore required that appreciable delay be introduced at each terminal to permit the "token" to be recognized, acted upon, and/or modified before being retransmitted around the loop.

A second problem with an active loop is the problem of re-closing the data path at an optimum time after introducing data to the system. If the data path is closed too soon, a portion of the data that has traversed the loop will be retransmitted by the originating terminal and may be ambiguously interpreted by other terminals. If the data path is not closed soon enough, new data being introduced by a second terminal may be inadvertently impeded and thus prevented from completely traversing the loop. Prior art solutions to this problem have generally employed timers to close the data path at a fixed time interval after the data message has been introduced. However, because the total loop delay is a variable quantity that depends upon the current system configuration, such prior art solutions have often further relied on introducing "dead time" before and/or after each data message to insure that the above described difficulties are avoided. Such "dead time" can seriously degrade system efficiency.

A third problem with an active loop is the problem of maintaining high reliability throughout the entire system. Since each terminal serves as a repeater when not introducing original data to the bus, the failure of a single terminal or of a single segment of transmission line between terminals will seriously impede the flow of data and may cause the entire communication system to fail. For data buses employed in certain applications, such a failure could have disastrous consequences. Prior art active data loops have not adequately dealt with this problem.

SUMMARY OF THE INVENTION

Disclosed herein is an asynchronous data communication system wherein a plurality of system user data sources provide data at random intervals and of random length for user data sinks and wherein system dead time is minimized. A plurality of multiplex terminals are in communication with the various ones of the system user data sources and sinks. A transmitter and a receiver is located in each of the multiplex terminals. A message conveying path communicates the transmitter in one of the terminals with the receiver in another of the terminals so that the path describes a continuous loop extending from and returning to each of the terminals. Means is provided in each of the multiplex terminals for accepting data from the receiver and for providing the data to one of the system user data sinks in communication with one of the terminals. Means is also provided in each of the terminals for transferring data to the transmitter from one of the system user data sources in communication with the terminal. Means is included in each of the multiplex terminals for detecting both transmission initiation and transmission termination by a user data source. Means is provided for generating an access window signal in response to a transmission termination, wherein the access window signal is coupled to the transmitter. Each terminal includes an access window capture circuit as part of means for controlling the terminal to assume a transmit access configuration when said access window signal is captured, so that locally generated data may be transmitted thereby from a user data source in communication therewith, and to operate in a relay configuration when said access window is not captured, so that data is relayed from the receiver to the transmitter for retransmittal along the path to a user data sink in communication with another of the multiplex terminals.

The invention further relates to a data communications system which operates to service a number of users. A plurality of multiplex terminals each service different ones of the users. First and second pairs of message conveying paths extend in first and second directions respectively from each of the multiplex terminals whereby the plurality of terminals may be connected serially by redundant conveying paths to form parallel continuous loops. Means is included in each of the terminals for transmitting data along one of the first pair of conveying paths in one direction and along one of the second pair of conveying paths in the other direction. Means is included in each of the terminals for receiving data from the other of said first and second pairs of conveying paths. Each of the multiplex terminals includes a terminal control processor together with first means coupled to the processor for disposing the terminal alternatively in a diagnostic operational mode and a user access operational mode. Second means is coupled to the processor for configuring the terminal alternatively in a relay configuration and a transmit access configuration. The first means which is coupled to the processor is responsive to system status and configures the terminal in the diagnostic operational mode in response to predetermined system and terminal conditions wherein user data is disabled and the processor communicates with like processors in others of the plurality of terminals. The first means coupled to the processor includes means for selecting the means for transmitting and the means for receiving to assume a condition wherein maximum available system communications capability is obtained. The first means coupled to the processor then operates to dispose the terminal in the user access operational mode upon indication that the maximum available system capability condition is set. Thereafter the terminal is in asynchronous communication with others of the plurality of terminals and communicated data from user data sources and to user data sinks.

In accordance with another aspect of the invention the transmitter and receiver in each terminal are dual transmitters and receivers and the message component path is a dual path wherein each path extends from a separate transmitter in one multiplex terminal to a separate receiver in another multiplex terminal. As a consequence the continuous loop exists as a pair of parallel loops serially connecting the multiplex terminals. The means for controlling includes means for alternatively configuring the plurality of multiplex terminals either all in a diagnostic operational mode or all in a user access operational mode. The system is capable of configuring the most desirable configuration while in the diagnostic operational mode and each terminal is capable of being controlled to a relay configuration or a transmit access configuration. The system is configured in the user access operational mode after the most desirable system configuration is obtained, and each terminal is thereafter capable of operating either in the relay or the transmit access configuration sub-mode. The terminals include means for communicating with one another during either configuration mode and also include means for providing a system access signal on the transmission path at the termination of a data transmission, whereby each multiplex terminal in sequence in the continuous loop is apprised that the system is now available for data transmission.

BRIEF DESCRIPTION OF THE DRAWINGS

FIG. 1 is a block diagram of a four terminal data bus system utilizing the principles of the present invention.

FIG. 2 is a block diagram of one of the multiplex terminals and associated users from FIG. 1.

FIG. 3 is a detailed block diagram of one of the multiplex terminals used in the system of FIG. 1.

FIG. 4 is a timing diagram showing the terminal broadcast format utilized in the present invention.

FIG. 5 is a timing diagram showing the start of message format utilized in the present invention.

FIG. 6 is a timing diagram showing the intramessage gap format utilized in the present invention.

FIG. 7 is a timing diagram showing the end of transmission format utilized in the present invention.

FIG. 8 is a timing diagram showing the end of transmission format after access window capture as it appears in the present invention.

FIG. 9 is a block diagram of another embodiment of the system of the present invention wherein redundant closed loop transmission paths are included.

FIG. 10 is a block diagram showing the configuration of the multiplex terminal used in the system of FIG. 9 in the diagnostic mode in the complete loop configuration.

FIG. 11 is a block diagram of the multiplex terminal used in the system of FIG. 9 in the diagnostic mode configured in the hybrid loop configuration.

FIG. 12 is a block diagram of the multiplex terminal used in the system of FIG. 9 in the user access mode in the A loop configuration.

FIG. 13 is a block diagram of the multiplex terminal used in the system of FIG. 9 in the user access mode in the B loop configuration.

FIG. 14 is a block diagram of the multiplex terminal used in the system of FIG. 9 in the user access mode in the A-end configuration.

FIG. 15 is a block diagram of the multiplex terminal used in the system of FIG. 9 in the user access mode in the B-end configuration.

FIG. 16 is a block diagram of the multiplex terminal used in the system of FIG. 9 in the user access mode in the hybrid loop interior configuration.

FIG. 17 is a block diagram of a portion of the system of FIG. 9 wherein the multiplex terminals are in the configuration of FIG. 11.

FIG. 18 is a detailed block diagram of one of the multiplex terminals used in the system of FIG. 9.

FIG. 19 is a block diagram of a transmit/receive module included in the multiplex terminal of FIG. 18.

FIG. 20A is a schematic diagram of the terminal control port in the terminal of FIG. 18.

FIG. 20B is a schematic diagram of the terminal status port in the terminal of FIG. 18.

FIG. 21 is a schematic diagram of the function decoders in the terminal of FIG. 18.

FIG. 22 is a schematic diagram of the receiver user interface logic in the terminal of FIG. 18.

FIG. 23 is a schematic diagram of the TB transmit registers in the terminal of FIG. 18.

FIG. 24 is a schematic diagram of the access window capture logic circuits in the terminal in FIG. 18.

FIG. 25A is a schematic diagram of the relay/access multiplexer logic circuits in the terminal of FIG. 18.

FIG. 25B is a timing diagram of the signals in the circuit of FIG. 25A.

FIG. 26 is a schematic diagram of the user/supervisory data multiplexers in the terminal of FIG. 18.

FIG. 27 is a schematic diagram of the TB receive registers in the terminal of FIG. 18.

FIG. 28A is a schematic diagram of the transmit user interface logic in the terminal of FIG. 18.

FIG. 28B is a timing diagram showing the signals in the circuitry of FIG. 28A.

FIG. 29 is a block diagram of the transmit terminal logic unit in the terminal of FIG. 18.

FIG. 30 is a schematic diagram of the loop acces logic circuits of FIG. 29.

FIG. 31 is a schematic diagram of the transmit sequence logic circuit of FIG. 29.

FIG. 32 is a schematic diagram of the loop close logic circuit of FIG. 29.

FIG. 33 is a schematic diagram of the frame signal generator and the supervisory data counter logic circuits of FIG. 29.

FIG. 34 is a flow chart for a multiplex terminal of FIG. 18 operating as a diagnostic controller.

FIG. 35 is a flow chart for the multiplex terminal of FIG. 18 operating as a diagnostic follower.

DESCRIPTION OF THE PREFERRED EMBODIMENTS

The basic configuration of the data system of the present invention is illustrated in FIG. 1 of the drawings. Four multiplex terminals MT1 through MT4 are shown serially interconnected and distributed around a loop formed by the system. The terminals are coupled together by a message conveying path 10 comprising transmission medium segments which may, for example, be conventional RF cables or optical fiber cables. An arbitrary number of users (users 1, 2, 3 coupled to MT3 and users 4 through n coupled to MT2) may be served by each terminal. As seen in FIG. 1, USER 1 and USER n serve as both local procedures (sources) of data and local subscribers (sinks) of data while USER 2 serves only as a data source and USERs 3 and 4 serve only as data sinks. One sees, therefore, that users can be either data sources, data sinks, or both. As further seen in FIG. 1 a terminal may service no users at all (as shown by terminals MT1 and MT4, but may merely serve to retransmit data along the transmission path 10 and to communicate with the other terminals in the system until such time as users are coupled thereto.

FIG. 2 shows a simplified block diagram of an exemplary one of the multiplex terminals in the system of FIG. 1 such as MT3 of FIG. 1. One sees that the circuitry within the terminal can be divided broadly into three parts. The T/R (transmit/receive) circuitry 12 communicates with other T/R circuitry in adjacent terminals by means of modulated data signals received and transmitted over transmission medium segments 10. The T/R circuitry transfers data signals to and from Bus Control Circuitry 13. Circuitry 13 communicates with Signal Conditioning and Multiplexer Circuitry 14 which, in turn, communicates with individual data sources (USERs 1 and 2) and with individual data sinks (USERs 1 and 3).

The transmit receive module 12 may be of the type disclosed in U.S. Pat. No. 4,038,494, Miller et al, issued July 26, 1977. The T/R module described therein is capable of receiving a pulse coded binary digital data signal, demodulating it and transmitting separate clock, synchronizing and data signals to a local subscriber. It also is capable of receiving the pulse coded binary digital data signal, demodulating it, realigning the clock signal, and retransmitting the signal to a distant point. Moreover the T/R module may receive locally produced digital signals, modulate the signals into an appropriate digital data transmission format and transmit a signal format to a distant point. A T/R module oscillator status and a channel or cable status is also provided by the module 12 as may be seen by reference to FIG. 19 of the drawings. Further details of the construction and operation of the T/R module may be had by reference to the aforementioned U.S. patent.

With reference now to the block diagram of FIG. 3 a description of the multiplex terminal in the system of FIG. 1 wherein the message transmission path 10 is a single path, will be described. For clarity, data signal paths are shown as solid lines in FIG. 3 while control signals are indicated by broken lines. The correspondence between elements of the simplified block diagram of FIG. 2 and the more detailed block diagram of FIG. 3 is as follows.

The T/R (transmit/receive) circuitry 12 of FIG. 2 comprises a separate data receiver (RX) and data transmitter (TX) in FIG. 3. These units communicate with like data transmitters and data receivers in adjacent multiplex terminals by means of appropriately modulated data signals unidirectionally conducted over transmission medium segments 10. Bus Control circuitry 13 of FIG. 2 comprises CPU 11, TLU TX Logic 17, Terminal Control (port) 18, Access Window Capture Logic 19, and Terminal Status (port) 20 of FIG. 3. Signal Conditioning and Multiplexing Circuitry 14 of FIG. 2 comprises Relay/Access Multiplexer 16, Terminal Broadcast TX Register 21, User/Supervisory Data Multiplexer 22, TX User Interface Logic 23, FXN (Function) Decoder 24, Terminal Broadcast RX Register 26 and User Interface Logic 27 of FIG. 3.

The block shown generally as CPU 11 of FIG. 3 comprises a terminal control microprocessor along with its associated programmed ROM and RAM. As seen in FIG. 3 the CPU 11 controls certain operations of the multiplex terminal through the terminal control 18. It further monitors certain terminal conditions through the terminal status 20. The CPU also provides communication for the terminal with like CPU's in the other terminals on the bus through the terminal broadcast register 21. It receives information from CPU's at terminals on the bus, including its own terminal broadcasts (thereby demonstrating loop continuity), through the terminal broadcast receive register 26. Relay/Access Multiplexer 16 in FIG. 3 receives clock, data, and frame signals from either the data receiver (RX) output of T/R module 12 (by way of access window capture logic 19 in this embodiment) or from the output of User/Supervisory Data Multiplexer 22. Relay/Access Multiplexer 16, in turn, transfers the three signals to the data transmitter (TX) input of T/R module 12. Accordingly, the Relay/Access Multiplexer can exist in either of two configurations. In a relay configuration, clock, data, and frame signals are routed from the RX output to the TX input of T/R module 12 so that the terminal serves as a repeater. The data is also taken into the terminal for dissemination within the terminal as well as to addressed user data sinks. Under the influence of a control signal (GO) outputed by TLU TX Logic 17, the Relay/Access Multiplexer 16 assumes a transmit access configuration wherein locally generated signals are routed from the User/Supervisory Data Multiplexer 22 through Relay/Access Multiplexer 16 to the TX input of T/R unit 12. After the locally generated signals have been transferred, TLU TX Logic 17 returns the Relay/Access Multiplexer 16 to a relay configuration so that the terminal can again serve as a repeater. The precise means whereby Relay/Access Multiplexer 16 is efficiently controlled by TLU TX Logic 17 to assume a transmit access configuration and to subsequently return to a relay configuration without interferring with transmissions of other terminals and without introducing extraneous "dead time" is disclosed fully hereinafter.

It should be noted that the data transmitted along the communication path 10 is in coded form (i.e., Manchester Code) as discussed in the aforementioned U.S. Pat. No. 4,038,494. The lines between the receiver portion of the T/R module 12 and the multiplex terminal and the lines between the transmitter portion of the T/R module and the multiplex terminal are each three in number, carrying a clock signal, a framing signal and data signals. The signals on the terminal side of the T/R module appear as in FIGS. 4-8 while the transmission on the communication path itself is in the coded version of the clock, framing and data signals.

FIG. 3 discloses that the RX output of T/R module 12 is distributed to Access Window Capture Logic 19, FXN (Function) Decoder 24, Terminal Broadcast Register 26, and RX User Interface Logic 27 in addition to Relay/Access Multiplexer 16. Consequently, the first four elements named continuously receive clock, data and frame signals regardless of the configurational state of the last named element. Access Window Capture Logic 19 is instrumental in controlling Relay/Access Multiplexer 16 and its exact function is disclosed hereinafter. As stated above, Terminal Broadcast RX Register 26 serves as a receptacle for terminal broadcast messages prior to their being imputed by CPU 11. RX Interface Logic 27 serves to transfer user-generated messages to appropriate user data sinks interfaced to the multiplex terminal. FXN Decoder 24 is responsive to a function code (FC) comprising the two data signal bits immediately following every frame signal as hereinafter described. The FXN Decoder 24 provides four control signal outputs denoted TB (Terminal Broadcast), SM (Start of Message), IG (Intermessage Gap), and EOT (End of Transmission).

All messages passed on the bus of the preferred embodiment disclosed herein take one of four forms. The form of the message is identified by the above-mentioned two bit function codes. The first of the four message formats, the terminal broadcasts (TB) is employed in both diagnostic and user access mode operation and provides a means for the CPU's 11 in each multiplex terminal to intercommunicate. FIG. 4 is a timing diagram showing the TB message format along with the clock signal 28 to which all of the messages are synchronized. The clock signal and therefore the data rate in this invention is preferably ten megabits per second. A framing signal 29 always precedes the function code and serves to indicate to receivers that one of the four message formats is about to arrive. A framing signal may be seen to have a duration of one clock cycle. A sixteen bit TB data stream 31 is shown which is preceded by a function code 32 for the TB message having a duration of two clock cycles. The function code for a TB message is digitally zero-zero as may be seen in FIG. 4. Accordingly, a TB control signal responsive to function code zero-zero is sent by FXN Decoder 24 to Terminal Broadcast RX Register 26 activating same to receive and store the next sixteen bits of TB data 31 from which it may subsequently be called up by CPU 11. Note that the TB control signal is also sent to RX User Interface Logic 27. This is a disabling signal that prevents the TB data from being transferred to a user data sink.

The second message format is termed a start of message format (SM), which identifies user data and is employed only during user access mode operation. The timing diagram of FIG. 5 for the SM message format includes the clock signal 28 and the framing signal 29 which performs the function recited for the TB message of FIG. 4. A message address and data stream 33 for the SM user data of FIG. 5 is seen to be of arbitrary length. The SM data stream is seen to be preceded by a function code 34 which is two clock periods in length and which is in a digital zero-one state as shown. Accordingly, an enabling signal responsive to zero-one funtion code 34 is sent by FXN Decoder 24 to RX User Interface Logic 27. The actual message 33 can be of any length, as mentioned before, and is presumed to contain address code, where appropriate, for interpretation by user data sinks. The principles of addressing messages and decoding said address codes for purposes of routing said messages to appropriate sinks are well-known and are not considered a part of the invention disclosed herein.

If a user data sink has indicated that it is ready to receive data by asserting the RR line of 27, the arrival of the SM control signal at RX User Interface Logic 27 causes the ER line to become active and further causes received clock and data signals to be transferred to the user data sink on output lines CR and DR respectively.

The third message format is illustrated in the timing diagram of FIG. 6 wherein an intramessage gap (IG) message is illustrated. The IG message format indicates a pause in transmission of user data and like the SM format is employed during user access mode operations only. The IG function code 36 is represented by a digital one-zero state as shown. A user data stream 37 follows the IG function code. The IG message serves the purpose of allowing a user to retain transmit access to the bus while time consuming operations such as register adjustments, etc., are undertaken to place the user data in position to be communicated to the multiplex terminal. Upon reception of function code one-zero, as shown at 36, a disabling IG signal is sent from FXN Decoder 24 to RX User Interface Logic 27. This signal temporarily disables transfer to user data sinks and then re-enables same to permit transfer of subsequent user data 37.

FIG. 7 is also a timing diagram showing the clock signal 28 and the framing signal 29 preceding the data portion of an end of transmission (EOT) message. The EOT format follows the last part of a user data message during user access mode operation. A function code 38 is seen preceding the EOT message wherein the function code appears as a digital one-one state. The message portion following the EOT function code consists of a single bit 39 set to a logical one state as seen in FIG. 7 which is called the access window mentioned hereinbefore. The presence of this one set bit following the EOT function code indicates to any receiving multiplex terminal that the system is available for transmission. A terminal desiring to transmit on the transmission path 10 will reset the access window bit to a zero state, by means to be hereinafter described, and transmit the EOT function code with the access window "gone" around the clock transmission loop. The terminal removing the access window from the EOT message is said to have "captured" the window. The terminal is then set up to transmit as mentioned hereinbefore by means to be described in more detail hereinafter, so that the loop is opened at the terminal. The EOT message without the access window, as shown in FIG. 8, is transmitted from terminal to terminal around the loop until it is received at the capturing terminal where the transmission is blocked.

Reception of the EOT digital one-one function code causes an EOT control signal to be sent from FXN Decoder 24 to RX Interface Logic 27 disabling same for transfer of data signals to user data sinks until such time as an SM function code is again received. Accordingly, RX User Interface Logic 27 responds to the EOT signal by disabling its CR and DR lines and bringing its ER signal to the inactive state.

In user access mode operation with locally generated data available for transmission, a data ready signal is provided to access window capture logic 19 by TLU TX logic 17. Under this condition, the arrival of an EOT control signal from FXN Decoder 24 causes Access Window Capture Logic 19 to send an AWC signal to Relay/Access MUX 16. In response to this signal, Relay/Access MUX 16 resets the access window bit to zero as data signals are routed from RX output to TX input. Thus, regardless of the binary state of the received access window bit, it is retransmitted as a zero when local data is available as is shown in FIG. 8. Note that because the EOT signal arrives before the access window bit, no data delay need be introduced to accomplish the above described action.

Simultaneously with transmission of the zero bit, Relay/Access MUX 16 examines the actual received bit. If a one, an OL signal is sent to TLU TX logic 17 signifying that an access window has been "captured". TLU TX Logic 17 responds with a GO signal which controls Relay/Access MUX 16 causing it to change from a relay configuration to a transmit access configuration on the next clock pulse.

The multiplex terminal of FIG. 3 is capable of operating in either a diagnostic operational mode or a user access operational mode. The terminal is disposed in the user access operational mode by virtue of CPU 11 outputting an appropriate control word to Terminal Control (port) 18 which so informs TLU TX Logic 17 and enables Access Window Capture Logic 19 and TX User Interface Logic 23. During the period of time that said terminal is disposed in the user access operational mode, bus access is controlled asynchronously by TLU TX Logic 17, Access Window Capture Logic 19, and Relay/Access MUX 16 without any action taken by CPU 11.

User access mode operation will now be described. The transmit user interface logic 23 is advised when a user is ready to transmit by provision of the signal RT. A user ready signal is then provided by the transmit user interface logic to the TLU transmit logic 17. The TLU transmit logic in turn provides a data ready signal to the access window capture logic 19 which is then set to capture the next available access window. When the access window is captured, the relay/access multiplexer 16 advises the TLU transmit logic 17 that the terminal has access to the communication path.

An appropriate "user select" command is next sent to the User/Supervisory Data MUX 22 by TLU TX logic 17. In response, User/Supervisory Data MUX 22 generates a frame signal followed by either an SM or IG function code and transfers same to relay/access MUX 16 and thence to TX input. Following the function code, an "Enable Interface" command is sent to TX User/Interface Logic 23. Said interface logic responds by sending an ET signal to the user data source along with a 10 Mhz transmit clock signal CT. The user date source, in turn, returns an input clock signal CI along with a transmit data signal DT in phase with it. These signals are passed through the TX User Interface Logic 23, the User/Supervisory Data MUX 22, and the relay/access MUX 16 to the TX Input for transmission.

When the user data source returns the RT line to the inactive condition, TX User Interface Logic 23 terminates the transfer of user data and clock and returns the ET line to the inactive state. TLU TX logic then commands User/Supervisory Data MUX to terminate the transmission. With no user data available, this action occurs immediately after the 16-bit TB message is transferred to TX input. Upon this command, User/Supervisory MUX 22 generates a frame signal followed by three "one" data bits in succession. This action appends the transmission with an EOT function code followed by an access window bit set to convey permission to access the bus to another terminal.

TLU TX logic 17 includes means to compare the number of transmitted frame signals and a number of received frame signals excluding the one frame signal preceding the EOT function code and AW bit in both cases. After the access window bit has been transferred to the TX input, TLU TX Logic 17 commands Relay-/Access MUX 16 to return to a relay configuration when said two numbers are equal. This insures that the last frame signal introduced, along with the EOT and AW bits which follow it, will be permitted to circulate until such time as a terminal accesses the bus. Only one frame signal will be circulating, however; the one preceding the EOT function code and access window bit. Any additional data bit that happened to be trapped on the loop will also circulate but will be completely ignored by all terminals because the bits will not be preceded by a frame signal.

In addition to the counting means disclosed above TLU TX Logic 17 includes backup timing means that commands Relay/Access MUX to return to a relay configuration if it is still in a transmit access configuration at a given time after all locally generated data has been transferred to TX input. This protective device insures that a terminal will return to a transmit access configuration even if frame signals are prevented from returning to their terminal of origin because of a broken loop.

The user access mode of terminal operation disclosed above is a "free-running" mode wherein any given terminal may gain access to the system by capturing an access window without any direct action taken by its terminal control microprocessor. The diagnostic operational mode of operation will now be described.

A multiplex terminal is disposed in the diagnostic operational mode by virtue of its CPU 11 outputting an appropriate control word to Terminal Control (port) 18 to so inform its TLU TX Logic 17 and to disable both its Access Window Capture Logic 19 and its TX User Interface Logic 23. With the terminal so disposed, no messages generated by local user data sources will be accepted for transmission. However, its CPU 11 can still transmit Terminal Broadcast messages by outputing same to Terminal Broadcast TX Register 21 and then asserting the TB Ready Bit of Terminal Control (port) 18.

Upon assertion of said bit, TLU TX Logic 17 responds immediately rather than waiting for an uncaptured access window as in the case of the user access mode operation. Relay/Access MUX 16 is immediately commanded to assume a transmit access configuration and User/Supervisory Data MUX 22 is commanded to select the TB stored in Terminal Broadcast Register 21. User/Supervisory Data MUX 22 responds by generating a frame signal and a TB function code (zero-zero) and transferring same to TX input. Immediately after the TB function code, sixteen data bits are transferred from Terminal Broadcast Register 21 to TX input.

After the sixteenth bit of the TB message is transferred to TX input, transmission is terminated without appending an EOT or access window. TLU TX Logic 17 then commands Relay/Access MUX 16 to return to a relay configuration when means comparing the numbers of transmitted and received frame signals (described hereinafter in conjunction with FIGS. 29, 32 and 33) indicates that the two numbers are equal. Thus no frame signals at all will be trapped on the closed loop. Any data bits that happen to be trapped will be ignored by receiving terminals. As with user access mode operation, backup timing means closes the loop if said counting means doesn't succeed in doing so within a specified time.

The asynchronous data bus system disclosed herein is preferably installed with a redundant loop architecture. Such a system is shown in FIG. 9 having a plurality of multiplex terminals MT1 through MT4. Each of the terminals is shown in FIG. 9 as having one or more users associated therewith. The transmission path 10 may be seen to consist of a channel A path 10a and a channel B path 10b on which data is transmitted in opposing directions as indicated by means of cooperative diagnostic algorithms performed by CPU's during diagnostic mode operation, an optimum data loop is configured. Normally one channel, either 10a or 10b of the transmission path, is designated as the active channel for the transfer of user data and the other channel is designated as an alternate. If the active channel fails, operation is transferred to the alternate channel, whereas if both channels fail, the system re-configures such that the A channel 10a and the B channel 10b are cross coupled to form a hybrid loop and thereby retain communication whenever possible. After the system is properly configured, an EOT message (including an access window) is transmitted onto the loop which indicates to the each terminal in the active channel that it may transmit data if it has any. If a terminal has no traffic to transmit it passes the opportunity to the next succeeding terminal in the loop and so on around the entire loop. If the opportunity to transmit should fail to be afforded by any terminal for a predetermined time period, due to a system casualty for example, the system configuration sequence is repeated.

The terminals in the system of FIG. 9 have one channel for each transmission path and are shown in block form in FIG. 18. Two T/R modules 12a and 12b are included in each terminal. The module 12a is coupled to service the A channel shown as 10a in FIG. 9 and the module 12b is coupled to service channel B shown as 10b in FIG. 9. Item numbers for like circuits are the same as in FIG. 3 with a suffix a or b for those circuits which appear twice, once in each terminal channel. According to the present invention, a terminal-control microprocessor can selectively pair different combinations of data transmitters and data receivers for disposing the terminal in a relay configuration. It can furthermore transmit and receive separate TBs on the two channels and can select either receiver and either transmitter for communicating user data. With this additional flexibility, the diagnostic operational mode subdivides into two submodes and the user access operational mode subdivides into five submodes when redundant-path architecture is considered. The two diagnostic submodes are illustrated in FIGS. 10 and 11 and the five user access submodes are illustrated in FIGS. 12 through 16. These figures all disclose a multiplex terminal comprising two T/R units 12a and 12b connected to transmission medium segments 10a and 10b, respectively. T/R unit 12a contains data receiver RX-A and data transmitter TX-A. T/R unit 12b contains data receiver RX-B and data transmitter TX-B. The elements shown generally as TLU 41 in FIGS. 10 through 16 comprise all of the logic elements of the multiplex terminal including its terminal control microprocessor.

When the terminals are in the diagnostic mode, because the system has just been initiated or because of a casualty in the system, the loop will be configured by a controller terminal to take a form that most efficiently utilizes the terminals available to the system. A diagnostic controller algorithm and a cooperative diagnostic follower algorithm function together to form the optimum data loop. FIG. 34 discloses a logical flow chart of the diagnostic controller algorithm and FIG. 35 discloses a logical flow chart of the diagnostic follower algorithm, both of which will be described in detail later in this disclosure. In these flow charts, configurations 1 and 2 refer to two diagnostic submodes disclosed hereinafter with reference to FIGS. 10 and 11, respectively, and configurations 3 through 7 refer to the five user access submodes disclosed hereinafter with reference to FIGS. 12 through 16. The system is driven synchronously in the diagnostic mode and while one multiplex terminal is the controller terminal the remainder of the terminals are diagnostic followers in this mode. The diagnostic controller terminal first opens the redundant transmission paths 10a and 10b and the CPU 11 in the controller terminal disables the access window 39 and the transmit user interface logic 23 through the terminal control 18. A terminal broadcast is loaded into the TB transmit registers 21a and 21b by the CPU 11 and the terminal control and TLU transmit logic 17 causes the timing signal and the TB function code to be generated by the user/supervisory data multiplexers 22a and 22b in the supervisory data mode. The framing signal function code and terminal broadcast are transmitted through the relay/access multiplexers 16a and 16b in the transmit access mode onto the transmission paths 10a and 10b in opposite directions. Each diagnostic follower terminal receives the terminal broadcast from each channel as described hereinbefore in conjunction with FIG. 3 and the terminal broadcasts are read by the CPU 11 in that terminal. The diagnostic controller multiplex terminal thus directs the configuration of the loop through the terminal broadcast messages in the first part of the diagnostic algorithm. Each of the diagnostic follower terminals reports in sequence in the latter part of the algorithm to indicate its status.

FIG. 10 shows the block form how the diagnostic controller and the follower multiplex terminals are configured in the system during the initial part of the diagnostic algorithm. No user data is taken into the terminals or transferred to users from them, but TB messages may be received and can be generated locally. A terminal logic unit (TLU) 41 is shown in two boxes in FIG. 10 for the sake of convenience. The TLU 41 is more inclusive than the TLU transmit logic 17 of FIGS. 3 and 18 and is shown in FIGS. 10 through 16 as a single entity (though in two parts) only for the purpose of simplifying the explanations of the terminal configurations of various types during the diagnostic and user access modes entered by the multiplex terminals. The details of the terminal logic unit structure and function will be described hereinafter in conjunction with FIG. 18 and the supporting schematics. Initially the diagnostic controller causes each multiplex terminal in the system of FIG. 9 to assume the configuration of FIG. 10 wherein the receiver in the module 12a is directly coupled to the transmitter in module 12a. In like fashion the receiver in module 12b is directly coupled to the transmitter in module 12b. With the T/R modules configured as shown in FIG. 10 the diagnostic controller terminal may transmit both on channels A and B. If channel A is complete, each multiplex terminal in sequence in the loop will retransmit the diagnostic controller terminal broadcast until it is received at the receiver for the A channel in the diagnostic controller terminal. In like fashion, the broadcast transmitted on channel B will be received by the B channel receiver in T/R module 12b if the B channel is unbroken. If the A channel is complete the diagnostic controller will designate that as the channel to transmit terminal broadcasts and user data in a manner to be hereinafter described, and the B channel will be designated to transmit terminal broadcasts only. If the A channel is found to be interrupted, the B channel will be designated to transmit user data and terminal broadcasts.

If both the A channel and B channel are found to be interrupted, the TLU 41 will configure each terminal in a cross coupled mode as seen in FIG. 11. In the cross coupled configuration of the diagnostic mode when a terminal is in the relay configuration the receiver in the T/R module 12a is directly coupled to the transmitter in the T/R module 12b. In like fashion the receiver in the T/R module 12b is directly coupled to the transmitter in T/R module 12a. As a consequence, each multiplex terminal will retransmit received TB messages on channel A in one direction and channel B in the other direction. When the terminal is in the transmit access configuration separate TB messages are generated by each TLU 41 and transferred respectively to TX-A and TX-B. RX-A and RX-B separately transfer received TB messages to their respective TLU 41's in this submode. The adjacent multiplex terminal in the loop will receive the transmissions on channels A and B and retransmit the same transmissions on channels B and A respectively. In this fashion each terminal may check the integrity of the two transmission paths extending between itself and its nearest neighbor on each side in the loop. The diagnostic controller terminal may now locate the casualty in the transmission paths 10a and 10b (channels A and B) and may now configure the loop in the most efficient manner. Having obtained this information, the diagnostic controller terminal will either configure the loop in an A channel primary configuration, a B channel primary configuration or a hybrid configuration. Presuming that the system of FIG. 9 has suffered a casualty severing both transmission paths A and B between terminals MT3 and MT2 and between terminals MT3 and MT4, and that this information has been obtained by the diagnostic controller while it was configured as shown in FIG. 10, the location of the two breaks in each channel on either side of terminal MT3 will be determined when the terminals are in a cross coupled configuration as in FIG. 11 in the diagnostic mode. FIG. 17 shows the terminals MT1, 2 and 4 all in a cross coupled configuration. Clearly terminal MT2 will not receive a transmission sent out on channel B at the receiver in channel A. In like fashion the transmission by terminal MT4 sent on channel A will not be received on channel B. Terminals MT2 and MT 4 are therefore designated the B and the A end terminals respectively. It may also be seen in FIG. 17 that terminal MT2 transmitting on channel A would receive the transmission on channel B and terminal MT4 transmitting on channel B would receive on the A channel receiver. Terminal MT1 would transmit and receive on both channels.

FIGS. 12 through 16 disclose block diagrams of five user access submodes. Each of these block diagrams includes a bidirectional user data path (UD) showing data flow to user data sinks and from user data sources. When operating in one of these user access submodes, the TX User Interface and Access Window Capture Logic are enabled. Thus a terminal is capable of communicating user data as well as communicating inter-terminal TBs. As will be further disclosed below, these five submodes are employed by the plurality of terminals to collectively configure an optimum loop for communicating user data. The form of this loop will depend upon the resources that are available and may comprise an all channel-A loop, an all channel-B loop, or a hybrid loop combining elements of both channel A and channel B.

A plurality of terminals can employ the submodes of FIGS. 14, 15 and 16 to cooperatively form a hybrid-loop for communicating user data. A hybrid-loop comprises one terminal disposed in the A-end submode, one terminal disposed in the B-end submode, and any number of terminals disposed in the hybrid interior submode.

As a result of the foregoing information obtained in the diagnostic mode when the terminals are configured as in FIG. 11 and presuming that the communications system of FIG. 9 is interrupted on each side of terminal MT3 so that the information discussed in conjunction with the description of FIG. 17 is obtained, the diagnostic controller terminal will configure the loop prior to going to the user access mode as follows: Terminal MT4 will be configured as in FIG. 14 which shows the A-end submode wherein locally generated user data is transmitted on the path 10b (channel B) by the transmitter in the T/R module 12b in the transmit access configuration and all bus data will be received by the receiver in the T/R module 12a and retransmitted on channel B in a relay configuration. The side of the terminal MT4 wherein no transmissions on one channel were received on the opposite channel is configured as shown in FIG. 14 with the TLU 41 directly coupled to the transmitter in the T/R module 12a. In this configuration terminal broadcasts may be transmitted by the transmitter in the T/R module 12a and the receiver in T/R module 12b is set up to receive messages if the fault in path 10b is corrected. As a consequence, when the break between multiplex terminals MT4 and MT3 is repaired, the terminal MT3 may recover as it once again is in communication with other terminals in the loop when the system reenters the diagnostic mode due to the system status change caused by the repair.

Terminal MT2 in FIG. 17, designated the B-end terminal in the hybrid loop described therein, is configured as shown in FIG. 15 preparatory to entering the user access mode. The locally generated user data will be transmitted by the transmitter on channel A in a transmit access configuration and data received by the receiver in T/R module 12b will be retransmitted on channel A in the relay configuration. The transmitter in T/R module 12b will be directly coupled to the TLU 41 and the receiver in T/R module 12a will be coupled to the TLU also. Thus, when the fault between terminals MT2 and MT3 is repaired the B end of the hybrid loop may transmit and receive terminal broadcasts so that a diagnostic controller may reconfigure the loop due to the system status change caused by the repair as explained in conjunction with FIG. 14.

Terminal MT1 in the hybrid loop of FIG. 17 is caused to assume the hybrid interior configuration of FIG. 16 by the diagnostic controller preparatory to entry into the user access mode from the diagnostic mode. User data is received and transmitted along the path 10a (channel A) exclusively. Channel A thus assumes both relay and transmit access configurations. No user data is passed by TLU 41 to the receiver in the T/R module 12b nor is any user data passed by TLU 41 to be transmitted by the transmitter in the T/R module 12b. Channel B thus remains permanently in the relay configuration. Terminal broadcasts are received by the receiver in module 12b so that in the event of a system status change the hybrid interior configuration of terminal MT1 shown in FIG. 16 may be altered to assume new configurations as directed by a diagnostic controller terminal.

In the event that the configuration of FIG. 10 in the diagnostic mode illustrates that transmission path 10a (channel A) is continuous, the diagnostic controller will direct all diagnostic follower terminals to assume the configuration of FIG. 12, providing an all A-channel loop. In this configuration during the user access mode terminal broadcasts will be transmitted along each of the two transmission paths 10a and 10b (in opposite direction in the loop) and all user data will be received and transmitted by the receiver and transmitter in T/R module 12a through the terminal logic unit 41. In the event channel A was found to be faulty during the diagnosis undertaken by the diagnostic terminal when all terminals are in the configuration of FIG. 10, and channel B was found to be continuous, all terminals would be commanded by the diagnostic controller to assume the configuration of FIG. 13, providing an all B-channel loop. In this configuration during the user access mode all user data is transmitted from the terminal and received by the terminal through the transmitter and receiver of T/R module 12b and all terminal broadcasts are transmitted and received as described hereinbefore on both channels A and B.

As mentioned hereinbefore FIG. 18 of the drawings shows a block diagram of a multiplex terminal for servicing a communications system wherein the transmission path consists of two parallel paths such as 10a and 10b shown in FIG. 9. The terminal of FIG. 18 may be termed a dual terminal as opposed to the terminal of FIG. 3 which is a single terminal serving a single transmission path. Like item numbers in FIG. 18 to those items in FIG. 3 are assigned the same number with the suffix "a" appended to those circuit segments in channel A in the terminal and with the suffix "b" appended to the same item numbers for those circuit segments in channel B in the terminal. Certain of the circuit segments in FIG. 18 which also appear in FIG. 3 serve both channels A and B in the configuration of FIG. 18; i.e., receiver user interface 27, transmit user interface 23 and CPU 11. The terminal status, terminal control and TLU transmit logic circuits 20, 18 and 17 respectively will be described in the configuration adapted to serve the dual channel multiplex terminal of FIG. 18. However, these circuit segments may be used in the multiplex terminal of FIG. 3. It would be within the capability of one of skill in this art to simplify the circuit segments 20, 18 and 17 based upon the teachings of this disclosure so that they would only serve the single channel terminal disclosed by the description of FIG. 3.

As in the description of the single channel terminal of FIG. 3, the dual channel terminal of FIG. 10 receives and transmits message components through two T/R modules 12a and 12b which each serve to transmit and receive data on one of two transmission paths 10a and 10b (identified as channels A and B). The message components are transmitted in opposite direction on the two channels. Each of the T/R modules act as a receiver for data carried down the associated channel on the bus and as a retransmitter of such data to the next adjacent terminal during the normal relay configuration of the module. However, when the particular terminal is transmitting and is therefore in its transmit access configuration, the channel in which transmission is to occur is broken at the multiplex terminal so that received data terminates at such terminal and new data is transmitted therefrom where such new data is initiated by a user (FIG. 9) or by the terminal itself in the form of a terminal broadcast. Further details of the T/R modules may be obtained from the disclosure of the aforementioned U.S. Pat. No. 4,038,494, Miller et al, issued July 26, 1977.

The terminal receiver/transmitter cross-coupling illustrated in FIGS. 11, 14 and 15 is accomplished in the multiplex terminal embodiment of FIG. 18 by a pair of normal/cross-coupling multiplexers 42 and 43 associated with channels A and B respectively. It may be seen that a received message from path 10b (channel B) may be passed through the relay/access multiplexer 16b in the relay configuration to the normal/cross-coupling logic 42 and relayed to the transmitter in T/R module 12a for transmission on the path 10a (channel A). A terminal broadcast in the TB-TX register 21b may be passed through the relay/access multiplexer 16b in the transmit access configuration and coupled through the cross-coupling logic 42 to the transmitter in T/R module 12a for transmission onto the path 10a. A data message received on channel A may in like fashion be re-transmitted on channel B in a relay configuration by means of Normal/Cross-Coupling Logic 43. The two Normal/Cross-Coupling Logic Elements therefore pair up the two data transmitters and two data receivers in a relay configuration. The normal path for either a terminal broadcast in channel B or a received message from channel B is back to the transmitter in the T/R module 12b for the channel B transmission path. The normal path for the terminal broadcast or received data in channel A is similar. The normal/cross-coupling logic circuits are multiplexers which select either the normal path or the cross-coupled path dependent upon a command seen as numeral 2 in FIG. 18 from the terminal control 18 in accordance with the dictates of CPU 11.

The commands represented by numerals 1, 3 and 4 from the terminal control 18 in FIG. 18 are enabling signals to the access window capture logic circuits 19a and 19b, the relay/access multiplexer 16b and the relay/access multiplexer 16a respectively. The terminal control also provides a selection signal to a channel receive selector circuit 44. The selector 44 is also a multiplexer choosing received message components from either channel A or channel B for transfer to a user data sink. The terminal control also provides enabling signals to the TLU transmit logic 17 and transmit user interface circuit 23.

With reference to FIG. 20A the terminal control port 18 of FIG. 18 will be described. Data from the bus associated with CPU 11 is delivered to an eight-bit latch 46. When the data is desired to be latched, a CPU write signal is provided by the CPU to the latch which is an edge triggered (rising) device. Each bit in the terminal control byte appearing at the output of the eight-bit latch 46 controls some terminal characteristic. The setting of TCB1 determines whether the terminal is in the normal or the cross-coupled configuration. Bit TCB2 designates whether channel A or channel B is the user-receiver channel. TCB3 enables the access window capture logic when set and disables the logic when not set. Bit TCB4 holds transmit access when set so that the transmission path is held open at the terminal during multiple terminal broadcasts from a given terminal. In this fashion the transmit access is not surrendered and the access window is not allowed to traverse the loop between terminal broadcasts. Bit TCB5, when set, indicates that a terminal broadcast is ready for transmission on the A channel. If the terminal is in the diagnostic operational mode, the TB is transmitted immediately. If the terminal is in the user access operational mode, the setting of this bit causes the access window to be captured and the TB to then be transmitted.

Bit TCB6 when set indicates that a terminal broadcast is ready for transmission in B channel. The transmission is accomplished in the diagnostic and user access operational modes as described for the A channel. Bit TCB7 is the user access transmit enable bit. Bits TCB0 and TCB7 are provided as inputs to the negative AND gate G1 to provide a diagnostic mode signal $\overline{DIAG}$ which indicates that the terminal is operating in the diagnostic mode. The inverse of the relay control bit is provided by inverter I1 as $\overline{TCB1}$. The inverse of the user data reception channel bit is provided by inverter I2 as $\overline{TCB2}$.

A two-bit latch 47 is coupled to the CPU data bits 5 and 6 which are latched through to the output of latch 47 by the CPU write command. The outputs from the two-bit latch are designated QB5 and QB6 which are transmitted to the TLU transmit logic circuitry indicating that a terminal broadcast is ready to be transmitted in either channel A or channel B respectively. The two-bit latch is reset by a QB5 or QB6 reset signal which is generated by the frame signal generator portion (FIG. 33) of the TLU transmit logic 17 (FIG. 18) to be hereinafter described. This reset removes the indication that a terminal broadcast is ready to be transmitted in either channel A or channel B.

A JK flip-flop FF1 is seen having the CPU data bit 3 coupled to the K input through an inverter I3. The CPU write command is coupled to the clock input of FF1 so that upon the CPU write command an initiate access window signal (IAW) is provided at the $\overline{Q}$ output of the flip-flop. A terminal transmit signal $\overline{TT}$ from the transmit sequence logic (FIG. 31) in the TLU transmit logic 17 (FIG. 18) is coupled to the preset of FF1 to remove the IAW signal after an access window has been transmitted.

FIG. 20B shows the terminal status port 20 (FIG. 18) wherein any changes in the status in the system are sensed and the current status of the system is transmitted to the CPU 11. Two timer signals, a loop close time out A and a loop close time out B are provided as inputs to a pair of AND gates G2 and G3 respectively. Either bit $\overline{TCB2}$ or TCB2 is present dependent upon whether user data is being transmitted on channels A or B respectively. As a consequence, an input is provided to OR gate G4 which is coupled to the bit 5 terminal on an eight-bit latch 48 and to an input on one side of a comparator 49. A received access window (AW) time out for channel A is coupled to bit 6 of the eight-bit latch through an inverter I4 and a received access window (AW) time out for channel B is coupled to the bit 7 input on the eight-bit latch through an inverter I5. The last two mentioned signals are also connected to the comparator 49. A user overrun signal obtained from a timer in the circuit in FIG. 28A is coupled to the bit 3 input of the eight-bit latch and to the input side of the comparator 49. If either of the oscillators in the dual transmit/receiver modules 12a and 12b change status, a signal is input to an OR gate G5 which provides an output coupled to the bit 2 input of the eight-bit latch 48 and the input side of the comparator 49. The status of channel A and channel B is also obtained from the T/R module and coupled to bits 1 and 0 respectively at the eight-bit latch and the input side of the comparator. The oscillator and channel status signals are obtained from the T/R module as may be seen in FIG. 19 described hereinbefore.

Comparator 49 makes a comparison between latch 48 inputs and selected latch 48 outputs. If the comparison is "not equal", a status change signal is generated which produces a program interrupt to CPU 11. CPU 11 responds by issuing a CPU read pulse to latch 48 which transfers the new status data to the CPU data bus and equalizes the inputs of comparator 49.

Referring now to FIG. 21 a schematic is presented for the function decoders 24a and 24b in FIG. 18. The received clock, received frame and received data as seen in FIGS. 4 through 8 are provided as inputs to the function decoder. The received clock is provided through an inverter I20 to the clock input of a counter 52. The received frame is provided through an inverter I6 to the K input of JK flip-flop FF2 so that on the next clock pulse the $\overline{Q}$ output of the flip-flop will start the counter 52. At the zero count from the counter a latch 53 will be cleared through a negative OR gate G6. The received data is delivered to the input of a D-type flip-flop FF3 which latches the first bit of the function code at the output thereof. The second bit of the function code is applied to the input of a one of four decoder 54 which decodes the two-bits then at its input and provides an indication at the decoder output that the message is a terminal broadcast (TB) if the decoder input is a digital O-O, is a start of message (SM) if the input is a digital O1, is an intramessage gap (IG) if the input is a digital 10 and is an end-of-transmission message (EOT) if the input is a digital 11. At the end of the second clock count after the clear caused by the framing signal, the output of the decoder 54 which is at the input of the latch 53 is latched through to the output of the latch. The latch output for the messages TB, SM and IG remains set indicating that one of these message formats is about to be received until the next received frame arrives at the receiver. The flip-flop FF2 is preset to disable the counter 52 by the third count where the rising or the falling portion of the count is operative as indicated. When the EOT message format is indicated at the output of the latch 53 the indication is provided to the D-input of a D-type flip-flop FF4 and the indication is clocked through to the $\overline{Q}$ output of the flip-flop by the next clock pulse to clear the latch 53. Therefore, the EOT received indication is reset after one clock pulse.

Turning now to FIG. 22 of the drawings a schematic for the receiver user interface logic 27 in FIG. 18 will be described. The received data and the received clocks from the T/R modules 12a or 12b as selected by the channel receive select multiplexer 44 (FIG. 18) are provided as two inputs to the user interface. The received IG and SM signals from the function decoder 24 of FIG. 21 are also provided as inputs. The IG and SM signals are inputted to an OR gate G7, the output of which is provided as one input to an AND gate G8 and to an AND gate G9. Gate G7 therefore provides a logical high state when either SM or IG signals are received. When the SM received signal is coupled to the receiver user interface logic it is provided through an inverter I7 to clock a flip-flop FF5 to provide a high logical state at inputs on AND gates G8 and G9. As a consequence the received data and the received clock signals will be anded with the output of OR gate G7 and flip-flop FF5 to provide DR (data) and CR (clock). The output from $\overline{Q}$ of FF5 is the receive enable signal for the receiver-user interface 27 and will remain until FF5 is preset by removal of the signal RR (user ready to receive) or the appearance of a receive TB or receive EOT signal through the NOR gates G10 and G11 as shown.

Turning now to FIG. 23 the circuit for the terminal broadcast transmitters 21a and 21b in FIG. 18 will be described. The CPU data bus is coupled to the inputs of two 8 bit latches 56 and 57. Eight bits are latched into each 8 bit latch on command of the CPU through the negative AND gates G12 and G13. It may be seen that the latch 56 is actuated by the gate G13 and the latch 57 is actuated by the gate G12. An internal frame signal obtained from the circuit of FIG. 33 in the TLU transmit logic 17 of FIG. 18 loads the latched data into a shift register 58. An internal clock signal from the clock (not shown) associated with the CPU 11 mentioned hereinbefore clocks the loaded data serially out onto the TB transmit line.

FIG. 24 is a diagram of the Access Window Capture Logic Circuit, 19a or 19b, of FIG. 18. This circuit applies the $\overline{\text{DIAG}}$ signal from Terminal Control Port 18 and an Alternate Channel signal (TCB2 or $\overline{\text{TCB2}}$, FIG. 20A) to negative OR gate G14. The $\overline{\text{DIAG}}$ signal indicates that the terminal is disposed in the diagnostic mode and the Alternate Channel signal indicates that the subject channel is not the active channel. In either case, AND gate G15 is disabled. A user ready signal from the transmit user interface logic 23 (FIG. 18) is provided as one input to an AND gate G16 together with the transmit enable bit TCB7 from the terminal control port of FIG. 20A. When both of these last two named signals are present, the output of the AND gate G16 provides a high logical state as one input to an OR gate G17. As a consequence a high logical state is provided from the output of the OR gate G17 to the AND gate G15. As previously mentioned when both the $\overline{\text{DIAG}}$ and TCB2 or $\overline{\text{TCB2}}$ signals are both absent, the output of negative OR gate G14 is normally high. As a result the AND gate G15 provides a logical high signal to one input of an AND gate G18. As mentioned hereinbefore the EOT receive signal from the function decoder of FIG. 21 is high for one clock pulse and thereby provides an access window capture (AWC) signal at the output of AND gate G18. An alternate way for the AND gate G15 to receive its second logical high input from the OR gate G17 is for the TB ready signal (QB5 for channel A and QB6 for channel B) obtained from the terminal control port of FIG. 20A to be provided as an input to the circuit of FIG. 24. Thus, when the user ready signal and the bit TCB7 at the input to the circuit of FIG. 24 are in logical high states or when a TB ready signal is in a logical high state, then when the EOT receive signal is coupled to the access window capture logic from the function decoder 24a or 24b, an AWC pulse is provided.

With reference now to FIG. 25A of the drawings a circuit diagram for the relay/access multiplexer logic seen as circuitry segments 16a and 16b in FIG. 18 is shown. A series of four inputs may be seen to provide inputs for a NAND gate G19, a negative NOR gate G20 and a negative NAND gate G21. The four signals are the signals TB from the transmit sequence logic of FIG.

31, the TB enable signals TCB5 (channel A) or TCB6 (channel B) from the terminal control port FIG. 20A, the channel selector for user data AW enable ($\overline{TCB2}$ for channel A and TCB2 for channel B) from the terminal control port of FIG. 20A and the internal frame signal from the frame signal generator circuitry of FIG. 33. When these four signals are present a high is provided at the output of the negative NAND gate which is coupled to an A input in a multiplexer 58. This output from the gate G21 represents a framing signal generated within the multiplex terminal. A received frame signal from the T/R modules 12a or 12b is coupled to a B input of the multiplexer 58 through an inverter I8. Received data is coupled to a B input of the multiplexer through an inverter I9. The internal clock signal is coupled to an A input of the multiplexer and the received clock signal is coupled to a B input of the multiplexer. Internal data is coupled to an A input of the multiplexer and the AWC signal from the access window capture logic of FIG. 24 is coupled to a B input of the multiplexer 58. When a $\overline{GO}$ signal obtained from the loop access logic of FIG. 30 is in a high state, the B inputs are presented at the multiplexer output which may be recognized as the relay configuration. When the $\overline{GO}$ signal is in a low state the A inputs to the multiplexer 58 are presented at the outputs which may be recognized as the transmit access configuration. The frame signal to be transmitted therefore is either the received frame or the internally generated frame from the output of the gate G21 and appears as TX $\overline{FRM}$. The date to be transmitted is therefore seen to be either the received data or the internally generated data ($\overline{INT\ DATA}$) and appears at the output of the circuit as TX data. Either the internal clock or the received clock is presented at the output of the multiplexer and appears as the TX clock at the output of the circuit. When the access window is to be captured the data from the multiplexer 58 may be seen to be treated by a number of components including inverters I10, I11 and I12, flip flop FF6 and NOR gate G22. Reference to the timing diagram of FIG. 25B shows that the received frame is initiated at time t1 and lasts until time t2 in synchronism with the received clock. The received data when it is an end of transmission message with an access window is shown wherein the end of transmission logical one-one extends from t2 through t5 and the access window extends from t5 through t7. The access window capture (AWC pulse from the access window capture logic of FIG. 24) occurs on the falling edge of the clock at time t4. As a consequence it is another half clock pulse until the flip flop FF6 is clocked by the output from inverter I11 and the Q output from the flip flop FF6 appears as the $\overline{XD}$ signal which is logically high from time t5 to t7. The transmitted data at the output of the NOR gate G22 is therefore low from t5 through t7 as shown at TX data in FIG. 25B. Thus, the access window has been removed.

An EOT signal is shown as an input to the circuit of FIG. 25A and is coupled to one input of an AND gate G23. It may be seen that the output from inverter I10 is a high logical state if an access window is available in the data. The Q output from flip flop FF6 is high during the period t5 through t7 as seen at $\overline{XD}$ in FIG. 25B. When the RX EOT signal from the function decoder circuit of FIG. 21 is present which, as previously described, is only one clock pulse long, there are three high inputs to the AND gate G23 if an access window is available in the data. As a consequence, the output OL occurs from the circuit of FIG. 25A for the period t5 through t6 as shown in the timing diagram of FIG. 25B.

Referring now to FIG. 26 the circuitry for the user/-supervisory data multiplexer 22a and 22b in FIG. 18 will be described. $\overline{TB}$, $\overline{SM}$ and $\overline{IG}$ are normally high signals which, when actuated, assume a low state and indicate that a terminal broadcast, start of message or intramessage gap message format is ready for transmission. An array of gates G24 through G32 are arranged with inverters I13 through I15 to operate with a pair of flip flops FF7 and FF8 so that the flip flops operate as a 2 bit shift register following an internal frame signal to provide an appropriate function code at the Q output of FF8 corresponding to the $\overline{IG}$, $\overline{SM}$ or $\overline{TB}$ inputs. The flip flops FF7 and FF8 are clocked by the internal clock signal. The 2 bit function code is presented to one input of a multiplexer 59 which selects the function code to be presented at the multiplexer output as internal data for the two clock periods. When the input to the circuit of FIG. 26 is either $\overline{IG}$ or $\overline{SM}$ a switchover signal (SW OVER) at the select terminal of the multiplexer 59 causes the multiplexer to pass user data through to the output thereof as internal data. When the input to the circuit is $\overline{TB}$, the switchover signal leaves the multiplexer 59 in condition to pass the Q output from FF8 through to the output of the multiplexer as internal data. The circuit functions in this manner because a terminal broadcast to be transmitted is passed through the OR gate G30 unchanged into the 2 bit shift register consisting of the flip flops FF7 and FF8. The clock pulses then shift the entire terminal broadcast through to the Q output of FF8 in sixteen additional clock pulses. Therefore a terminal broadcast together with the terminal broadcast function code requires 18 clock pulses to be shifted through the register formed by the flip flops. The start of message and intramessage gap function codes are shifted through the register in two clock pulses. Three clock pulses are required to shift the end of transmission function code plus an access window through the 2 bit register. The EOT function code is produced only for those conditions when the $\overline{IG}$, $\overline{SM}$ and $\overline{TB}$ signals are not present and a framing signal is present. Clearly this condition requires that an EOT function code be generated by the 2 bit shift register formed by FF7 and FF8.

FIG. 27 shows a terminal broadcast receiver register at 26a and 26b as seen in FIG. 18. The circuit of FIG. 27 receives a decoded terminal broadcast identification TB from the function decoder of FIG. 21 which is connected to a start count terminal on a counter 61. A received clock and received data is input to the terminal broadcast receiver register from a T/R module 12a or 12b. The received clock is inverted by an inverter I16 and coupled to the clock inputs of the counter 61 and a shift register 62. The received data is coupled to the input of the shift register. At the end of an eight clock pulse count the counter provides an input to an OR gate G33 which provides a "shift in" pulse to a memory 63 so that the first 8 bits of the received data are taken into the memory from the shift register 62. At the end of sixteen clock counts from the counter 61 the OR gate G33 provides another "shift in" pulse to the memory 63 to take the next eight received data bits in the terminal broadcast into the memory from the shift register 62. When the full sixteen bit terminal broadcast is in the memory a ready signal is provided which advises the CPU 11 that the received terminal broadcast is ready to be read. The CPU calls the terminal broadcast from the memory by selecting a negative AND gate G34 and providing a CPU read signal thereto. The select and read signals provide an output from the negative AND gate G34 which causes the memory to transmit onto the CPU data bus the first received eight data bits followed by the second received eight data bits. The entire terminal broadcast is thereby transmitted to the CPU 11.

With reference to the circuit diagram of FIG. 28A a ready-to-transmit signal RT is received from a user data source and coupled to one input of a negative OR gate G37. A user transmit enable signal TCB7 (from the terminal control port circuit of FIG. 20A) is also coupled to an input of the gate G37. An overrun timer 64 has an output which is in a high state when the timer is not enabled. The timer output also is in a high state after it is enabled until it times out. The time out period for the timer is set to define the maximum transmission time which may be allowed for a user transmission. Consequently, the user may send a message consuming any amount of time within this predetermined maximum period. When the signals RT, TCB7 and timer output are present, the output of the gate assumes a logical high state providing a user ready signal and removing the preset for a flip flop FF9. The user ready signal is utilized by the access window capture logic described hereinbefore in conjunction with FIG. 24. After the access window is captured (through the operation of the circuit of FIG. 24) the signal $\overline{SM}$ goes to a low logical state. This signal is inverted by an inverter I17 and coupled to the K input of FF9. A signal $\overline{SW\ OVER}$ goes to a low logical state at the end of the SM function code and is coupled to the clock input of FF9. The low going edge of this clock signal provides a logical high signal at the $\overline{Q}$ output of FF9 to provide the signal ET which is an indication that a user transmission is coming onto the bus. The $\overline{Q}$ high signal is also inputted to the overrun timer 64 as the enable signal and internal clock pulses begin the timer count. As long as the enable or ET signal does not remain for a time longer than the maximum time allowed for any user transmission the output from the timer will remain in a logical high state. The $\overline{Q}$ output from FF9 is also input to a three input AND gate G35. A flip flop FF10 has a A output preset to a logical high state which is also input to the gate G35. The gate G35 is therefore enabled to pass the internal clock signal through the AND gate as the signal CT. The clock signal is returned to the transmit user interface logic as clock signal CI which is in phase with user data DT. The ET signal is also input to a NAND gate G38 so that the inverse of the user data DT is provided at the output thereof. The inverted user data is coupled to the multiplexer 59 in the user/supervisory data circuit of FIG. 26 to be utilized as described hereinbefore.

The user ready signal when set to a logical high together with a normally high $\overline{MW\ RST}$ signal is inputted to a negative OR gate G36. This provides a logical high output from the gate which removes the preset from flip flop FF10. The Q output of the flip flop remains in a logical high state in this condition and will only be changed by a clock input (the falling edge thereof). The signal triggers a one-shot device 66 to rise to a logical high state at the clock input of FF10. The one-shot period is longer than a clock period (CI) so that the one-shot output remains in a high state as long as CI is present. At the end of a user transmission the signal RT is removed and the signal ET is therefore removed and the clock signal is blocked at the AND gate G35. The circuit of FIG. 28A thereby completes its specific function for this message transmission. However, if the intramessage gap is required, the signal RT is not removed. At that time the user data source breaks the path between CT and CI and the one-shot 66 times out. Flip flop FF10 is clocked on the falling edge of the one-shot output causing the Q output to go low. The clock signal through the AND gate G35 is thereby blocked and the low going state at the Q output of FF10 provides a $\overline{IG}$ signal which is an indication that an intramessage gap is occurring. The signal ET remains since the signal $\overline{SM}$ is present for the entire duration of a SM and IG message. The $\overline{IG}$ signal is provided to the transmit sequence logic (FIG. 32) for purposes to be hereinafter described and is also provided to the user/supervisory data logic of FIG. 26 for purposes hereinbefore described. As a consequence instead of an end of transmission (EOT) being generated as a function code, an intermessage gap (IG) is generated as a function code so that bus access is retained by the terminal and the user data source associated therewith.

With reference now to the timing diagram of FIG. 28B the manner in which bus retention is accomplished as described immediately hereinbefore will be discussed. The signal RT is generated at time t1 after which the signal ET is generated at a later time t2. One-half cycle later the clock signals CT and CI occur at time t3. Also at time t3 the output from the one-shot 66 occurs and remains until the last clock pulse in the SM message plus the one-shot period (of arbitrary length) which is shown in FIG. 28B as extending from t4 through t5. When the one-shot output falls, the Q output of flip flop FF10 which is the signal $\overline{IG}$ also falls at time t5. Thus, an intramessage gap function code IG is generated by the circuit of FIG. 26 and access to the bus is retained. A signal $\overline{MWRST}$ is provided at time t6, which is a low going signal causing the negative OR gate G36 to preset flip flop FF10 so that the Q output again assumes a high logical state, the signal $\overline{IG}$ is removed (set back to a high state) and the transmission of the intramessage gap message ensues in the same manner as described hereinbefore for a start of message communication.

After the access window bit has been transferred to TX input, Relay/Access MUX 16 must return to a data-relay configuration. Ideally, this should occur before the access window traverses the loop so that the returning access window is relayed by the terminal that introduced it and thus permitted to continue circulating until it is captured. Closing the loop too soon, however, could permit ambiguous data to circulate as well. Means for returning the Relay/Access MUX to a data-relay configuration which permits the access window to circlate without permitting ambiguous data to circulate will now be described.

As shown in FIGS. 29 and 32 TLU TX Logic 17 includes counting means to compare the number of transmitted frame signals and the number of received frame signals excluding the one frame signal preceding the EOT function code and AW bit in both cases. After the access window bit has been transferred to TX input, TLU TX Logic 17 commands Relay/Access MUX 16 to return to a data-relay configuration when said two numbers are equal. This insures that the last frame signal introduced, along with the EOT and AW bits which follow it, will be permitted to circulate until such time as a terminal accesses the bus. Only one frame signal will be circulating, however; the one preceding the EOT function code and access window bit. Any additional data bits that happen to be trapped on the loop will also circulate but will be completely ignored by all terminals because the bits will not be preceded by a frame signal.

In addition to the aforementioned counting means, TLU TX Logic 17 includes backup or loop closing timing means that commands Relay/Access MUX to return to a data-relay configuration if it is still in a transmit access configuration at a given time after all locally-generated data has been transferred to TX input. This protective device insures that a terminal will return to the transmit access configuration even if frame signals are prevented from returning to their terminal of origin because of a broken loop.

Whenever the loop is closed by means of the backup timer during user access mode operation, a bit is set at Terminal Status (port) 20 and a program interrupt signal is communicated to CPU 11 so that CPU 11 can take corrective action if necessary. In addition to this loop-close timer, Terminal Status Port 11 monitors a user-overrun timer that interrupts CPU 11 if a single user data source affirms the RT input line for too long a time period; it monitors an access window timer that interrupts CPU 11 if too much time elapses before receiving an access window, and it monitors channel status and oscillator status signals outputted by T/R module 12 and shown in FIG. 19 of the drawings. As disclosed hereinbefore in reference to FIG. 20B, several of the signals monitored by Terminal Status (port) 20 cause program interrupts of CPU 11 whenever they change from one binary state to the other. The circuitry which accomplishes the foregoing will now be described.

FIG. 29 shows the TLU transmit logic in block form having input signals QB5, OL-A and IAW to a loop access logic 67 for channel A and having inputs QB6, OL-B and IAW to a loop access logic 68 for channel B. The two loop access logic circuit sections also have a loop select input as indicated. The QB5, QB6 and IAW are obtained from the circuit of FIG. 20A and the signals OL-A and B are obtained from the circuit of FIG. 25A. The loop select signal is either the signal TCB2 (channel B) or $\overline{TCB2}$ (channel A) also obtained from the circuit of FIG. 20A. The user ready signal is obtained from the circuit of FIG. 28A as hereinbefore described. A loop close logic circuit segment 69 receives the signals SM, IG or EOT from the function decoder circuit of FIG. 21. The loop access logic segments 67 and 68 provide an open loop A ($\overline{GO\ A}$) and an open loop B ($\overline{GO\ B}$) signal respectively. A framing signal generator 71 provides the internal frame signal and the QB5 and QB6 reset signals. The internal frame signal is utilized by several of the circuits described hereinbefore while the QB5 and QB6 reset signal is provided as an input to the terminal control port circuit of FIG. 20A to remove the signals which indicate that a terminal broadcast is ready to be transmitted. A supervisory data counter circuit 72 is included in the TLU transmit logic providing a switchover (SW OVER) signal which controls the multiplexer 59 for providing user data or supervisory data at the output of the circuit of FIG. 26. Transmit sequence logic 73 is shown which affords control signals for other segments of circuitry in the TLU transmit logic portion of the multiplex terminal.

Turning now to FIG. 30 a description of the loop access logic for either channel A or channel B (Items 67 and 68 respectively) is shown. FIG. 30 shows a single channel of loop access logic which is duplicated for the other channel as indicated in FIG. 29. It may be noted that several additional inputs are present in FIG. 30 over those shown to the loop access logic circuits of FIG. 29. These additional inputs are in the nature of control support signals and are left out of the FIG. 29 block diagram for purposes of clarity. A diagnostic mode signal ($\overline{DIAG}$) is delivered through an inverter I18 to the K input of a flip flop FF11. A TB ready signal (QB5 for channel A or QB6 for channel B) is coupled through an inverter I19 to the clock input of FF11. Thus, when the terminal is in the diagnostic mode and a terminal broadcast is ready for transmission, the Q output of FF11 goes low causing a high logical state to appear at the output of a negative NOR gate G39. The output of G39 is coupled to the K input of a flip flop FF12 which is clocked through by the next internal clock pulse as a logical low state at the Q output of the flip flop. This low state is coupled to the input of a negative NOR gate G40 which provides a logical high to the K input of a flip flop FF13 which on the next clock pulse provides a logical low at the Q output thereof. This low signal is the transmit access signal which functions to open the transmission path 10a or 10b (FIG. 9) at the multiplex terminal so that the terminal may transmit on the path.

When the controller terminal in the diagnostic mode wants to go from the diagnostic to the user access mode the signals IAW (TCB3) and either TCB2 or $\overline{TCB2}$ from the terminal control port circuit of FIG. 20A are provided to the inputs of a NAND gate G41. When these two inputs are present (an access window is being initiated and this channel is selected for transmission) the gate G41 provides a logical low output which is input to the gate G39 providing a logical high output therefrom. The access signal ($\overline{GO}$) is thereby generated as described hereinbefore through the flip flops FF12 and 13 and the gate G40.

In the user access mode when the circuit of FIG. 30 is in the primary channel (the channel carrying user data), and an access window has been sensed by the circuit of FIG. 25A and captured, the signal OL (FIG. 25B) is clocked through as a logical low at the output of a flip flop FF14 by the inverted received clock signal $\overline{XC}$. A logical low is thereby provided from the Q output of FF14 to one input of the negative NOR GATE G39 and the access signal ($\overline{GO}$) is generated as described before.

When the terminal is in the user access mode and the circuit of FIG. 30 is in the secondary channel (the channel which does not carry user data) then the access signal from the alternate channel (the channel carrying user data) is input to a negative AND gate G42. $\overline{TB}$ signal is also input to the gate G42 together with the inverse of the TB ready signal QB5 or QB6 as appropriate. Thus, when the alternate channel loop is opened for transmission, when the alternate channel is selected to transmit a terminal broadcast and when a terminal broadcast is ready to be transmitted in this channel, a logical low output is provided from the gate G42 which is coupled to one input of the negative NOR gate G40. This provides a logical high state at the output of G40 which produces the access signal $\overline{GO}$ on the next internal clock pulse as described before. When the loop is to be reclosed after any of the aforementioned four ways of opening the loop for transmission, a loop close signal is provided to the J inputs of the flip flops FF12 and FF13 so that the access signal $\overline{GO}$ is returned to a high state on the succeeding internal clock (INT CLK) pulse.

With reference now to FIG. 31 of the drawings the circuitry for the transmit sequence logic 73 of FIG. 29 will be described. This circuit determines the transmit priority for terminal broadcasts, user data messages and end of transmission messages. A table 74 is shown in FIG. 31 which shows the priority as; 1, terminal broadcasts (TB); 2, user data messages (SM); and 3, end of transmission messages (EOT). It should be noted that when the $\overline{GO}$ signal from the loop access logical for either channel is present at the input to a negative OR gate G42 a terminal transmit signal ($\overline{TT}$) is provided from the circuit of FIG. 31 which is utilized as a control signal in a number of other circuits described herein when the transmission path 10a or 10b is opened preparatory to transmission of messages thereon. Also when the loop access signal for either channel A or channel B is present at gate G42 a flip flop FF15 is clocked to produce the low logic state established by the ground at the J input at the Q output. This low logic state from FF15 is coupled to one input of a programmable read only memory (PROM) 76. When a terminal broadcast is ready to be transmitted along either channel A or channel B as indicated by signals QB5 or QB6, the output of a NOR gate G43 is indicative thereof and is also coupled to one of the inputs of the PROM. The output from the gate G43 is also used as a clocking pulse for a flip flop FF16 which clocks a signal through to the Q output thereof which indicates that a terminal broadcast is ready and is on hold. This last mentioned signal is also coupled to one of the inputs of the PROM 76. The user ready signal from the circuit of FIG. 28A, the transmit user interface logic, is also used as an input to the PROM. The bit TCB4 from the terminal control port of FIG. 20A is another input to the PROM. A sixth input to the PROM is the signal TB which is an indicator of a terminal broadcast being transmitted.

The $\overline{MW\ RST}$ signal is coupled to the clock input of a flip flop FF17 and provides an indication that a transmission is over and that therefore a next type of transmission in the priority table 74 may be selected. An ET monitor signal $\overline{ET\ MON}$ is input to a flip flop FF18 to indicate that a user data transmission is completed so that an end of transmission (EOT) message may then be selected as indicated by the priority table 74. The program read only memory 76 is set to provide the desired priority of transmissions to the inputs of a latch 77 so that an appropriate signal $\overline{TB}$, $\overline{SM}$ or $\overline{EOT}$ will be latched through to the output of the latch and subsequently delivered to the user/supervisory data logic of FIG. 26 to provide the appropriate function code as described hereinbefore. The latching pulse for the latch 77 is obtained by any low signal appearing at one of the inputs of the negative NOR gate G44 which is clocked through the D type flip flop FF19 by the internal clock signal as shown. The inverse of the latching pulse is provided at the $\overline{Q}$ output of FF19 as a frame generator start signal $\overline{FGST}$. The K inputs for the flip flops 16, 17 and 18 are provided by the indicated ones of the outputs from the latch 77.

With reference to FIG. 32 of the drawings the loop close logic section 69 of FIG. 29 will be described. The purpose of the loop close logic is to provide an indication for both channels of when the loop may be closed following a transmission. The reason for having this circuitry is that a sufficiently long period of time must be allowed following transmission before the loop is closed to insure that all transmitted framing signals are removed from the bus with the exception of the one associated with the EOT function code. This must be done so that ambiguous frame signals do not circulate forever on the bus. This time period, however, must be short enough that a succeeding transmission by another terminal or the circulation of the access window is not impeded. Counters 78 and 79 are enabled by the occurrence of the terminal transmit ($\overline{TT}$) signal from the transmit sequence logic of FIG. 31. This signal indicates that one or both of the loops 10a or 10b has been opened for transmission onto the bus. A gate G45 provides a high going pulse for each framing signal associated with a terminal broadcast transmission and a gate G46 provides a similar pulse for all start of message and intramessage gap transmissions. Note that $\overline{SM}$ is active for both types of transmissions. These two signals are fed to an OR gate G47 which provides a pulse signal to the counter 79 whenever a framing signal associated with a TB, SM or IG function code is transmitted onto the bus. When these transmissions traverse the loop and are received by the function decoder logic (FIG. 21) an indication of each type of transmission (RX TB, RX SM or RX IG) is fed to an OR gate G48. The output of G48 therefore has a rising edge each time one of these function codes is detected and provides a clocking signal for the counter 78. Note that transmission or detection of the EOT function code does not increment counter 79 or 78.

The outputs of counters 79 and 78 in FIG. 32 are provided as inputs to a comparator 81. When the output of counter 78 is the same as that of counter 79, the comparator output signal goes low. This condition indicates that all framing signals exclusive of the one associated with the EOT message and the access window which have been transmitted onto the bus have been received and that it is safe to close the loop. This is the normal means of closing the loop.

A backup loop closing mechanism is shown in FIG. 32 in the form of a counter 82. The counter 82 allows the loop to be closed after a predetermined time period in the event a transmitted framing signal does not completely traverse the loop. In this case the output of comparator 81 will never go active as in the case where the data bus should become broken during a transmission. Counter 82 is reset by a gate G49 whenever the output of the comparator 81 goes low or whenever a framing signal ($\overline{INT\ FRM}$) is transmitted onto the bus. Counter 82 counts the internal clock pulses when both of the signals are high. Therefore, it can be seen that counter 82 will provide an output signal which is a loop close time out, whenever the output of comparator 81 does not occur within a predetermined time period (as set into counter 82) after the occurrence of a framing signal. The loop close time out signal from the counter 82 and the output from the comparator 81 are provided as inputs to a gate G50. The output of G50 is a signal which indicates that the loop may be closed either due to the normal loop closing mechanism or due to the backup mechanism just described if there are no more transmissions to be placed on the bus.

The output of a negative NOR gate G51 causes the loop access logic of FIG. 30 to close the loop. This output (LCLS) is activated in one of three ways as determined by the inputs to gate G51. When the terminal is in the diagnostic mode of operation, the loop closing signal comes from a NAND gate G52. The output of this gate goes active (logically low) when the multiplex terminal is in the diagnostic mode and it has no more traffic to transmit as indicated by the $\overline{\text{QEOX}}$ signal from the transmit sequence logic of FIG. 31 and the output of gate G50, discussed previously, is high.

When the multiplex terminal is in the user access mode of operation and the channel under observation is the user data carrying channel (the primary channel) the loop closing signal is the output of a gate G53. This signal becomes low or active when the diagnostic mode is not indicated, when the EOT function code and the access window have been transmitted onto the bus (indicated by the ENDX signal from the supervisory data counter logic of FIG. 33), when bit TCB2 from the terminal control port of FIG. 20A indicates that the channel under observation is the primary channel, and when the output of gate G50 is high.

When the terminal is in the user access mode of operation and the channel under observation is not the user data carrying channel (the alternate channel), the loop closing signal to gate G51 is the output of a NAND gate G54. This signal becomes active (low) when the diagnostic mode is not indicated, when bit TCB2 from the terminal control port of FIG. 20A indicates that the channel under observation is a secondary channel, when a terminal broadcast is not being transmitted and a hold state is not in effect as determined by a gate G55 with input signals $\overline{\text{TB}}$ and $\overline{\text{QHOLD}}$ from the transmit sequence logic of FIG. 31, and when the output of gate G50 is high.

With reference now to FIG. 33 of the drawings a description of the framing signal generator circuit portion 71 and the supervisory data counter logic circuit portion 72 of FIG. 29 will be undertaken. The purpose of the framing signal general 71 is to produce a framing signal when the terminal is about to transmit. The framing signal denotes the beginning of a TB, SM, IG or EOT transmission. A negative OR gate G56 has as its inputs the $\overline{\text{FGST}}$ signal from the transmit sequence logic circuit of 31 and the $\overline{\text{IG}}$ signal from the transmit user interface logic of FIG. 28A. The former signal indicates that a TB, SM, or EOT transmission is to occur. The latter signal indicates that an IG transmission is to occur. Therefore, the output of the gate G56 indicates that a framing signal should be generated in anticipation of the upcoming transmission.

The output of gate G56 is the clock input to a flip flop FF20. When clocked, the Q output of FF20 goes low and is the serial input to a shift register 83. One internal clock period after this serial input goes low, the QA output of the shift register 83 goes low, which presets FF20 and causes the Q output of the flip flop (and therefore the shift register serial input) to return to the high logical state. On the succeeding internal clock pulse the QA output of the shift register 83 goes high and the QB output goes low. This single low pulse continues through the shift register on succeeding clock pulses to the QC output and then to the QD output. Here the output is defined as the internal frame signal (INT FRM). Therefore, it can be seen that the internal frame signal is a single low going pulse lasting one clock period which occurs four clock periods after the $\overline{\text{FGST}}$ or the $\overline{\text{IG}}$ signal goes low.

A negative AND gate G57 in FIG. 33 has as its inputs the internal frame signal from the shift register 83 and the $\overline{\text{TB}}$ signal from the transmit sequence logic of FIG. 31. This last-mentioned signal indicates that a terminal broadcast has been selected from transmission. The output of the gate G57 provides the QB5, 6 reset signal and is transmitted to the terminal control port of FIG. 20A to reset bits 5 and 6 of this port which appear as QB5 and QB6 in FIG. 20A. Recalling the discussion of the terminal control port, bit 5 is set by the CPU to indicate that a terminal broadcast is ready for transmission in the A channel and bit 6 indicates the same for the B channel. The QB5, 6 reset signal therefore resets these "TB ready" signals when the framing signal associated with a terminal broadcast transmission occurs.

The purpose of the supervisory data counter logic 72 as shown in FIG. 29 is to count the supervisory data bits (function codes and terminal broadcast data) following framing signals in accordance with input signals $\overline{\text{TB}}$, $\overline{\text{IG}}$, $\overline{\text{SM}}$ and $\overline{\text{EOT}}$ which indicate whether the transmission is a terminal broadcast, an intramessage gap, a start of message or the end of the transmission respectively. This logic also provides output signals which indicate first whether the supervisory/user data multiplexer 59 of FIG. 26 should select supervisory data or user data during the start of message transmission (SW OVER), second to indicate to the transmit user interface logic circuit of FIG. 28A when the intramessage gap is occurring (MW RST), third to indicate the end of transmission at the end of the terminal broadcast in the diagnostic operating mode or at the time of the EOT transmission in the user access mode (ENDX), and fourth to show when a user has finished its transmission (ET MON).

A diagram of the supervisory data counter is shown as part of FIG. 33. A counter 84 is reset and begins counting internal clock pulses each time an internal frame pulse is detected. The terminal count is determined by which input signal $\overline{\text{TB}}$, $\overline{\text{SM}}$, $\overline{\text{IG}}$ or $\overline{\text{EOT}}$ is set at the time of the internal frame pulse. This terminal frame count signal (END CT) indicates the end of supervisory data transmission onto the bus for the various function codes and has values of 18, 2, 2 and 3 pulses counted respectively for TB, SM, IG and EOT. The end count signal drives three logic elements seen as flip flops FF21 and FF22 and a one-shot device 86. FF21, like the counter 84, is preset each time an internal frame pulse occurs. This causes its output SWOVR to go to a logic state which in turn causes the user/supervisory data multiplexer of FIG. 26 to select supervisory type information for transmission onto the bus. When the end count occurs from counter 84, the output of flip flop FF21 changes state and causes the user/supervisory multiplexer to select user data. Note, however, that actual user data transmission only occurs when $\overline{\text{SM}}$ is active as described, that is only following a SM or IG function code. For the TB and EOT transmission, the transmit sequence logic of FIG. 31 selects another transmission type or, in conjunction with the loop close logic of FIG. 32, enables the loop to be closed and the TLU to stop transmissions and reenter the relay submode of operation. This latter function occurs in the case after a TB has been transmitted in the diagnostic mode or after an EOT and access window transmission in the user access mode.

The end of the present transmission is indicated by the ENDX signal which is output from an AND gate G58. This output from G58 occurs when $\overline{\text{EOT}}$ is active and when SWOVER becomes active, for example, when flip flop FF21 is toggled by the end count signal. The end count signal also triggers the one-shot 86 which provides a pulse signal $\overline{\text{MWRST}}$.

When $\overline{\text{SM}}$ is active (an SM or IG function code has been transmitted), the end count signal causes FF22 to toggle. The output of this flip flop, $\overline{\text{ETMON}}$, provides an indication that the user is transmitting data onto the bus. This latter signal is one input to a negative AND gate G59. Another input to G59 is provided by the user ready signal from the transmit user interface logic of FIG. 28A which normally indicates whether or not the user has its RT signal set. When the RT signal is removed and ETMON is active, the output of the gate G59 goes low and presets flip flop FF22. This causes the ETMON signal to become inactive and thereby indicates that the user is finished with its transmission.

A logical flow chart depicting the diagnostic controller algorithm and thereby the operation of a diagnostic controller multiplex terminal is shown in FIG. 34. As mentioned hereinbefore a terminal operates in the diagnostic mode by virtue of the bit condition of TCB0 and TCB7 of the terminal control port of FIG. 20A. The terminal is at a wakeup point when the system is initially turned on and is immediately commanded to go to configuration 1 which is shown in FIG. 10 of the drawings. The diagnostic controller terminal then opens both transmission loops 10a and 10b and transmits a "line clear" signal on both channels A and B a number of times. This causes all other terminals to enter diagnostic follower algorithms. The terminal clock is reset so that the terminal receives program interrupts or "ticks" periodically thereafter. A terminal first listens to see if it receives the echo of the line clear transmission on channel A. If the echo is received one clock pulse or "tick" is allowed to pass and a configure A loop instruction (TB message) sent out on the transmission path. Then the diagnostic controller is stores a configuration 3 command which configuration is illustrated in FIG. 12 of the drawings. If no reception is received on channel A then reception is listened for on channel B. If reception is received on channel B one clock pulse is allowed to pass and a configure B loop instruction (TB message) is transmitted by the controller. The controller then stores a configuration 4 command which configuration is illustrated in FIG. 13 of the drawings. If no reception is received on channel B one clock pulse is allowed to pass and a configure hybrid loop instruction (TB message) is transmitted by the diagnostic controller. The controller then goes to configuration 2 which is illustrated in FIG. 11 of the drawings. One clock pulse is then allowed to pass and a transmission is made on channel A. After another clock pulse or "tick" is allowed to pass a transmission is made on channel B. The terminal listens to see if there is a reception on channel A and if there is, it is next inquired if a reception is acquired on channel B. If a channel B reception is also obtained, the terminal is an interior terminal of a hybrid loop as defined with reference to FIG. 17. Accordingly the controller is commanded to go to configuration 1 and to store a configuration 7 command which is referred to in FIG. 16. If no reception is obtained on channel B the terminal is an A-end terminal as seen in FIG. 17. Accordingly the controller is commanded to store a configuration 5 command (A-end terminal) which configuration is shown in FIG. 14. If no reception is received on channel A but a reception is received on channel B then the terminal is a B-end terminal as seen in FIG. 17. Accordingly the controller is commanded to store a configuration 6 command (B-end terminal) which configuration is shown in FIG. 15. If no reception is obtained on channels A or B the routine is reentered at A in FIG. 34 since the terminal cannot yet enter into a loop.

Presuming that a command for one of the configurations 3 through 7 has been stored in the diagnostic controller terminal, one clock pulse is allowed to pass and a status report is sent by the terminal. The terminal then waits for a response to the status report. The response indicates if there are any members. If there are no members the routine is returned to the wakeup point at A so that the routine may be repeated to try again to configure a loop. If there are members indicated as a result of the response the diagnostic controller terminal sets the user access bit and sends a status report. Thereafter the diagnostic controller puts an access window on the bus and enters the user access mode in a configuration in accordance with the stored configuration command as hereinbefore described.

There is only one diagnostic controller terminal during performance of the diagnostic algorithm and all other terminals are diagnostic followers. This is accomplished through the random listening time at each terminal at wake-up entry so that there will be no conflict between the terminals in attempting to become the diagnostic controller in the diagnostic mode. A logical flow chart depicting the diagnostic follower algorithm and thereby the operation of all of the diagnostic follower terminals is seen in FIG. 35. The follower terminals receive the "line clear" signal from the diagnostic controller and immediately go to configuration 1. At that point the followers reset their clocks to synchronize the clock pulses or "ticks" with the controller terminal. As mentioned hereinbefore the operations in the diagnostic mode are performed synchronously. The follower then listens to the bus to see if instructions arrive within four clock pulses. If no instructions arrive the follower enters the diagnostic controller routine at A in FIG. 34. If instructions arrive within the four clock pulses a determination is made as to whether the instructions required a configuration of an A channel loop. If the answer is yes, then the follower terminal is commanded to store a configuration 3 command which configuration is shown in FIG. 12 of the drawings. If the answer is no, then a determination is made as to whether the instruction received requires that a B loop be configured. In the event that the instructions do require configuration of a B loop, the follower terminal is commanded to store a configuration 4 command which configuration is shown in FIG. 13. If a B loop is not to be configured then it is determined if a hybrid loop instruction has been received. In the event a hybrid instruction has not been received the routine returns to the beginning at A in the diagnostic controller routine of FIG. 34. If a hybrid loop instruction has been received the follower terminal waits one clock pulse and goes to configuration 2 as shown in FIG. 11. The diagnostic follower terminal then transmits on channel A, waits one clock pulse and transmits on channel B. The terminal next determines if a reception of the A channel transmission has been made. If there has been such a reception and there has also been a reception on channel B, then the diagnostic follower is an interior terminal of a hybrid loop as seen in FIG. 17 and is commanded to go to configuration 1 and to store a configuration 7 command which configuration is shown in FIG. 16. If reception is made on channel A but not on channel B the follower terminal is an A-end terminal of a hybrid loop as seen in FIG. 17. Accordingly it is commanded to store a configuration 5 command which configuration is shown in FIG. 14. If no reception is made on channel A but reception is realized on channel B, the follower terminal is a B-end terminal of hybrid loop as seen in FIG. 17. Accordingly it is commanded to store a configuration 6 command which configuration is seen in FIG. 15. If no reception is made on either channels A or B (as in the example described hereinbefore relative to FIG. 9 where terminal MT3 is isolated by breaks in the transmission paths on each side) then the routine returns to A for a diagnostic controller routine in FIG. 34.

Assuming that one of the configurations 3 through 7 has been stored in the diagnostic follower terminal, the terminal is required as seen on the flow chart of FIG. 35, to send a status on the appropriate clock pulse. The follower, still in the diagnostic mode, transmits on the particular clock pulse determined by subtracting a controller I.D. number from a follower I.D. number. Each follower thus has its own time slot for transmission in the diagnostic mode. Thereupon the follower terminal waits for the controller's next transmission. Upon receiving the controller's next terminal broadcast, the follower determines if the controller's user access bit is set. If the bit is set, then the diagnostic follower terminal enters the user access mode in one of configurations 3 through 7 in accordance with the stored command. If the controller user access bit is not set or if its transmission is not received within a given number of pulses, then the follower terminal returns to A in the diagnostic controller flow routine depicted in FIG. 34.

Although the best mode contemplated for carrying out the present invention has been herein shown and described, it will be apparent that modification and variation may be made without departing from what is regarded to be the subject matter of the invention.

What is claimed is:

1. An asynchronous data communications system wherein a plurality of system user data sources provide asynchronous data at random intervals and of random length for system user data sinks and wherein system dead time is minimized, comprising
   a plurality of substantially similar multiplex terminals in communication with ones of the system user data sources and sinks,
   a transmitter and a receiver in each of said terminals,
   a message conveying path communicating said transmitter in one of said terminals with said receiver in another of said terminals so that said path describes a continuous loop extending from and returning to each of said terminals,
   means in each of said multiplex terminals for accepting data from said receiver and for providing said data to one of the system user data sinks in communication therewith,
   means in each of said multiplex terminals for transferring data to said transmitter from one of the system user data sources in communication therewith,
   means in each of said multiplex terminals for detecting asynchronous transmission initiation and termination by a user data source,
   means in each of said multiplex terminals for generating an access window signal in response to an asynchronous transmission termination, said last named means being coupled to said transmitter, and
   means including an access window capture circuit in each one of said multiplex terminals for directing said one of said terminals to assume a transmit access configuration when said access window signal is captured so that asynchronous data locally generated by ones of the user data sources is transmitted thereby from a user data source in communication therewith and for directing said one of said terminals to operate in a relay configuration when said access window is not captured so that asynchronous data is relayed from said receiver to said transmitter for retransmittal along said path to a user data sink in communication with another of said multiplex terminals.

2. A communications system as in claim 1 wherein each of said terminals alternatively assumes a user access and a diagnostic mode and each terminal includes a central processing unit, wherein said means for transferring data includes means for providing terminal broadcast data and wherein said means for accepting data includes means for accepting terminal broadcast data, said means for providing and accepting broadcast data communicating with said central processing unit in said diagnostic mode, whereby said central processing unit in each multiplex terminal communicates with said processing unit in every other multiplex terminal.

3. A communications system as in claim 1 wherein the asynchronous data is in one of a predetermined number of data formats having predetermined identifying codes, and wherein said means for accepting data includes a format decoder, whereby format identification is established.

4. An asynchronous data communication system wherein a plurality of system user data sources provide asynchronous data at random intervals and of random length for user data sinks and wherein system dead time is minimized, comprising
   a plurality of multiplex terminals in communication with ones of the system users,
   a transmitter and a receiver in each of said terminals,
   a message conveying path communicating said transmitter in one of said terminals with said receiver in another of said terminals so that said path describes a continuous loop extending from the returning to each of said terminals,
   means in each of said multiplex terminals for accepting data from said receiver and for providing said data to one of the system user data sinks in communication therewith,
   means in each of said multiplex terminals for transferring data to said transmitter from one of the system user data sources in communication therewith,
   means in each one of said multiplex terminals for directing said one of said terminals to assume a transmit access configuration so that asynchronous data is transmitted thereby from a user data source in communication therewith and to assume a relay configuration so that asynchronous data is relayed from said receiver to said transmitter for retransmittal along said path to a user data sink in communication with another of said multiplex terminals, wherein said means for directing includes means for providing an initiation signal indicative of system availability for asynchronous data transmission, and wherein said means for transferring data includes means coupled to said initiation signal for providing a system access signal at the termination of an asynchronous data transmission, whereby each of said multiplex terminals in sequence in said continuous loop is apprised that the system is available for asynchronous data transmission.

5. A communications system as in claim 4 wherein said means for directing comprises means for capturing said system access signal when said means for transferring in the receiving multiplex terminal has asynchronous data ready for transmittal, and means for opening said continuous loop at the receiving side of said terminal in response to capture of said access signal and for communicating said means for transferring with said transmitter.

6. A communications system as in claim 1 wherein said transmitter and said receiver comprise dual transmitters and receivers and wherein said message conveying path comprises dual paths each extending from a separate transmitter in one multiplex terminal to a separate receiver in another multiplex terminal, whereby said continuous loop comprises a pair of parallel loops serially connecting said multiplex terminals, and a central processing unit for alternatively disposing said plurality of multiplex terminals all in a diagnostic operational mode and all in a user access operational mode.

7. A communications system as in claim 6 wherein said central processing unit includes a microprocessor and means for cross coupling a receiver in one of said parallel loops with a transmitter in the other of said loops in each terminal, so that said microprocessor cross couples said loops to configure a hybrid loop when required in accordance with microprocessor instructions when all of said multiplex terminals are in said diagnostic operational mode.

8. A communications system for conveying messages of random length from system user data sources in accordance with the position of the user in the system and the time at which the message is ready for transmission while minimizing overhead, comprising at least two terminals each configurable in a relay and in a transmit access configuration, a message conveying path extending from each terminal to another terminal so that said terminals are serially connected in a closed loop, means at each terminal for transmitting and receiving messages conducted along said message path to and from an adjacent terminal in said loop, means in each terminal for opening said loop at that terminal during transmission and for providing asynchronous messages along said message path to a receiving means in an adjacent terminal in said loop, means in each terminal for coupling newly generated asynchronous messages from user data sources to said means for transmitting, means in communication with said means for coupling for selectively generating and appending to newly generated asynchronous messages a signal indicative of system availability for subsequent asynchronous message transmission, means in each terminal for closing said loop following asynchronous transmission, thereby disposing said terminal in said relay configuration, and after said terminal receives its own newly generated asynchronous message on said loop, but prior to removal of said system availability signal so that said system availability signal is retransmitted on said loop, and means included in each terminal coupled between said means for receiving and means for transmitting for removing said system availability signal from said loop when said receiving terminal has an asynchronous message to transmit, said means for opening being responsive to removal of said system availability signal thereby disposing said receiving terminal in said transmit access configuration.

9. A communication system for conveying randomly generated binary data messages from user data sources to user data sinks while maximizing system throughput and minimizing system delay, comprising a plurality of multiplex terminals interfaced to user data sources and user data sinks, a plurality of data transmission medium segments extending from ones of said terminals to others of said terminals so that said plurality of terminals is serially connected in a closed loop, means in each terminal for transmitting messages to an adjacent terminal over one of said data transmission segments, means in each terminal for receiving messages transmitted by an adjacent terminal over another of said data transmission medium segments, means in each terminal for routing locally generated messages to said means for transmitting when disposed in a transmit access configuration and for routing received messages from said means for receiving to said means for transmitting when disposed in a relay configuration, means in each terminal for transferring locally generated messages from a data source to said means for routing and for appending a system availability signal to same with said means for routing disposed in a transmit access configuration, means in each terminal for controlling said means for routing including means for returning same to a relay configuration after said locally generated messages have been transferred but before said system availability signal has traversed the loop, said means for controlling further including means for recognizing a received system availability signal and for retransmitting a modified form of same when locally generated messages are available for transmission, whereupon said means for controlling disposes said means for routing into a transmit access configuration if said system availability signal was actually received in an unmodified form, and means in each terminal for accepting messages from said means for receiving and for transferring same to a data sink with said means for routing disposed in both said transmit access and relay configurations.

10. A communications system as in claim 8 wherein each of said terminals alternatively assumes a user access and a diagnostic mode, and wherein each terminal comprises a central processing unit, means for providing terminal broadcast messages, and means for accepting terminal broadcast messages, said means for providing and accepting broadcast messages communicating with said central processing unit in said diagnostic mode, whereby said processing unit in each multiplex terminal communicates with said processing unit in every other multiplex terminal.

11. A communications system as in claim 8 wherein said asynchronous messages are in one of a predetermined number of message formats having predetermined identifying codes according to function, and wherein said means for receiving messages includes a function decoder, whereby function identification is established.

12. A communications system as in claim 8 wherein said means for transmitting and receiving comprises dual transmitters and receivers and wherein said message conveying paths comprise redundant paths extending between a separate transmitter in one terminal and a separate receiver in another terminal, whereby said continuous loop comprises a pair of parallel loops serially connecting said terminals, and means for alternatively configuring said terminals all in a diagnostic operational mode and all in a user access operational mode.

13. A communications system as in claim 12 wherein said means for alternatively configuring includes a microprocessor and means for cross coupling a receiver in one of said parallel loops with a transmitter in the other of said loops, so that said microprocessor operates to cross couple said loops to configure a hybrid loop when required in accordance with microprocessor instructions when all of said terminals are in said diagnostic operational mode.

14. A communications system for conveying messages of random length from system users as messages become available for transmission, wherein overhead is minimized, comprising
    at least two multiplex terminals configurable in a relay and a transmit access configuration,
    at least two message conveying paths extending from each of said multiplex terminals so that said terminals are serially connected in a continuous loop,
    means in each of said terminals for transmitting message components along one of said conveying paths,
    means within each of said multiplex terminals for selectively providing a signal indicative of system availability for message transmission to said means for transmitting and for appending said signal to a transmitted asynchronous message,
    means in each of said multiplex terminals for receiving message components from the other of said conveying paths and for passing said system availability signal directly to said means for transmitting when said terminals are disposed in said relay configuration, whereby said availability signal circulates on said loop without intervention from said terminals,
    means in said multiplex terminals for sensing the presence of said system availability signal in said transmitted asynchronous message components,
    and means responsive to said means for sensing for disposing said terminals in said transmit access configuration when said system availability signal is present and message components are available for transmission therefrom, said means for disposing including means for removing said system availability signal from circulation on said loop.

15. A communications system as in claim 14 wherein said means for disposing comprises means for closing said message conveying path in said continuous loop at terminals in said relay configuration and for opening said message conveying path in said continuous loop at terminals in said transmit access configuration.

16. A communications system as in claim 14 wherein each of said terminals alternatively assumes a user access and a diagnostic mode, and wherein each terminal comprises a central processing unit, means for providing terminal broadcast message components, and means for accepting terminal broadcast message components, said means for providing and accepting broadcast message components communicating with said central processing unit in said diagnostic mode whereby said processing unit in each multiplex terminal operates to communicate with said processing unit in every other multiplex terminal.

17. A communications system as in claim 14 wherein said asynchronous message components are in one of a predetermined number of message formats having predetermined identifying codes according to function, and wherein said means for receiving message components includes a function decoder, whereby function identification is established.

18. A communications system as in claim 14 wherein said means for transmitting and receiving comprise dual transmitters and receivers and wherein said message conveying paths comprise redundant paths extending between a separate transmitter in one multiplex terminal to a separate receiver in another multiplex terminal, whereby said continuous loop comprises a pair of parallel loops serially connecting said multiplex terminals, and central processing means included in said means for disposing so that said multiplex terminals are all directed by said processing means to assume alternatively a diagnostic operational mode and a user access operational mode.

19. A communications system as in claim 18 wherein said central processing means includes a microprocessor and means for cross coupling a receiver in one of said parallel loops with a transmitter in the other of said loops in each terminal, so that said microprocessor cross couples said loops to configure a hybrid loop when required in accordance with microprocessor instructions when all of said multiplex terminals are in said diagnostic operational mode.

20. A data communications system operating to service a number of user data sources and user data sinks comprising
    a plurality of multiplex terminals each servicing ones of the users,
    first and second pairs of message conveying paths extending in first and second directions respectively from each of said multiplex terminals, whereby said plurality of terminals are connected serially by redundant conveying paths to form parallel continuous loops,
    means including in each of said terminals for transmitting data along one of said first pair of conveying paths in one direction and along one of said second pair of conveying paths in the other direction,
    means included in each of said terminals for receiving data from the other of said first and second pairs of conveying paths,
    each of said multiplex terminals further comprising a terminal control processor, first means coupled to said processor for disposing said terminal alternatively in a diagnostic operational mode and a user access operational mode, and second means coupled to said processor for configuring said terminal alternatively in a relay configuration and a transmit access configuration, said first means coupled to said processor being responsive to system status and disposing said terminal in said diagnostic operational mode in response to predetermined system and terminal conditions wherein said processor communicates with like processors in others of said plurality of terminals, said first means coupled to said processor including means operating in said diagnostic operational mode for selecting said means for transmitting and said means for receiving to assume a condition wherein maximum available system communications capability is obtained, said first means coupled to said processor disposing said terminal in said user access operational mode upon indication that said maximum available system capability condition is set, wherein each of said terminals is in asynchronous communication with others of said plurality of terminals and communicates data from user data sources and to user data sinks.

21. A data communications system as in claim 20 wherein said first means coupled to said processor includes means for monitoring terminal status, so that said diagnostic operational mode is entered when predetermined status changes are detected, and means for operating said multiplex terminal synchronously with others of said plurality of terminals when in said diagnostic operational mode.

22. A data communications system as in claim 20 wherein said second means coupled to said processor includes means for generating a system access availability signal for circulation on said conveying paths when said terminal is in said user access operational mode, said signal being generated upon leaving said transmit access configuration and assuming said relay configuration.

23. An asynchronous data communication system comprising a plurality of multiplex terminals interfaced to user data sources and user data sinks and interconnected by data transmission medium segments to form a closed loop, each of said terminals comprising, a data transmitter transforming binary data signals into an appropriately modulated format and transmitting same to a second one of said terminals over a first one of said segments, a data receiver receiving said modulated format from a third one of said terminals over a second one of said segments and transforming same into binary data signals, data selector means routing binary data signals from the output of said receiver to the input of said transmitter with said data selector means disposed in a relay configuration, and routing locally generated binary data signals to the input of said transmitter with said data selector means disposed in a transmit access configuration, control means including an access window capture circuit responsive to the output of said receiver with said data selector means disposed in a relay configuration and locally generated data available to be transmitted, said capture circuit setting a particular bit following an identifiable bit sequence to the inverse of a predetermined binary state as said bit is routed from said receiver to said transmitter and then commanding said data selector means to assume a transmit access configuration if said particular bit was actually received in said predetermined binary state, said control means further including loop-closing means capable of commanding said data selector means to resume a relay configuration;

transmitter inputting means operational with said data selector means disposed in a transmit access configuration including means for transferring locally generated binary data signals from a data source including a user data source to said data selector means, and means for appending to said data signals said identifiable bit sequence followed by said particular bit in said predetermined state and further including means for subsequently informing said loop-closing means after said particular bit has been transferred, whereupon said loop-closing means returns said data selector means to a relay configuration before said particular bit has traversed the loop, and receiver outputting means operational with said data selector means disposed in either a transmit access configuration or a relay configuration including means for transferring binary data signals from said receiver to a data sink including a user data sink.

24. A data communication system in accordance with claim 23 wherein said data transmitter and data receiver include means for accepting and means for outputting composite signals comprising separate data signals, clock signals, and frame signals, whereby said frame signals are synchronizing pulses defining the beginning of a contiguous sequence of data signal bits.

25. A data communication system in accordance with claim 23 wherein said transmitter inputting means includes means for generating frame signals and means for encoding a group of data bits immediately following said frame signals into function codes conveying particular meanings, and wherein said receiver outputting means includes a function code decoder activated by received ones of said frame signals and decoding succeeding data bits into specific control signals, and whereby said identifiable bit sequence which precedes said particular bit is a function code denoting end of message.

26. A data communication system in accordance with claim 23 wherein said loop-closing means includes counting means responsive to the difference between numbers of transmitted and received frame signals, whereby said relay configuration is resumed after transmission of locally generated data when said difference is a prescribed number.

27. A data communication system in accordance with claim 23 wherein said transmitter inputting means includes means for prefixing binary data signals generated by user data sources with a particular function code identifying same as user data messages, and wherein said receiver outputting means includes means for transferring received messages preceded by said function code to user data sinks.

28. A data communication system in accordance with claim 23 wherein said control means includes microprocessor means interfaced with said transmitter inputting means, whereby said microprocessor means can serve as a data source by generating terminal broadcast messages and transferring same to said transmitter inputting means, whereupon said last named means prefixes each of said messages with a function code identifying same as a terminal broadcast message, said microprocessor means being further interfaced with said receiver outputting means, whereby said microprocessor means can serve as a data sink by inputting received ones of said data messages preceded by said terminal broadcast function code, the arrival of one of said messages being indicated to said microprocessor means by a program interrupt signal responsive to a control signal outputted by said function code decoder.

29. A data communication system in accordance with claim 28 wherein said control means includes means for interfacing said microprocessor means with said access window capture circuit and said data selector means, whereby said microprocessor means can selectively dispose said terminal in a diagnostic operational mode by disabling said means for transferring data from a user data source to said transmitter and disabling said access window capture circuit, whereupon said microprocessor means is thereafter capable of directly commanding said data selector means to assume a transmit access configuration and to transmit a terminal broadcast message, said microprocessor means further operating to selectively dispose said terminal in a user access operational mode by enabling said means for transferring data from a user data source to said transmitter, by enabling said access window capture circuit, and by commanding said transmitter inputting means to transfer said message function code and said particular bit in said predetermined binary state to said transmitter, whereby a transmit access configuration will thereafter be assumed by said data selector means by action of said access-window capture circuit without direct control by said microprocessor means.

30. A data communication system in accordance with claim 23 wherein said loop-closing means includes counting means responsive to the number of frame signals transmitted and the number of frame signals received during a transmit access configuration, and whereby a relay configuration is resumed after locally generated data has been introduced when the difference between said two numbers is positive one with said terminal disposed in the user access operational mode and zero with said terminal disposed in the diagnostic operational mode, said loop-closing means further including fail-safe timing means whereby a relay configuration is resumed at a predetermined time after said locally generated data is transmitted regardless of the count of said counting means.

31. A data communication system in accordance with claim 28 wherein said data transmitter and data receiver comprise dual transmitters and receivers respectively which are interconnected with the other one of said dual transmitters and receivers at other ones of said terminals by bidirectional pairs of said data transmission medium segments, and wherein said microprocessor means is selectively capable of commanding said data selector means to route data signals from the output of either of said dual transmitters to the input of either of said dual receivers with said data selector means disposed in a relay configuration, and of routing locally generated data signals from said transmitter inputting means to either of said dual transmitters with said data selector means disposed in a transmit access configuration, and wherein said microprocessor means is further capable of transmitting terminal broadcast messages over both of said transmitters and of receiving terminal broadcast messages from both of said receivers with said terminal disposed in either said diagnostic operational mode or said user access operational mode, and of selecting either of said dual transmitters and either of said dual receivers for communicating data signals from a user data source and to a user data sink with said terminal disposed in said user access operational mode.

32. A data communication system in accordance with claim 28 wherein said control means further includes means for directing said microprocessor means to enter a diagnostic controller algorithm upon applying power to said terminal, wherein said terminal assumes said diagnostic operational mode and transmits a particular terminal broadcast message to other ones of said microprocessor means at other ones of said terminals, thereby directing programs of said other terminals to enter cooperative diagnostic follower algorithms which synchronously communicate bilaterally with said controller algorithm using said transmit access configuration to transmit terminal broadcast messages during particular time periods defined by transmissions of said controller algorithm, means responsive to said algorithms for defining an optimum data loop with each constituent member terminal appropriately configured for same, whereupon said member terminals collectively enter said user access operational mode to subsequently communicate data messages from user data sources and to user data sinks by means of said optimum data loop.

33. A data communication system in accordance with claim 28 wherein said control means includes a status port interfacing with said microprocessor means, said status port operating to monitor a plurality of terminal status signals, whereby a change in one of said status signals generates an interrupt signal transferring program control to a routine wherein said status signals are examined along with other program data and said routine transfers control to said diagnostic controller algorithm to reconfigure a new optimum data loop if said routine concludes that the present data loop has been compromised.

34. A data communication system in accordance with claim 33 wherein said control means includes means for responding to the absence of received clock signals at the outputs of said data receivers, such response generating a change in one of said status signals.

35. A data communication system in accordance with claim 33, wherein said loop closing means includes fail safe timing means providing a time-out signal at a predetermined time after locally generated data is transmitted, and wherein said control means includes means for responding to said time-out signal, such response generating a change in one of said status signals.

36. A data communication system in accordance with claim 33 wherein said access window capture circuit includes access window timing means reset by every reception of said identifiable bit sequence followed by said particular bit in said predetermined state, said control means including means for responsing to time-out of said access window timing means, such response generating a change in one of said status signals.

37. A communication system as in claim 9 wherein each of said plurality of terminals includes microprocessor means capable of outputting a terminal braodcast message to said means for transferring messages from a data source, said means for transferring including means for prefixing a message with a terminal broadcast function code and for transferring same to said means for routing, said microprocessor means further operating to accept messages from said means for accepting messages from said receiving means whenever said messages are preceded by said terminal broadcast function code.

38. A communication system as in claim 9 wherein said means for transmitting includes means for accepting separate clock, data, and frame signals, and wherein said means for receiving includes means for outputting separate clock, data, and frame signals, said frame signals being synchronizing pulses identifying the start of a contiguous sequence of data bits.

39. A communication system as in claim 9 wherein said means for transferring locally generated messages to said means for routing includes means for generating frame signals and means for encoding a succeeding sequence of bits into particular function codes, and wherein said means for accepting messages from said receiving means includes means for decoding a sequence of bits following a frame signal to obtain a particular control signal identifying the received function code.

40. A communication system as in claim 9 wherein said means for appending a system availability signal comprises means for generating a particular function code followed by an additional bit, whereby the binary state of said additional bit conveys permission or lack of permission for system access.

41. A communication system as in claim 9 wherein said means for controlling said means for routing includes counting means responsive to the numbers of transmitted and received frame signals in a transmit access configuration, whereby said means for routing is returned to a relay configuration after said locally generated messages have been transferred when the difference between said numbers is a prescribed value, said means for controlling further including fail-safe timing means for returning said means for routing to a relay configuration at a specified time interval after said locally generated messages have been transferred regardless of the count of said counting means.

42. A communication system as in claim 9 wherein said means for transferring messages from a data source includes means for prefixing messages from a user data source with a particular user-message function code, and wherein said means for accepting messages from said means for receiving includes means for transferring messages preceded by said user-data function code to a user data sink.

43. A communication system as in claim 37 wherein said means for controlling includes means for directing said microprocessor means upon initial power-up to enter a diagnostic controller algorithm, wherein all others of said microprocessor means in the system are directed to enter a cooperative diagnostic follower algorithm and communicate bilaterally with said diagnostic controller algorithm using said diagnostic operational mode and with time slots defined by transmissions of said diagnostic controller algorithm, said bilateral communication resulting in the formation of an optimum data loop, whereupon after said formation all member terminals assume said user access operational mode to communicate messages from user data sources and to user data sinks via said optimum data loop.

44. A communication system as in claim 37 wherein said means for controlling includes means responsive to said microprocessor for disposing said terminal in a diagnostic operational mode, whereby said means for recognizing a system availability signal is disabled and said means for routing is thereafter controlled directly by said microprocessor means to assume a transmit access configuration, and wherein said means for controlling further includes means responsive to said microprocessor for returning said terminal to a user access operational mode, whereby said means for recognizing a system availability signal is enabled and said means for routing is controllably disposed in a transmit access configuration by action of said means for recognizing a system availability signal in accordance with the logical state of said additional bit and the availability of locally generated messages for transmission.

45. A communication system as in claim 37 wherein said means for controlling is responsive to said microprocessor means and includes means for enabling and disabling user message transfers by said means for transferring locally generated messages from a data source to said means for routing, and wherein said user message transfers are disabled with said terminal disposed in said diagnostic operational mode and enabled with said terminal disposed in said user access operational mode.

46. A communication system as in claim 9 wherein said means for controlling includes means for returning said means for routing to a relay configuration after said locally generated messages have been transferred when said difference between the number of transmitted and received frame signals is positive one with said terminal disposed in said user access operational mode and zero with said terminal disposed in said diagnostic operational mode.

47. A communication system as in claim 37 wherein said means for transmitting messages and means for receiving messages comprises dual transmitting and receiving means respectively, and wherein said data transmission medium segments comprise two segments conducting messages in opposite directions from each terminal, and wherein said means for controlling includes means responsive to said microprocessor means for commanding said means for routing to route received messages from either of said means for receiving to either of said means for transmitting when disposed in a relay configuration and to route locally generated messages to either of said means for transmitting when disposed in a transmit access configuration, and wherein said means for controlling includes further means responsive to said microprocessor means for transmitting terminal broadcast messages over both of said means for transmitting and for receiving terminal broadcast messages from both of said means for receiving and for selecting either of said means for transmitting and either of said means for receiving for conveying messages from a user data source and to a user data sink with said terminal disposed in said user access operational mode.

48. A data communication system as in claim 43 wherein said means for controlling includes means for interfacing said microprocessor means with a terminal status port operating to monitor a plurality of terminal status input signals and to receive a program interrupt in the event of change of one of said signals, whereupon said microprocessor means operates to examine said status input signals along with other available program data and selectively jumps to said diagnostic controller algorithm if the result of said examination indicates that the current data loop has been compromised.

49. A communication system as in claim 48 wherein said means for controlling includes means responsive to the absence of received clock signals outputted by said means for receiving, such response providing a change in said status input signals.

50. A communication system as in claim 48 wherein said means for controlling includes timing means connected to said means for recognizing a received system availability signal, said timing means being reset by each received system availability signal, and means responsive to time-out of said timing means, such response providing a change in said status input signals.

* * * * *